US012584867B2

(12) United States Patent     (10) Patent No.:   US 12,584,867 B2

Suzuki et al.          (45) Date of Patent:     Mar. 24, 2026

(54) X-RAY IMAGE ACQUISITION DEVICE AND X-RAY IMAGE ACQUISITION SYSTEM

(71) Applicant: HAMAMATSU PHOTONICS K.K., Hamamatsu (JP)

(72) Inventors: Haruki Suzuki, Hamamatsu (JP); Masahiro Kamiya, Hamamatsu (JP); Yukinobu Sugiyama, Hamamatsu (JP); Naonori Hosoya, Hamamatsu (JP); Hidetoshi Yoshimura, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 104 days.

(21) Appl. No.: 18/578,029

(22) PCT Filed: Mar. 31, 2022

(86) PCT No.: PCT/JP2022/016600
§ 371 (c)(1),
(2) Date: Jan. 10, 2024

(87) PCT Pub. No.: WO2023/286401

PCT Pub. Date: Jan. 19, 2023

(65) Prior Publication Data

US 2024/0319116 A1     Sep. 26, 2024

(30) Foreign Application Priority Data

Jul. 13, 2021    (JP) ................................. 2021-115658

(51) Int. Cl.
*G01N 23/04*     (2018.01)
*G01N 23/083*     (2018.01)
*H04N 25/30*     (2023.01)

(52) U.S. Cl.
CPC ........... *G01N 23/04* (2013.01); *G01N 23/083* (2013.01); *H04N 25/30* (2023.01); *G01N 2223/3307* (2013.01); *G01N 2223/505* (2013.01)

(58) Field of Classification Search
CPC ................. G01N 23/04; G01N 23/083; G01N 223/3307; G01N 223/505; H04N 25/30
See application file for complete search history.

(56) References Cited

U.S. PATENT DOCUMENTS 5,177,776 A * 1/1993 Ohmori .................. G01N 23/04
378/146
5,323,186 A * 6/1994 Chow .................. H04N 25/711
348/E3.018

(Continued)

FOREIGN PATENT DOCUMENTS

JP     H1188784 A * 3/1999
JP     H11088784 A    3/1999

(Continued)

OTHER PUBLICATIONS

International Preliminary Report on Patentability mailed Jan. 25, 2024 for PCT/JP2022/016600.

(Continued)

*Primary Examiner* — Blake C Riddick
(74) *Attorney, Agent, or Firm* — Faegre Drinker Biddle & Reath LLP

(57) ABSTRACT

An X-ray image acquisition device includes a pixel unit having M pixel arrays each including N pixel portions (N and M are integers of 2 or more), M circuit units, and a control unit. Each circuit unit includes T (T is an integer of N or more) adding sections that sequentially add electrical signals corresponding to output signals from the N pixel portions and a switch section for switching connection states between the N pixel portions and the T adding sections. The (Continued)

control unit switches the connection states in synchronization with the transportation of an object along a first direction so that the electrical signals corresponding to the output signals output from the pixel portions by detecting X-rays transmitted through the same region of the object are added by the same adding sections.

16 Claims, 50 Drawing Sheets

(56) References Cited

U.S. PATENT DOCUMENTS

| | | | | | |
|---|---|---|---|---|---|
| 5,664,001 | A * | 9/1997 | Tachibana | | A61B 6/51 |
| | | | | | 378/146 |
| 5,677,940 | A * | 10/1997 | Suzuki | | A61B 6/51 |
| | | | | | 378/38 |
| 5,898,332 | A * | 4/1999 | Lefevre | | H04N 25/768 |
| | | | | | 327/337 |
| 6,762,795 | B1 * | 7/2004 | Chen | | H04N 25/768 |
| | | | | | 348/308 |
| 6,825,877 | B1 * | 11/2004 | Hewitt | | H04N 25/711 |
| | | | | | 377/57 |
| 2006/0239410 | A1 * | 10/2006 | Schutz | | A61B 6/02 |
| | | | | | 378/165 |
| 2006/0239411 | A1 * | 10/2006 | Schutz | | A61B 6/542 |
| | | | | | 378/165 |
| 2008/0079830 | A1 * | 4/2008 | Lepage | | H04N 25/768 |
| | | | | | 348/E5.091 |
| 2009/0009645 | A1 | 1/2009 | Schrey et al. | | |
| 2009/0190021 | A1 | 7/2009 | Nitta et al. | | |
| 2009/0256735 | A1 * | 10/2009 | Bogaerts | | H04N 25/616 |
| | | | | | 341/169 |
| 2010/0213351 | A1 * | 8/2010 | Iwamoto | | H04N 25/65 |
| | | | | | 250/208.1 |
| 2011/0095926 | A1 | 4/2011 | Bogaerts | | |
| 2013/0032728 | A1 * | 2/2013 | Matoba | | G01N 23/083 |
| | | | | | 250/394 |
| 2013/0062505 | A1 * | 3/2013 | Masuda | | H04N 25/778 |
| | | | | | 250/208.1 |
| 2013/0195244 | A1 * | 8/2013 | Hosokawa | | G01N 23/087 |
| | | | | | 378/53 |
| 2013/0202087 | A1 * | 8/2013 | Cox | | G01N 23/04 |
| | | | | | 378/62 |
| 2013/0216024 | A1 * | 8/2013 | Matoba | | G01N 23/04 |
| | | | | | 378/62 |
| 2013/0334399 | A1 | 12/2013 | Dupont | | |
| 2016/0206256 | A1 * | 7/2016 | Berglund | | G01T 1/2985 |
| 2017/0031054 | A1 * | 2/2017 | Matoba | | G01N 23/04 |
| 2017/0115406 | A1 * | 4/2017 | Li | | G01T 1/20181 |
| 2018/0202947 | A1 * | 7/2018 | Urano | | G01N 23/18 |
| 2019/0335117 | A1 * | 10/2019 | Tang | | H04N 25/77 |
| 2020/0241150 | A1 | 7/2020 | Ikeda et al. | | |
| 2021/0096061 | A1 * | 4/2021 | Hill | | G01B 11/25 |
| 2022/0295000 | A1 * | 9/2022 | Yamazaki | | H04N 25/772 |
| 2022/0295004 | A1 * | 9/2022 | Yamazaki | | H04N 25/78 |
| 2023/0092006 | A1 * | 3/2023 | Jiang | | G02B 21/367 |
| | | | | | 250/458.1 |
| 2023/0300496 | A1 * | 9/2023 | Matsumoto | | H04N 1/03 |
| 2023/0366836 | A1 * | 11/2023 | Baba | | G01N 23/044 |
| 2024/0323565 | A1 * | 9/2024 | Takatsuka | | H04N 25/768 |

FOREIGN PATENT DOCUMENTS

| | | |
|---|---|---|
| JP | 2012-120153 A | 6/2012 |
| JP | 2016-538774 A | 12/2016 |
| JP | 2019-158663 A | 9/2019 |
| JP | 2020-143922 A | 9/2020 |
| KR | 20070105873 A | 10/2007 |
| KR | 2021-0084202 A | 7/2021 |
| WO | 2015/069440 A1 | 5/2015 |

OTHER PUBLICATIONS

Extended European Search Report issued on Jan. 29, 2025 in corresponding European patent application 22841749.9 (11 pages).

* cited by examiner

Fig.9

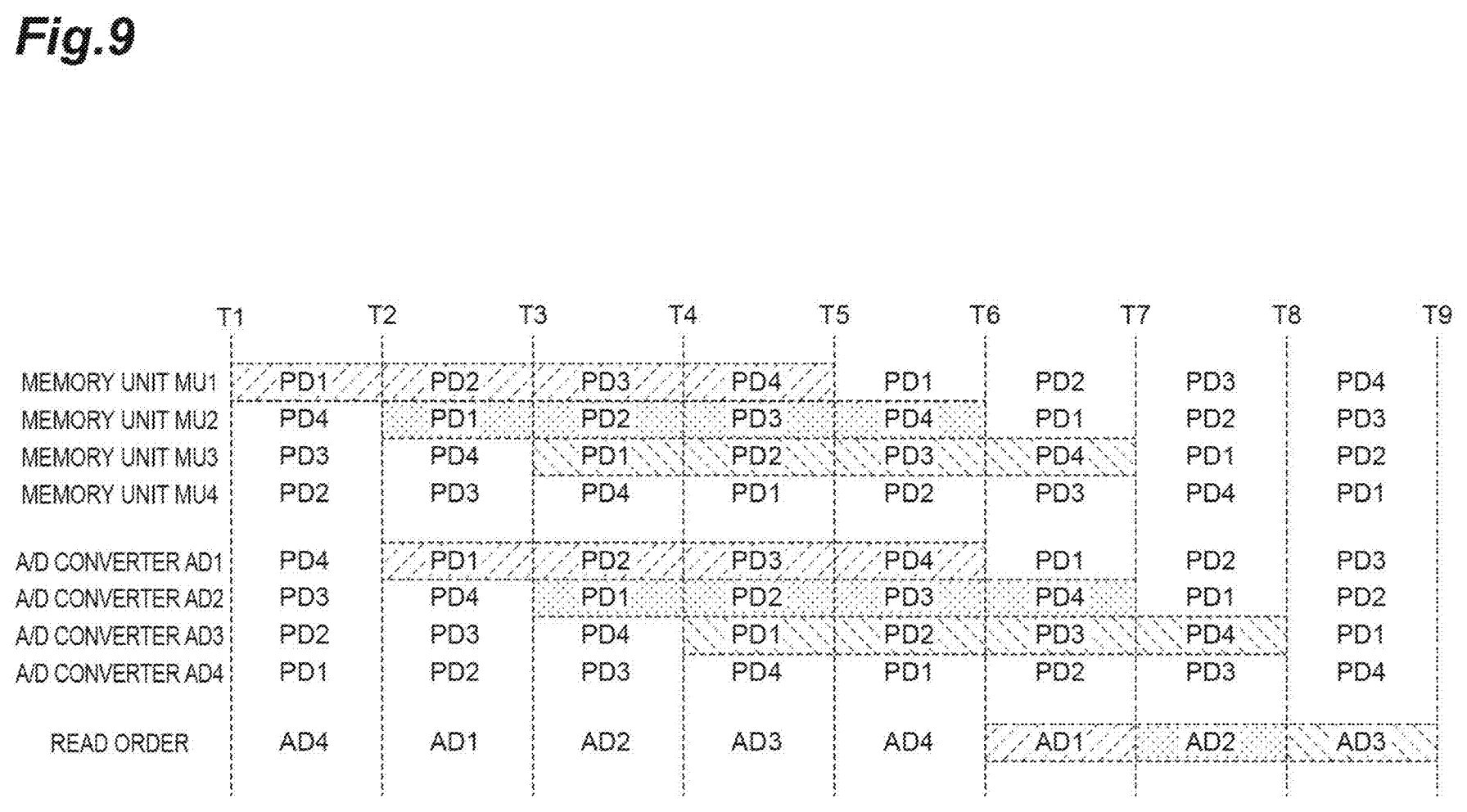

| | T1 | T2 | T3 | T4 | T5 | T6 | T7 | T8 | T9 |
|---|---|---|---|---|---|---|---|---|---|
| MEMORY UNIT MU1 | PD1 | PD2 | PD3 | PD4 | PD1 | PD2 | PD3 | PD4 | |
| MEMORY UNIT MU2 | PD4 | PD1 | PD2 | PD3 | PD4 | PD1 | PD2 | PD3 | |
| MEMORY UNIT MU3 | PD3 | PD4 | PD1 | PD2 | PD3 | PD4 | PD1 | PD2 | |
| MEMORY UNIT MU4 | PD2 | PD3 | PD4 | PD1 | PD2 | PD3 | PD4 | PD1 | |
| A/D CONVERTER AD1 | PD4 | PD1 | PD2 | PD3 | PD4 | PD1 | PD2 | PD3 | |
| A/D CONVERTER AD2 | PD3 | PD4 | PD1 | PD2 | PD3 | PD4 | PD1 | PD2 | |
| A/D CONVERTER AD3 | PD2 | PD3 | PD4 | PD1 | PD2 | PD3 | PD4 | PD1 | |
| A/D CONVERTER AD4 | PD1 | PD2 | PD3 | PD4 | PD1 | PD2 | PD3 | PD4 | |
| READ ORDER | AD4 | AD1 | AD2 | AD3 | AD4 | AD1 | AD2 | AD3 | |

*Fig.11*

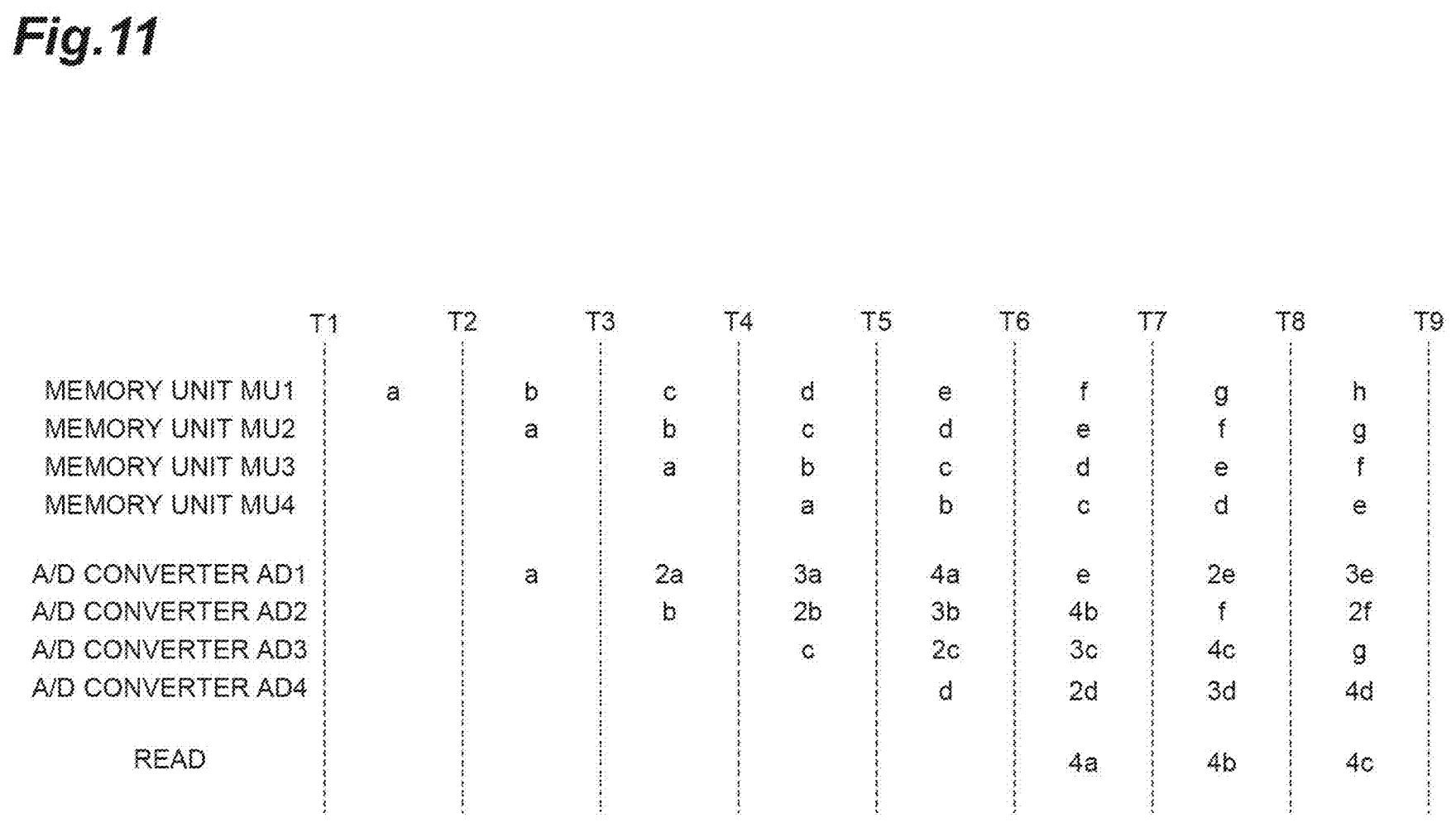

| | T1 | T2 | T3 | T4 | T5 | T6 | T7 | T8 | T9 |
|---|---|---|---|---|---|---|---|---|---|
| MEMORY UNIT MU1 | | a | b | c | d | e | f | g | h |
| MEMORY UNIT MU2 | | | a | b | c | d | e | f | g |
| MEMORY UNIT MU3 | | | | a | b | c | d | e | f |
| MEMORY UNIT MU4 | | | | | a | b | c | d | e |
| A/D CONVERTER AD1 | | | a | 2a | 3a | 4a | e | 2e | 3e |
| A/D CONVERTER AD2 | | | | b | 2b | 3b | 4b | f | 2f |
| A/D CONVERTER AD3 | | | | | c | 2c | 3c | 4c | g |
| A/D CONVERTER AD4 | | | | | | d | 2d | 3d | 4d |
| READ | | | | | | | 4a | 4b | 4c |

*Fig.25*

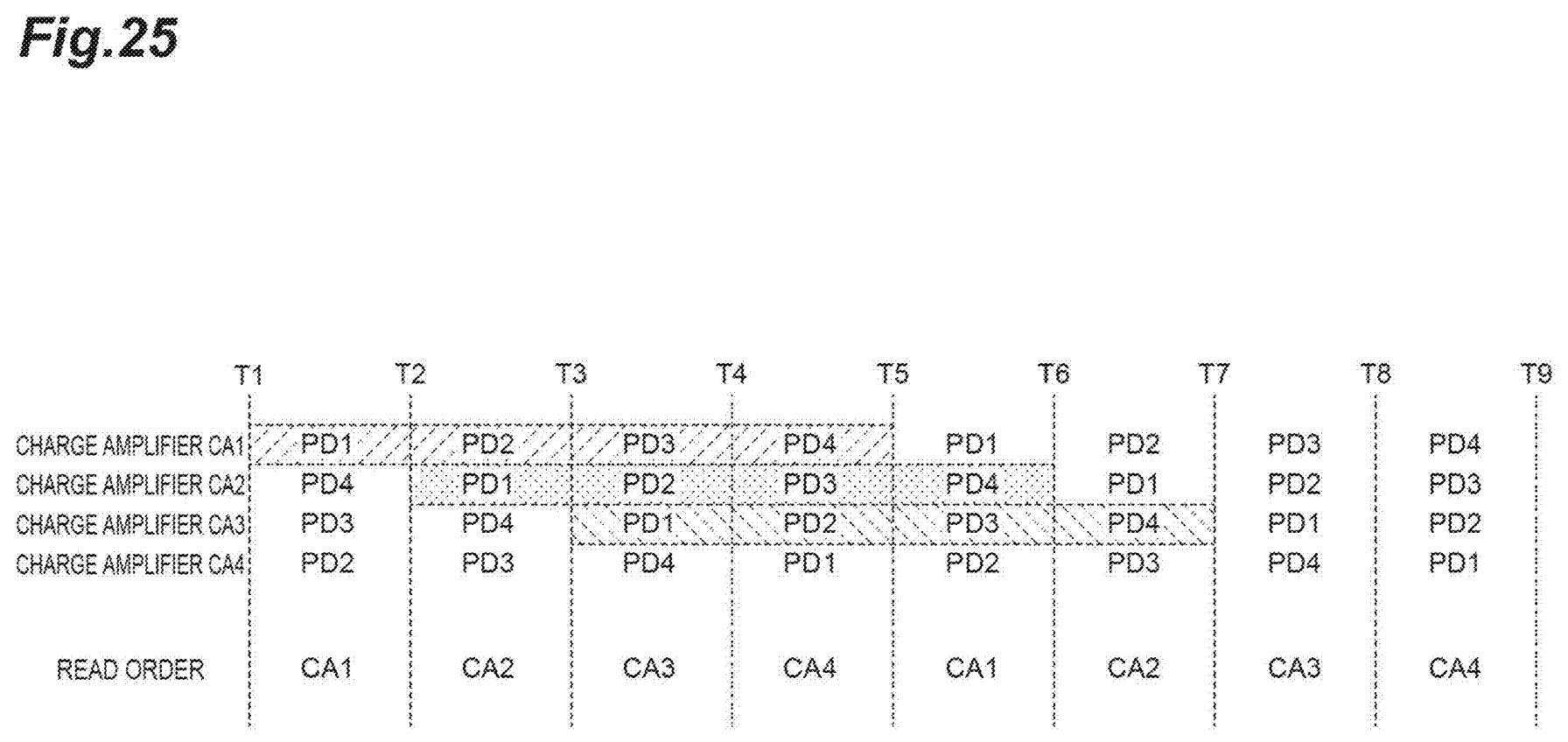

| | T1 | T2 | T3 | T4 | T5 | T6 | T7 | T8 | T9 |
|---|---|---|---|---|---|---|---|---|---|
| CHARGE AMPLIFIER CA1 | PD1 | PD2 | PD3 | PD4 | PD1 | PD2 | PD3 | PD4 | |
| CHARGE AMPLIFIER CA2 | PD4 | PD1 | PD2 | PD3 | PD4 | PD1 | PD2 | PD3 | |
| CHARGE AMPLIFIER CA3 | PD3 | PD4 | PD1 | PD2 | PD3 | PD4 | PD1 | PD2 | |
| CHARGE AMPLIFIER CA4 | PD2 | PD3 | PD4 | PD1 | PD2 | PD3 | PD4 | PD1 | |
| READ ORDER | CA1 | CA2 | CA3 | CA4 | CA1 | CA2 | CA3 | CA4 | |

*Fig.27*

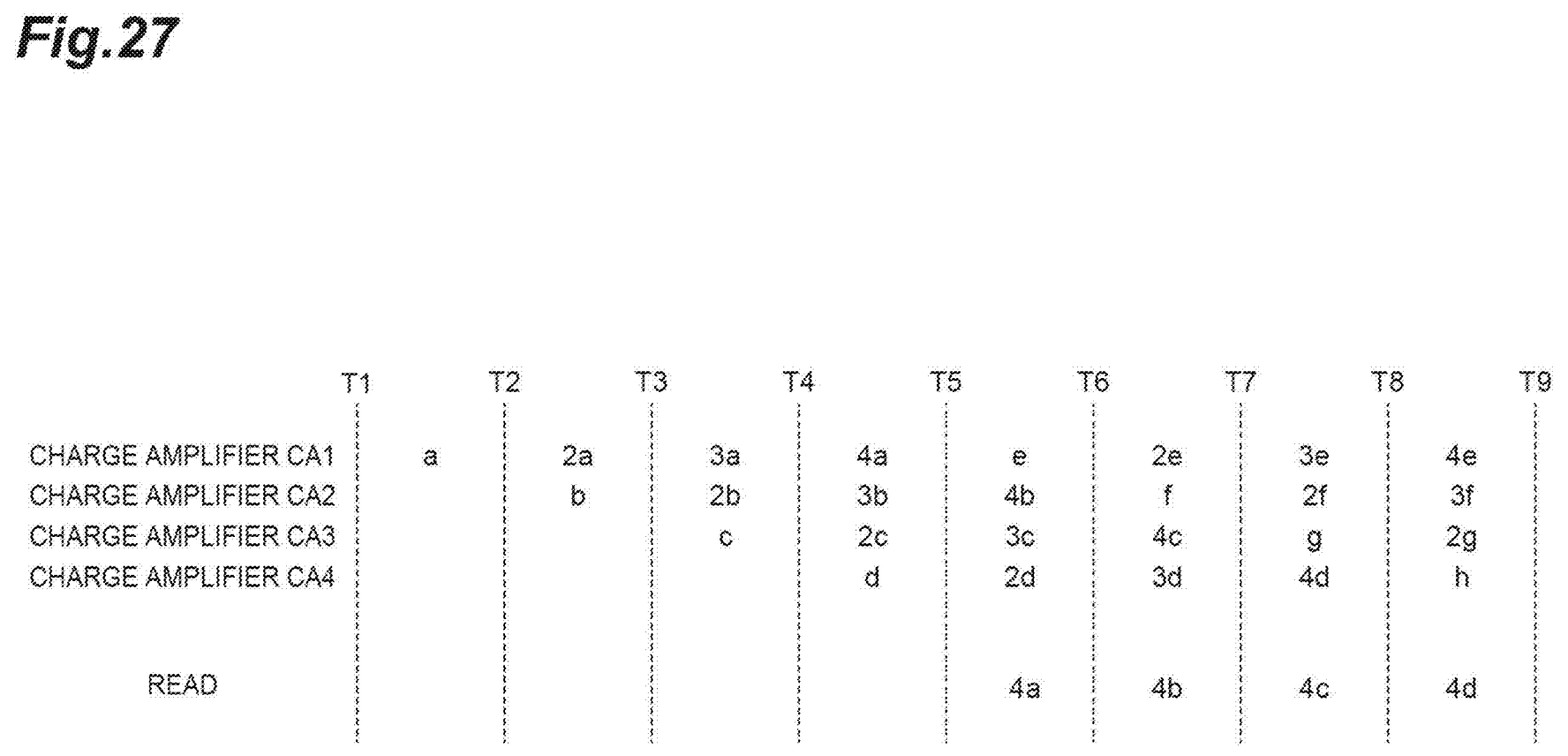

| | T1 | T2 | T3 | T4 | T5 | T6 | T7 | T8 | T9 |
|---|---|---|---|---|---|---|---|---|---|
| CHARGE AMPLIFIER CA1 | | a | 2a | 3a | 4a | e | 2e | 3e | 4e |
| CHARGE AMPLIFIER CA2 | | | b | 2b | 3b | 4b | f | 2f | 3f |
| CHARGE AMPLIFIER CA3 | | | | c | 2c | 3c | 4c | g | 2g |
| CHARGE AMPLIFIER CA4 | | | | | d | 2d | 3d | 4d | h |
| READ | | | | | | 4a | 4b | 4c | 4d |

*Fig.34*

| | T1 | T2 | T3 | T4 | T5 | T6 | T7 | T8 | T9 | T10 | T11 | T12 | T13 |
|---|---|---|---|---|---|---|---|---|---|---|---|---|---|
| PIXEL PORTION PD1 | a | b | c | d | e | f | g | h | i | j | k | l | |
| PIXEL PORTION PD2 | | a | b | c | d | e | f | g | h | i | j | k | |
| PIXEL PORTION PD3 | | | a | b | c | d | e | f | g | h | i | j | |
| PIXEL PORTION PD4 | | | | a | b | c | d | e | f | g | h | i | |
| PIXEL PORTION PD5 | | | | | a | b | c | d | e | f | g | h | |
| PIXEL PORTION PD6 | | | | | | a | b | c | d | e | f | g | |
| PIXEL PORTION PD7 | | | | | | | a | b | c | d | e | f | |
| PIXEL PORTION PD8 | | | | | | | | a | b | c | d | e | |
| ADDING SECTION AN1 | | a | 2a | 3a | 4a | 5a | 6a | 7a | 8a | i | 2i | 3i | |
| ADDING SECTION AN2 | | | b | 2b | 3b | 4b | 5b | 6b | 7b | 8b | j | 2j | |
| ADDING SECTION AN3 | | | | c | 2c | 3c | 4c | 5c | 6c | 7c | 8c | k | |
| ADDING SECTION AN4 | | | | | d | 2d | 3d | 4d | 5d | 6d | 7d | 8d | |
| ADDING SECTION AN5 | | | | | | e | 2e | 3e | 4e | 5e | 6e | 7e | |
| ADDING SECTION AN6 | | | | | | | f | 2f | 3f | 4f | 5f | 6f | |
| ADDING SECTION AN7 | | | | | | | | g | 2g | 3g | 4g | 5g | |
| ADDING SECTION AN8 | | | | | | | | | h | 2h | 3h | 4h | |
| READ | | | | | | | | | | 8a | 8b | 8c | |

SWITCH CIRCUIT:
PD1⇒AN1

SWITCH CIRCUIT:
PD1⇒AN2
PD2⇒AN1

SWITCH CIRCUIT:
PD1⇒AN3
PD2⇒AN2
PD3⇒AN1

SWITCH CIRCUIT:
PD1⇒AN4
PD2⇒AN3
PD3⇒AN2
PD4⇒AN1

*Fig.36*
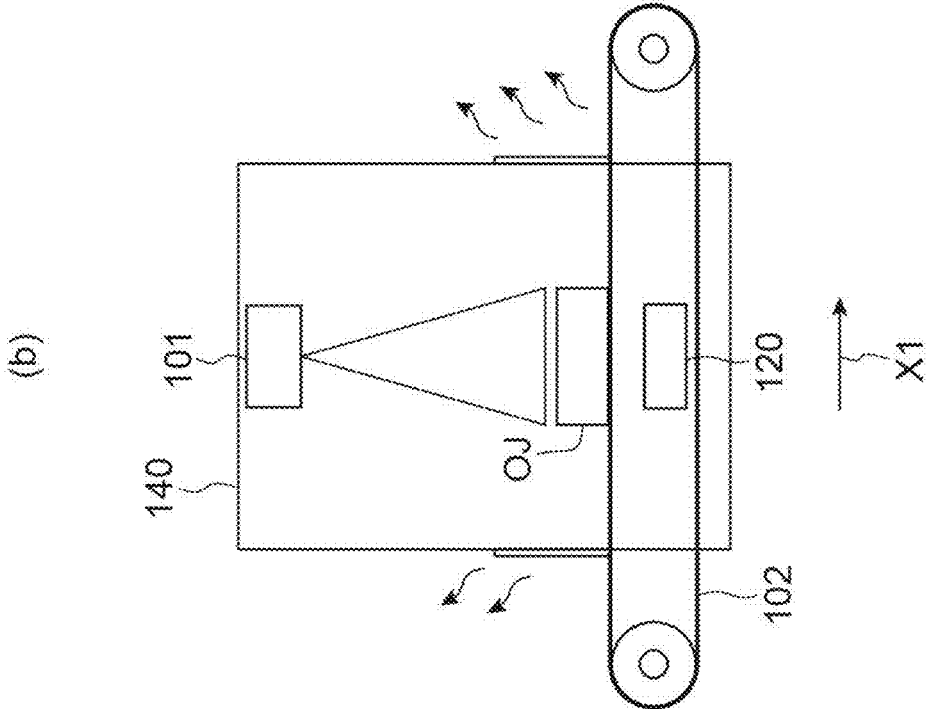
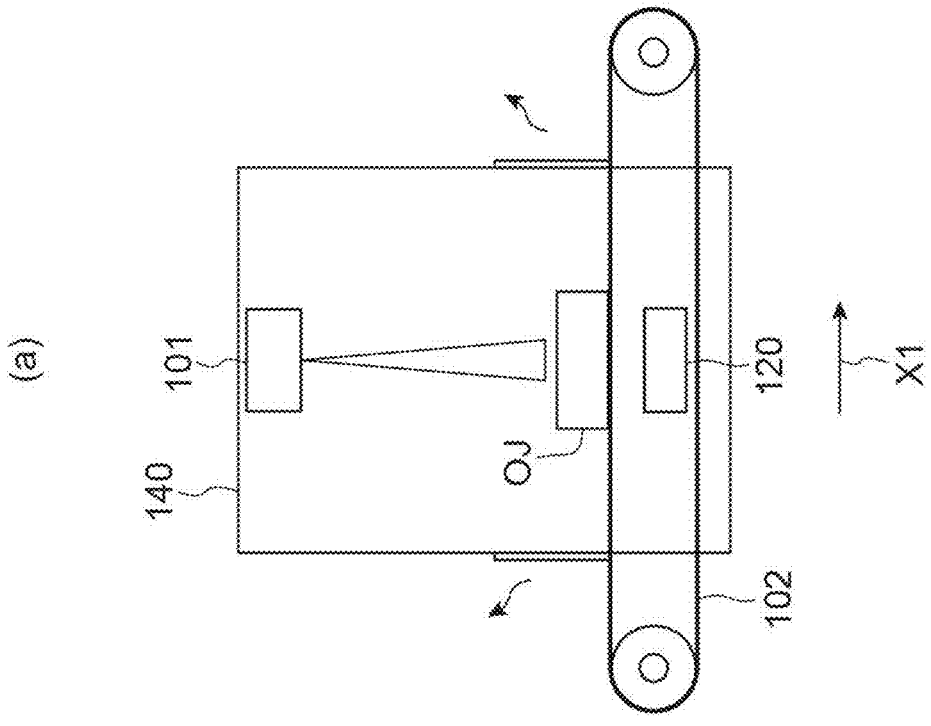

*Fig.37*
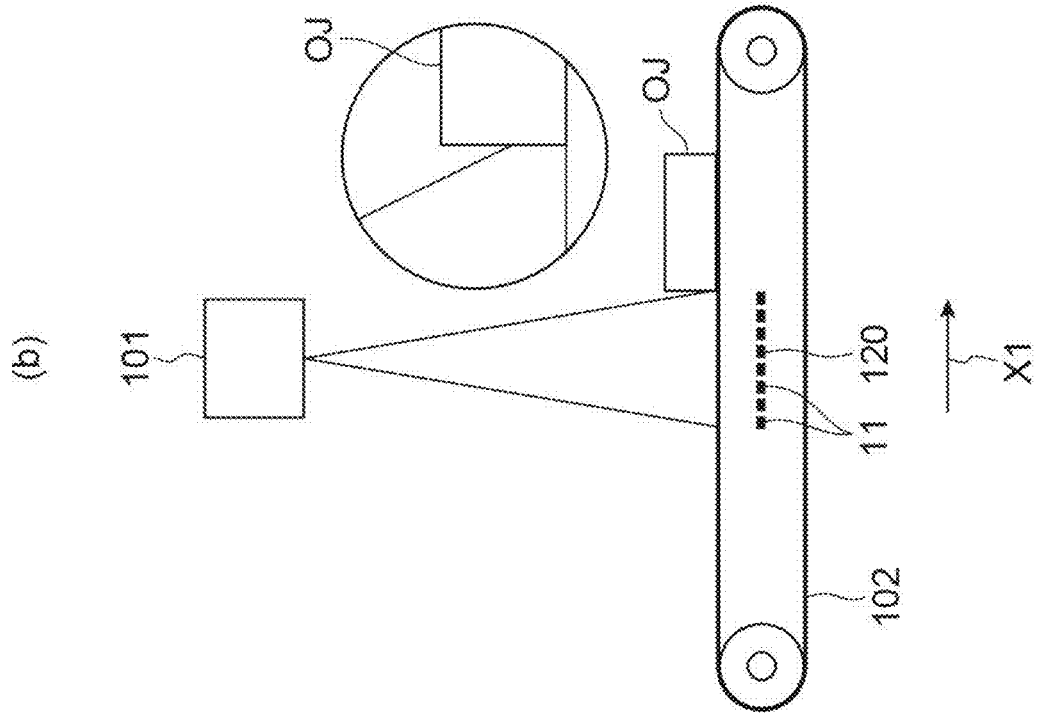
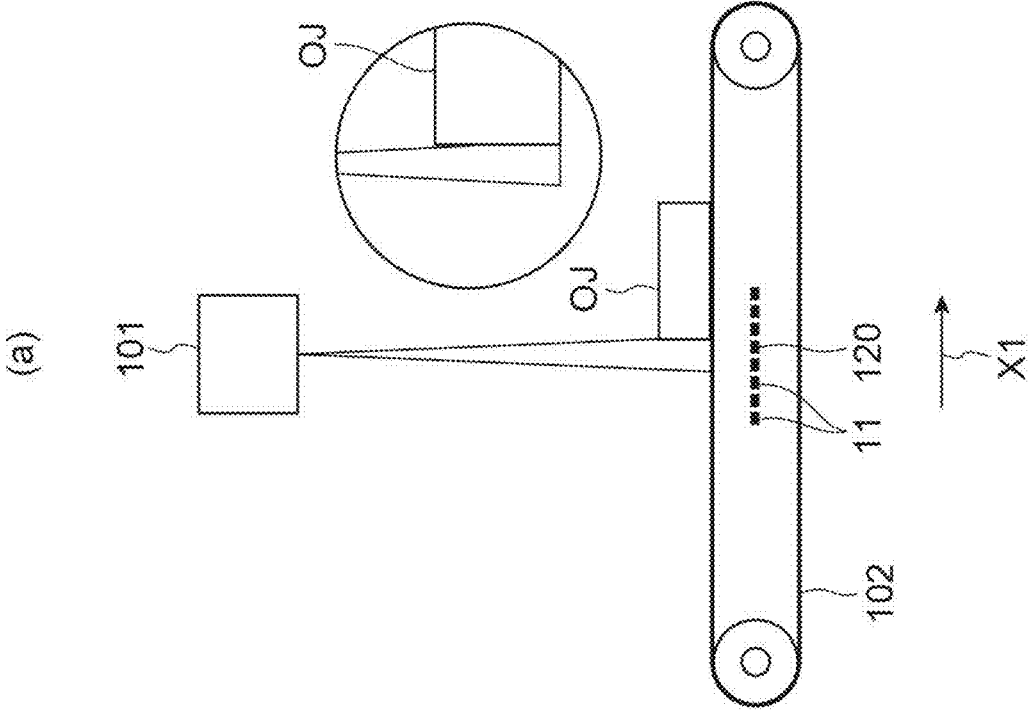

*Fig.40*
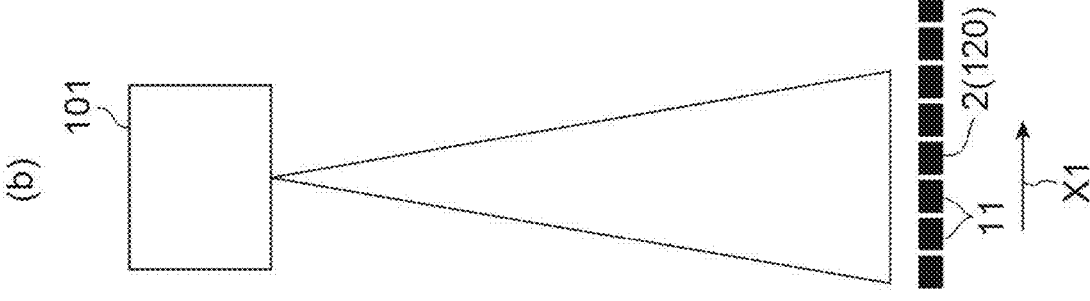
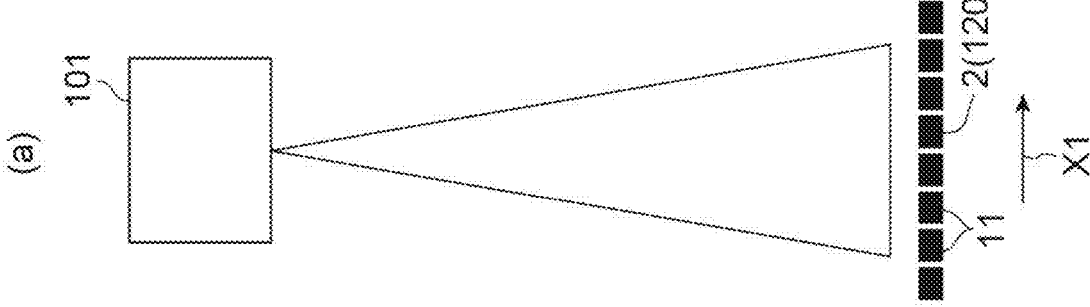

*Fig.43*

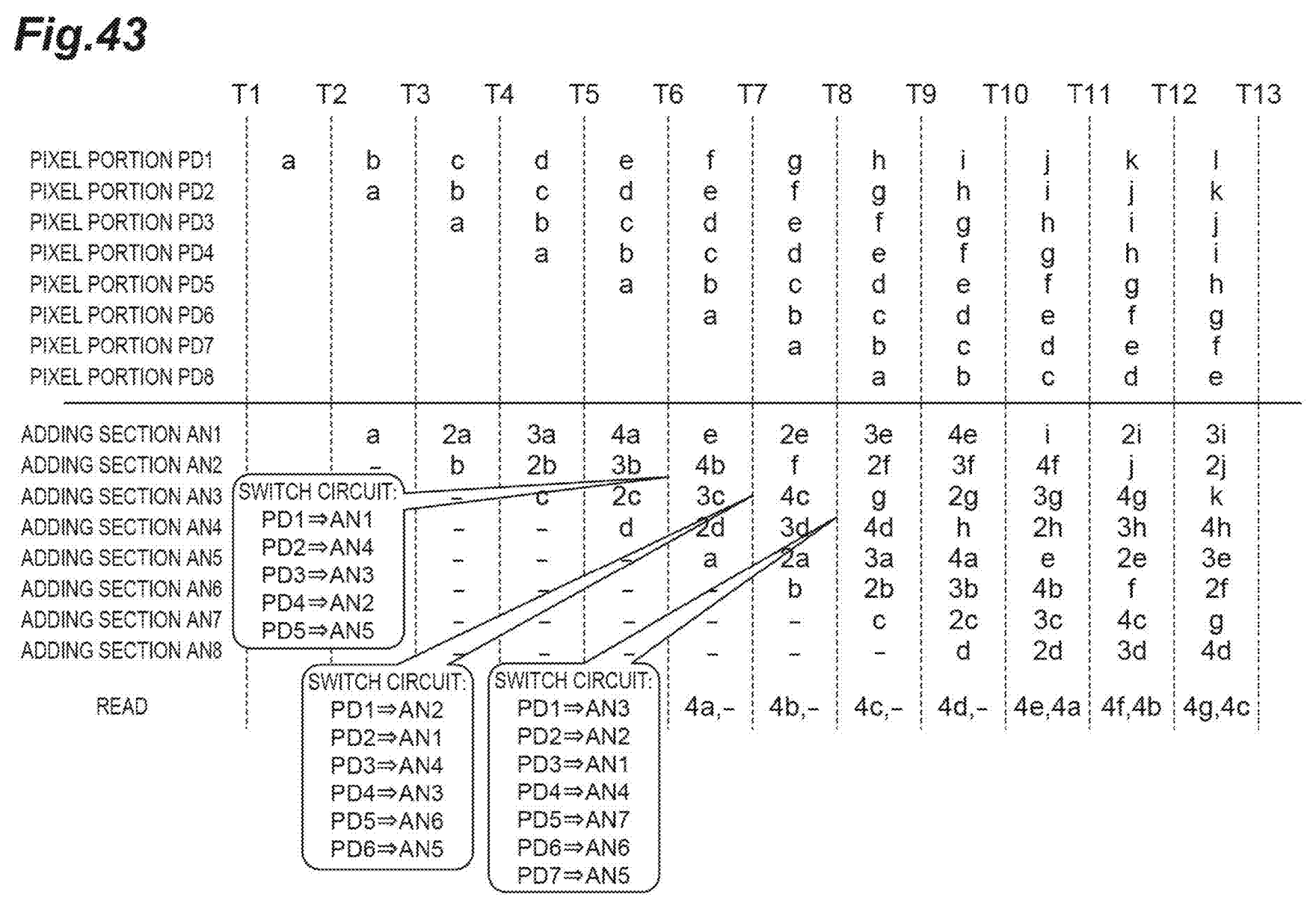

| | T1 | T2 | T3 | T4 | T5 | T6 | T7 | T8 | T9 | T10 | T11 | T12 | T13 |
|---|---|---|---|---|---|---|---|---|---|---|---|---|---|
| PIXEL PORTION PD1 | | a | b | c | d | e | f | g | h | i | j | k | l |
| PIXEL PORTION PD2 | | | a | b | c | d | e | f | g | h | i | j | k |
| PIXEL PORTION PD3 | | | | a | b | c | d | e | f | g | h | i | j |
| PIXEL PORTION PD4 | | | | | a | b | c | d | e | f | g | h | i |
| PIXEL PORTION PD5 | | | | | | a | b | c | d | e | f | g | h |
| PIXEL PORTION PD6 | | | | | | | a | b | c | d | e | f | g |
| PIXEL PORTION PD7 | | | | | | | | a | b | c | d | e | f |
| PIXEL PORTION PD8 | | | | | | | | | a | b | c | d | e |
| ADDING SECTION AN1 | | | a | 2a | 3a | 4a | e | 2e | 3e | 4e | i | 2i | 3i |
| ADDING SECTION AN2 | | | | b | 2b | 3b | 4b | f | 2f | 3f | 4f | j | 2j |
| ADDING SECTION AN3 | | | | | c | 2c | 3c | 4c | g | 2g | 3g | 4g | k |
| ADDING SECTION AN4 | | | | | | d | 2d | 3d | 4d | h | 2h | 3h | 4h |
| ADDING SECTION AN5 | | | | | | | a | 2a | 3a | 4a | e | 2e | 3e |
| ADDING SECTION AN6 | | | | | | | | b | 2b | 3b | 4b | f | 2f |
| ADDING SECTION AN7 | | | | | | | | | c | 2c | 3c | 4c | g |
| ADDING SECTION AN8 | | | | | | | | | | d | 2d | 3d | 4d |
| READ | | | | | | | 4a,- | 4b,- | 4c,- | 4d,- | 4e,4a | 4f,4b | 4g,4c |

SWITCH CIRCUIT:
PD1⇒AN1
PD2⇒AN4
PD3⇒AN3
PD4⇒AN2
PD5⇒AN5

SWITCH CIRCUIT:
PD1⇒AN2
PD2⇒AN1
PD3⇒AN4
PD4⇒AN3
PD5⇒AN6
PD6⇒AN5

SWITCH CIRCUIT:
PD1⇒AN3
PD2⇒AN2
PD3⇒AN1
PD4⇒AN4
PD5⇒AN7
PD6⇒AN6
PD7⇒AN5

*Fig.46*

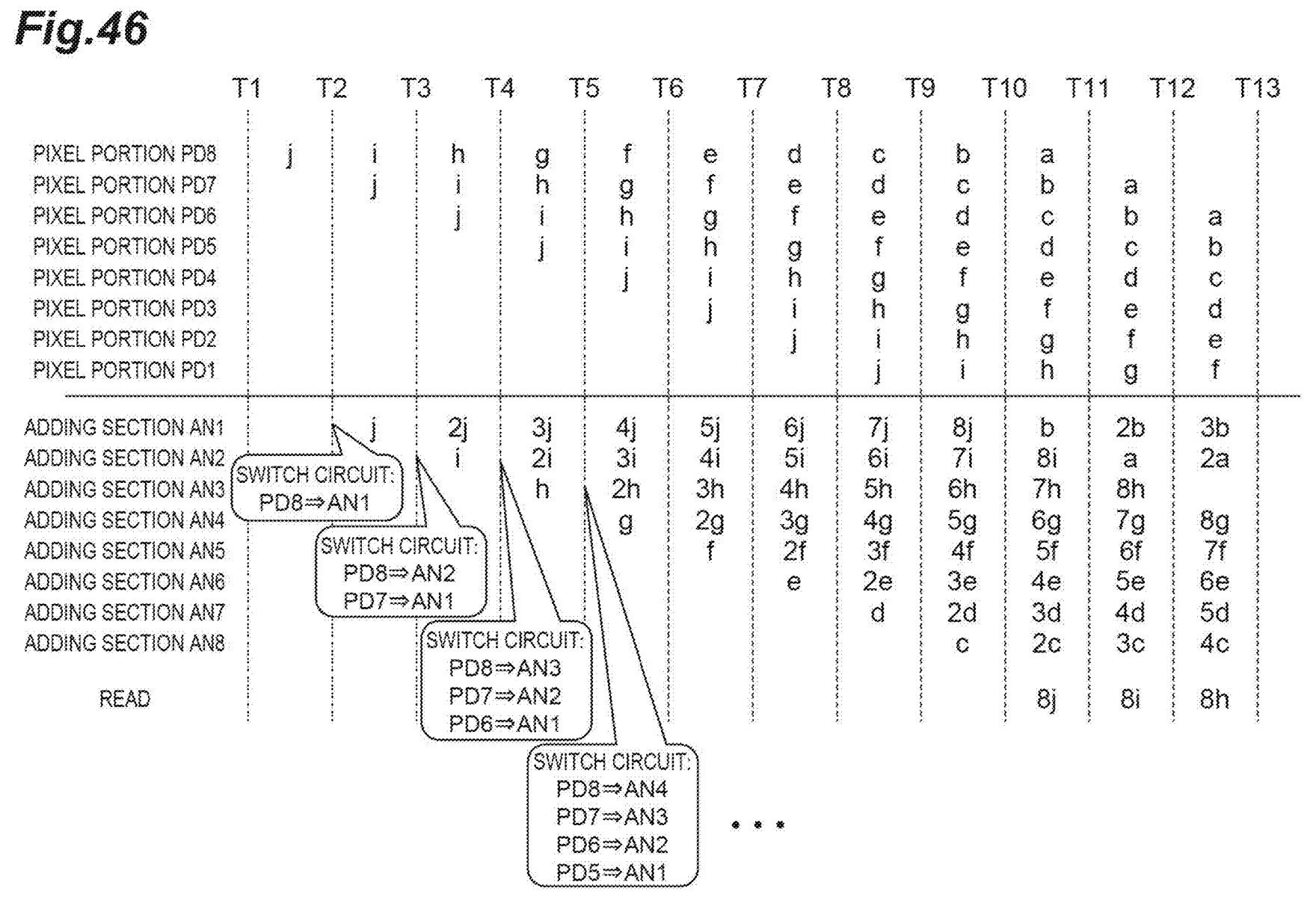

| | T1 | T2 | T3 | T4 | T5 | T6 | T7 | T8 | T9 | T10 | T11 | T12 | T13 |
|---|---|---|---|---|---|---|---|---|---|---|---|---|---|
| PIXEL PORTION PD8 | j | i | h | g | f | e | d | c | b | a | a | a | |
| PIXEL PORTION PD7 | | j | i | h | g | f | e | d | c | b | b | b | |
| PIXEL PORTION PD6 | | | j | i | h | g | f | e | d | c | c | c | |
| PIXEL PORTION PD5 | | | | j | i | h | g | f | e | d | d | d | |
| PIXEL PORTION PD4 | | | | | j | i | h | g | f | e | e | e | |
| PIXEL PORTION PD3 | | | | | | j | i | h | g | f | f | f | |
| PIXEL PORTION PD2 | | | | | | | j | i | h | g | g | | |
| PIXEL PORTION PD1 | | | | | | | | j | i | h | | | |
| ADDING SECTION AN1 | | | | 2j | 3j | 4j | 5j | 6j | 7j | 8j | b | 2b | 3b |
| ADDING SECTION AN2 | | | | i | 2i | 3i | 4i | 5i | 6i | 7i | 8i | a | 2a |
| ADDING SECTION AN3 | | | | | h | 2h | 3h | 4h | 5h | 6h | 7h | 8h | 8g |
| ADDING SECTION AN4 | | | | | | g | 2g | 3g | 4g | 5g | 6g | 7g | 7f |
| ADDING SECTION AN5 | | | | | | | f | 2f | 3f | 4f | 5f | 6f | 6e |
| ADDING SECTION AN6 | | | | | | | | e | 2e | 3e | 4e | 5e | 5d |
| ADDING SECTION AN7 | | | | | | | | | d | 2d | 3d | 4d | 4c |
| ADDING SECTION AN8 | | | | | | | | | | c | 2c | 3c | |
| READ | | | | | | | | | | | 8j | 8i | 8h |

SWITCH CIRCUIT:
PD8⇒AN1

SWITCH CIRCUIT:
PD8⇒AN2
PD7⇒AN1

SWITCH CIRCUIT:
PD8⇒AN3
PD7⇒AN2
PD6⇒AN1

SWITCH CIRCUIT:
PD8⇒AN4
PD7⇒AN3
PD6⇒AN2
PD5⇒AN1

Fig.47

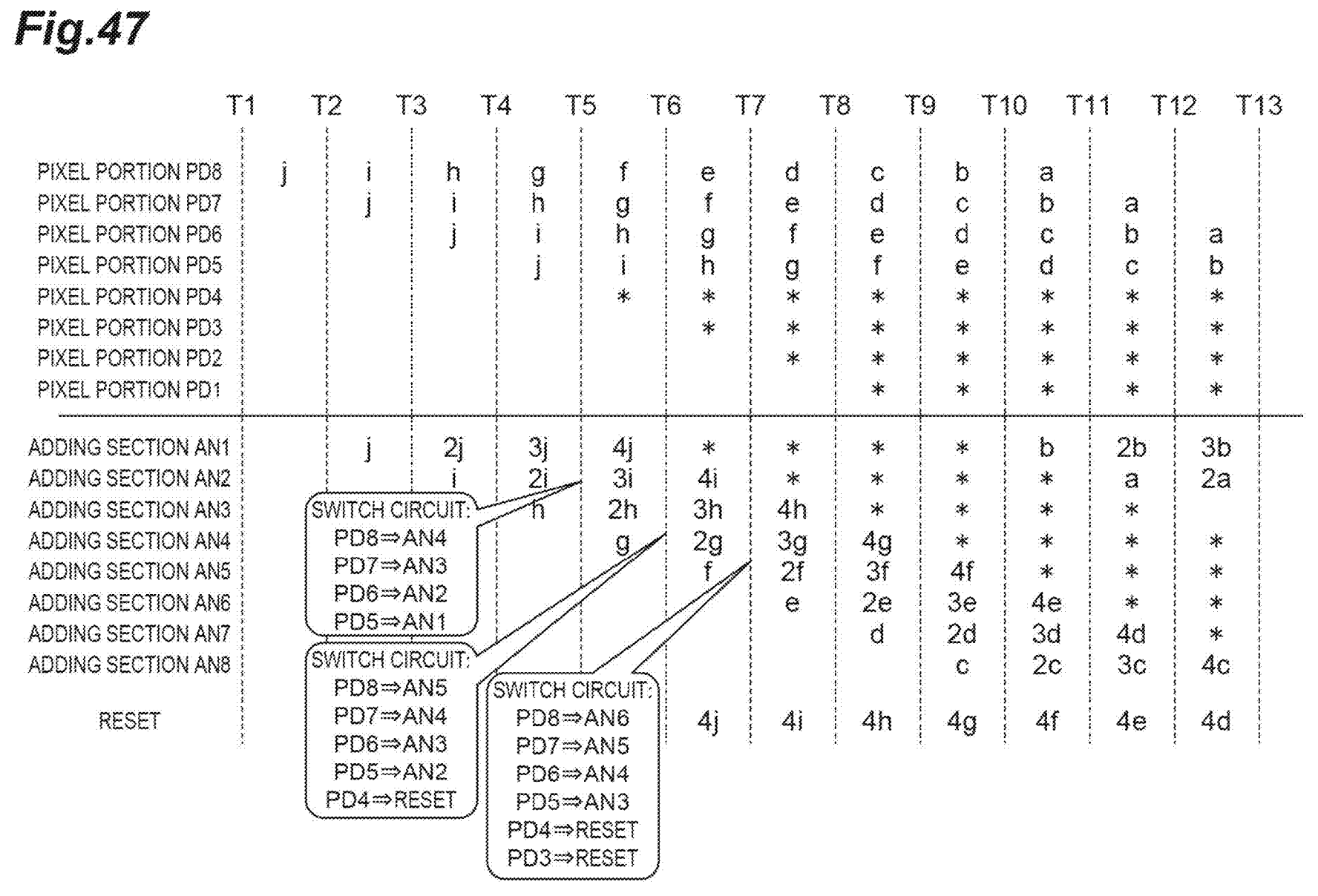

| | T1 | T2 | T3 | T4 | T5 | T6 | T7 | T8 | T9 | T10 | T11 | T12 | T13 |
|---|---|---|---|---|---|---|---|---|---|---|---|---|---|
| PIXEL PORTION PD8 | | j | i | h | g | f | e | d | c | b | a | a | |
| PIXEL PORTION PD7 | | | j | i | h | g | f | e | d | c | b | b | |
| PIXEL PORTION PD6 | | | | j | i | h | g | f | e | d | c | * | |
| PIXEL PORTION PD5 | | | | | j | i | h | g | f | e | * | * | |
| PIXEL PORTION PD4 | | | | | | j | i | h | g | * | * | * | |
| PIXEL PORTION PD3 | | | | | | * | j | i | * | * | * | | |
| PIXEL PORTION PD2 | | | | | | | * | j | * | * | | | |
| PIXEL PORTION PD1 | | | | | | | | * | * | | | | |
| ADDING SECTION AN1 | | | 2j | 3j | 4j | * | * | * | * | b | 2b | 3b | |
| ADDING SECTION AN2 | | | i | 2i | 3i | 4i | * | * | * | * | a | 2a | |
| ADDING SECTION AN3 | | | | h | 2h | 3h | 4h | 4g | * | * | * | * | |
| ADDING SECTION AN4 | | | | | g | 2g | 3g | 4g | 4f | * | * | * | |
| ADDING SECTION AN5 | | | | | | f | 2f | 3f | 4f | 4e | * | * | |
| ADDING SECTION AN6 | | | | | | | e | 2e | 3e | 4e | 4d | * | |
| ADDING SECTION AN7 | | | | | | | | d | 2d | 3d | 4d | 4c | |
| ADDING SECTION AN8 | | | | | | | | | c | 2c | 3c | 4c | |
| RESET | | | | | | 4j | 4i | 4h | 4g | 4f | 4e | 4d | |

SWITCH CIRCUIT:
PD8⇒AN4
PD7⇒AN3
PD6⇒AN2
PD5⇒AN1

SWITCH CIRCUIT:
PD8⇒AN5
PD7⇒AN4
PD6⇒AN3
PD5⇒AN2
PD4⇒RESET

SWITCH CIRCUIT:
PD8⇒AN6
PD7⇒AN5
PD6⇒AN4
PD5⇒AN3
PD4⇒RESET
PD3⇒RESET

X-RAY IMAGE ACQUISITION DEVICE AND X-RAY IMAGE ACQUISITION SYSTEM

TECHNICAL FIELD

One aspect of the present disclosure relates to an X-ray image acquisition device and an X-ray image acquisition system.

BACKGROUND ART

An X-ray image acquisition device that acquires an X-ray image of an object being transported is known (see Patent Literature 1, for example). For example, in the inspection device described in Patent Literature 1, a TDI (time delay integration) operation, which was conventionally realized using a CCD (charge coupled device) sensor, is realized using a CMOS (complementary metal oxide semiconductor) sensor. This X-ray image acquisition device includes a detection means formed by arranging a plurality of line sensors each including a plurality of detection elements and a storage means for storing a digital signal output from each detection element, and the TDI operation is realized by performing an addition operation in the storage means.

CITATION LIST

Patent Literature

Patent Literature 1: Japanese Unexamined Patent Publication No. 2019-158663

SUMMARY OF INVENTION

Technical Problem

In the inspection device described in Patent Literature 1, depending on the number of detection elements, the speed of the addition operation in the storage means may not meet the requirements. For this reason, there is a possibility that the TDI operation cannot be realized. In addition, the above-described X-ray image acquisition device is required to have a simplified configuration or a reduced circuit size.

Therefore, it is an object of one aspect of the present disclosure to provide an X-ray image acquisition device and an X-ray image acquisition system that can realize a TDI operation even when the number of pixel portions increases and can have a simplified configuration and a reduced circuit size.

Solution to Problem

An X-ray image acquisition device according to one aspect of the present disclosure is an X-ray image acquisition device for acquiring an X-ray image of an object transported along a first direction, and includes: a pixel unit having M (M is an integer of 2 or more) pixel arrays each including N (N is an integer of 2 or more) pixel portions for detecting X-rays, the N pixel portions being arranged along the first direction and the M pixel arrays being arranged along a second direction perpendicular to the first direction; M circuit units provided corresponding to the M pixel arrays; and a control unit that controls the M circuit units. Each of the M circuit units includes: T (T is an integer of N or more) adding sections that sequentially add electrical signals corresponding to output signals from the N pixel portions of the corresponding pixel array; and a switch section for switching connection states between the N pixel portions and the T adding sections. For each of the M circuit units, the control unit switches the connection states between the N pixel portions and the T adding sections in synchronization with transportation of the object along the first direction so that the electrical signals corresponding to the output signals output from the pixel portions by detecting X-rays transmitted through the same region of the object are added by the same adding sections.

In this X-ray image acquisition device, each of the M circuit units includes T adding sections and a switch section. Then, in each of the M circuit units, the connection states between the N pixel portions and the T adding sections are switched in synchronization with the transportation of the object along the first direction so that the electrical signals corresponding to the output signals output from the pixel portions by detecting X-rays transmitted through the same region of the object are added by the same adding sections, thereby realizing the TDI operation. By realizing the TDI operation by addition processing in the circuit unit as described above, it is possible to avoid the problem of the speed of the addition operation in the storage means described above. Therefore, it is possible to realize the TDI operation even when the number of pixel portions increases. In addition, since a memory such as the storage means described above can be omitted, the configuration can be simplified. In addition, in this X-ray image acquisition device, the TDI operation is realized by switching the connection state between the pixel section and the adding section using the switch section. Therefore, the circuit size can be reduced as compared with a case where a memory for simply adding signals is provided in the circuit unit, for example. As a result, according to this X-ray image acquisition device, the TDI operation can be realized even when the number of pixel portions increases, and the configuration can be simplified and the circuit size can be reduced.

The X-ray image acquisition device according to one aspect of the present disclosure may further include at least one scintillator for converting X-rays transmitted through the object into scintillation light, and the N pixel portions may receive the scintillation light converted by the at least one scintillator. In this case, X-rays can be detected after being converted into scintillation light.

Each of the T adding sections may be an A/D converter (Analog-to-Digital converter). In this case, the TDI operation can be realized using an A/D converter.

Each of the T adding sections may be a charge amplifier. In this case, the TDI operation can be realized using a charge amplifier.

Between the pixel unit and the M circuit units, there may be a gap of twice or more a width of the pixel portion. In this case, it is possible to suppress the incidence of X-rays on the circuit unit having lower durability against X-rays than the pixel unit.

The X-ray image acquisition device according to one aspect of the present disclosure may further include a shielding member having an impermeablity with X-rays. An opening may be formed in the shielding member. The pixel unit may face the opening, and the M circuit units may face a portion of the shielding member other than the opening. In this case, it is possible to suppress the incidence of X-rays on the circuit unit while allowing the incidence of X-rays on the pixel unit.

The X-ray image acquisition device of the present invention may further include N×M wirings electrically connected to the N pixel portions of each of the M pixel arrays and the M circuit units. Each of the N×M wirings may extend so as to pass over the N pixel portions. In this case, since the N wirings are not concentrated between the M pixel arrays aligned in the second direction, it is possible to avoid localized generation of a dead portion.

Each of the N×M wirings may include a main body portion extending from the circuit unit to the pixel portion and an extending portion extending from a connection point between the main body portion and the pixel portion to a side opposite to the circuit unit. The extending portion may be electrically isolated from the main body portion. In this case, the aperture ratio of the N pixel portions can be made uniform, and the occurrence of parasitic capacitance due to the extending portion can be suppressed.

The control unit may control the M circuit units so that the electrical signals are read from the adding sections after the electrical signals corresponding to the output signals from the L pixel portions aligned in the first direction are added by the adding sections, and a value of L may be selectable from integers of 1 to N. In this case, the number of pixel portions for addition processing can be selected according to the amount of X-ray leakage or the thickness of the object, for example.

The control unit may control the M circuit units so that the electrical signals are read from the adding sections after the electrical signals corresponding to the output signals from the P-th to Q-th (P<Q) pixel portions in the first direction are added by the adding sections, and values of P and Q may be selectable from integers of 1 to N. In this case, for example, it is possible to cope with variations in the positional relationship between the X-ray source and the pixel unit.

The adding sections may include first adding sections and second adding sections. The control unit may control the M circuit units so that the electrical signals are read from the first adding sections after the electrical signals corresponding to the output signals from the pixel portions located in a first region in the first direction are added by the adding sections and the electrical signals are read from the adding sections after the electrical signals corresponding to the output signals from the pixel portions located in a second region aligned with the first region in the first direction are added by the second adding sections. In this case, for example, a dual mode can be realized. Therefore, it is possible to acquire a plurality of X-ray images in a single process.

Assuming that, in the first direction, a side where the first adding sections are located with respect to the second adding sections is a first side and a side where the second adding sections are located with respect to the first adding sections is a second side, the first adding sections may be arranged on the first side with respect to the first region, and the second adding sections may be arranged on the second side with respect to the second region. In this case, it is possible to reduce the lengths of wirings for connecting the pixel portions located in the first region to the first adding sections and the lengths of wirings for connecting the pixel portions located in the second region to the second adding sections.

An exposure time of each of the N pixel portions may be controlled independently of transportation of the object. An external signal used for synchronization with the transportation of the object may include jitter (fluctuations). If such an external signal is associated with the exposure time of the pixel portion, the exposure time may vary. In contrast, by controlling the exposure time of each of the N pixel portions independently of the transportation of the object, the exposure times of the N pixel portions can be made uniform.

ON/OFF of a line delay function may be changeable. When the line delay function is ON, exposure start timings of the N pixel portions may be shifted by a predetermined time in accordance with an arrangement order of the N pixel portions in the first direction. In this case, since the line delay function can be realized, it is possible to change the synchronization position in the height direction.

N may be an integer of 8 or more. According to this X-ray image acquisition device, even when the number of pixel portions is large like this, the TDI operation can be realized, and the configuration can be simplified and the circuit size can be reduced.

An X-ray image acquisition system according to one aspect of the present disclosure includes the X-ray image acquisition device described above; an X-ray source that outputs X-rays; and a transport unit that transports the object along the first direction. According to this X-ray image acquisition system, for the reasons described above, the TDI operation can be realized even when the number of pixel portions increases, and the configuration can be simplified and the circuit size can be reduced.

Advantageous Effects of Invention

According to one aspect of the present disclosure, it is possible to provide an X-ray image acquisition device and an X-ray image acquisition system that can realize the TDI operation even when the number of pixel portions increases and can have a simplified configuration and a reduced circuit size.

BRIEF DESCRIPTION OF DRAWINGS

FIG. 9 is a timing chart showing the operation of the imaging device according to the embodiment.

FIG. 11 is a diagram for explaining a TDI operation.

FIG. 25 is a timing chart showing the operation of the imaging device according to the third modification example.

FIG. 27 is a diagram for explaining a TDI operation in the third modification example.

FIG. 34 is a diagram for explaining a TDI operation in the second embodiment.

FIGS. 36(*a*) and 36(*b*) are diagrams for explaining a function of switching the number of frames to be added.

FIGS. 37(*a*) and 37(*b*) are diagrams for explaining a function of switching the number of frames to be added.

FIGS. 40(*a*) and 40(*b*) are diagrams for explaining an addition range switching function.

FIG. 43 is a diagram for explaining a TDI operation in the dual mode.

FIG. 46 is a diagram for explaining a TDI operation when the addition direction is reversed.

FIG. 47 is a diagram for explaining another example of the TDI operation when the addition direction is reversed.

DESCRIPTION OF EMBODIMENTS

Figure 1:
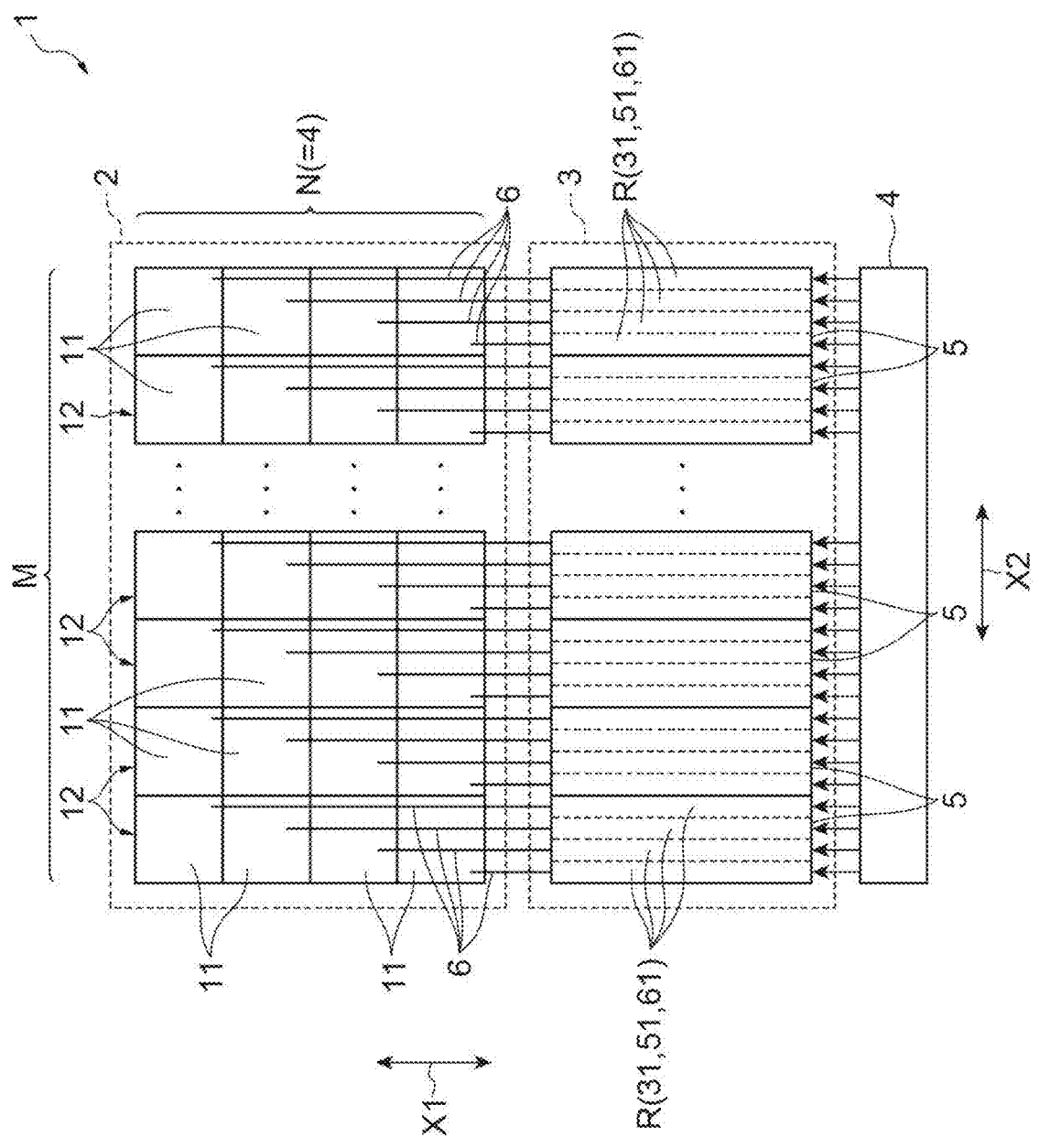
FIG. 1 is a plan view of an imaging device according to an embodiment.

Hereinafter, embodiments of the present disclosure will be described in detail with reference to the diagrams. In the following description, the same or equivalent elements are denoted by the same reference numerals, and repeated description thereof will be omitted.

First Embodiment

[Configuration of Imaging Device]

An imaging device 1 shown in FIG. 1 is, for example, a solid-state imaging device used in an X-ray image acquisition apparatus for acquiring an X-ray image of an object transported along the transport direction. In the X-ray image acquisition apparatus, for example, X-rays transmitted through the object are converted into scintillation light by a scintillator and the scintillation light is detected by the imaging device 1, thereby acquiring an X-ray image of the object. At this time, in order to improve the S/N ratio in the acquired image, a TDI (time delay integration) operation using the imaging device 1 is performed. The TDI operation will be described later.

As shown in FIG. 1, the imaging device 1 includes a pixel unit 2, a circuit section 3, and a decoder 4. The pixel unit 2, the circuit section 3, and the decoder 4 are integrally formed on one chip. The pixel unit 2 has M (M is an integer of 2 or more) pixel arrays 12 each including N (N is an integer of 2 or more) pixel portions 11 that perform photoelectric conversion. Each pixel portion 11 is formed, for example, in a rectangular shape in plan view. The N pixel portions 11 are arranged in a row along a first direction X1 so as to be adjacent to each other. The M pixel arrays 12 are arranged so as to be adjacent to each other along a second direction X2 perpendicular to the first direction X1. The A-th (A is any integer of 1 to N) pixel portions 11 in the M pixel arrays 12 are arranged along the second direction X2. That is, in the pixel unit 2, N×M pixel portions 11 are arranged in a matrix.

When used in the X-ray image acquisition apparatus as described above, the imaging device 1 is arranged such that the first direction X1 matches the transport direction of the object. N may be an integer of 8 or more, or may be an integer of 16 or more. The larger N is, the more the S/N ratio can be improved by the TDI operation. Hereinafter, a case where N is 4 will be described as an example. However, the same applies when N is other values.

Each pixel portion 11 is, for example, a light receiving element capable of detecting scintillation light. In this example, the light receiving element is a photodiode formed of silicon. However, the light receiving element may be a photodiode formed of a compound semiconductor such as InGaAs or CdTe. In this example, the light receiving element is a surface type photodiode with a PN junction exposed on the surface. However, the light receiving element may be an embedded photodiode with a PN junction embedded thereinside.

The circuit section 3 includes M circuit units 5 provided corresponding to the M pixel arrays 12. In this example, the M circuit units 5 are electrically connected to the M pixel arrays 12, respectively. Specifically, the N pixel portions 11 of each of the M pixel arrays 12 and the M circuit units 5 are electrically connected to each other by N×M wirings 6. That is, the N pixel portions 11 of one pixel array 12 are electrically connected to the corresponding circuit units 5 by the N wirings 6. Each wiring 6 extends linearly along the first direction X1 so as to pass over the pixel portion 11, for example.

Figure 2:
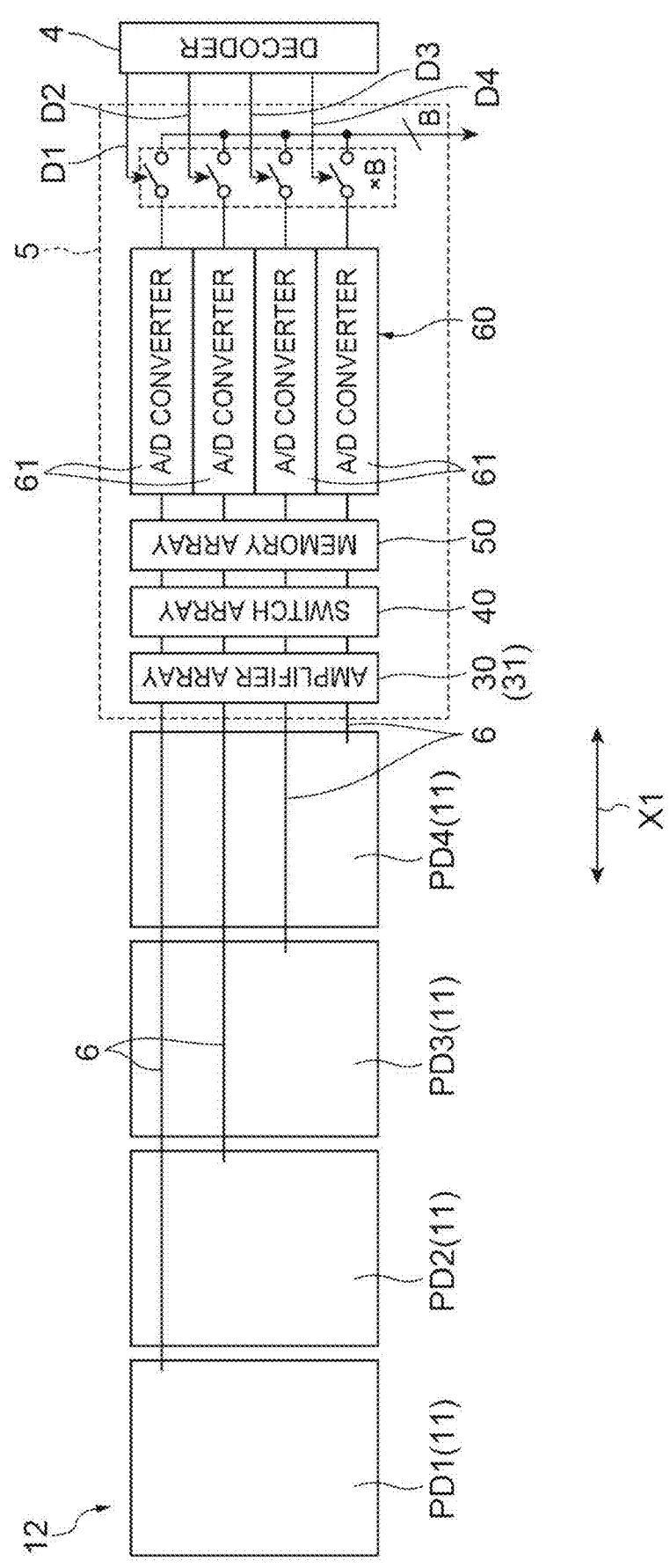
FIG. 2 is a diagram showing the circuit configurations of a pixel array and a circuit unit.

As shown in FIG. 2, each circuit unit 5 includes an amplifier array 30, a switch array (switch circuit, switch section) 40, a memory array 50, and an ADC (analog-to-digital converter) array 60. Hereinafter, the configurations and operations of one circuit unit 5 and the pixel array 12 corresponding to the circuit unit 5 will be described. However, the configurations and operations of other circuit units 5 and pixel arrays 12 are the same. In addition, the four pixel portions 11 included in the pixel array 12 are also referred to as pixel portions PD1, PD2, PD3, and PD4 in order far from the circuit unit 5.

Figure 3:
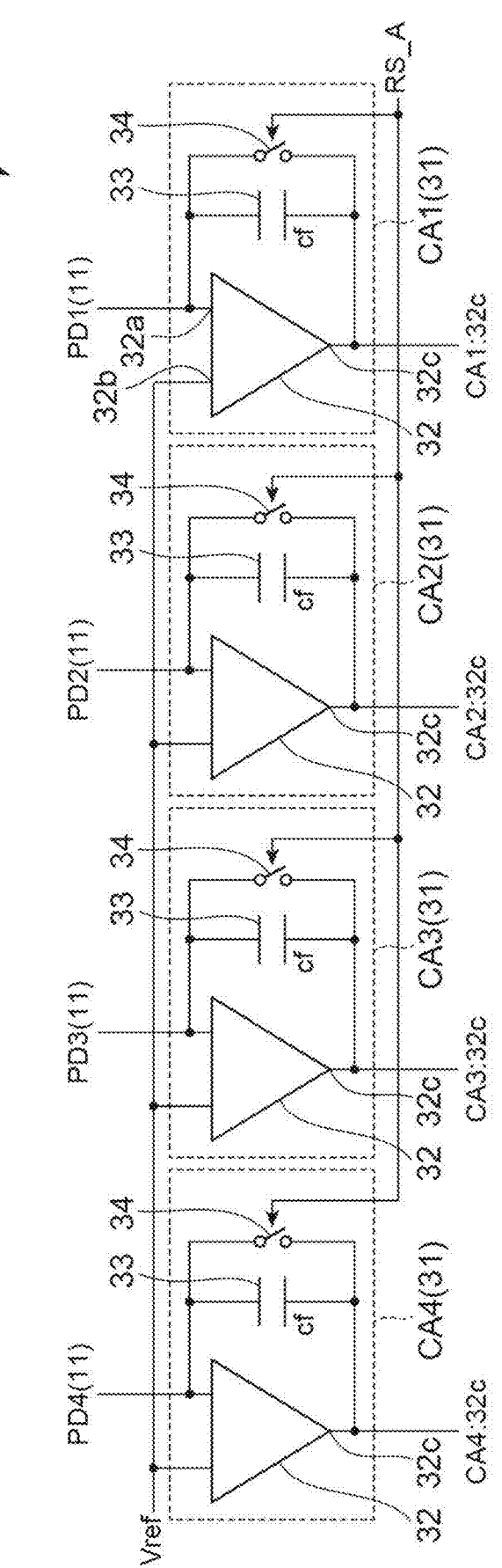
FIG. 3 is a diagram showing the circuit configuration of an amplifier array.

As shown in FIG. 3, the amplifier array 30 includes N (four in this example) charge amplifiers 31. Each charge amplifier 31 includes an operational amplifier 32, a capacitive portion 33, and a reset switch 34. The capacitive portion 33 is a feedback capacitor, and is connected between an inverting input terminal 32a and an output terminal 32c of the operational amplifier 32. A charge signal output from the pixel portion 11 is accumulated in the capacitive portion 33. A non-inverting input terminal 32b of the operational amplifier 32 is connected to a reference voltage Vref. The reset switch 34 is connected in parallel with the capacitive portion 33 between the inverting input terminal 32a and the output terminal 32c. The reset switch 34 is turned on and off according to a reset signal RS_A to reset the charge accumulated in the capacitive portion 33.

The four pixel portions 11 of the corresponding pixel array 12 are connected to the four charge amplifiers 31, respectively. More specifically, the charge signal from the pixel portion 11 is input to the inverting input terminal 32a of the operational amplifier 32. The charge amplifier 31 converts the charge signal output from the pixel portion 11 of the corresponding pixel array 12 into a voltage signal. Hereinafter, the charge amplifiers 31 that receive signals from the pixel portions PD1, PD2, PD3, and PD4 are also referred to as charge amplifiers CA1, CA2, CA3, and CA4, respectively. The voltage signal from the charge amplifier 31 is output to switch units SU1 to SU4, which will be described later, through the output terminal 32c.

Figure 4:
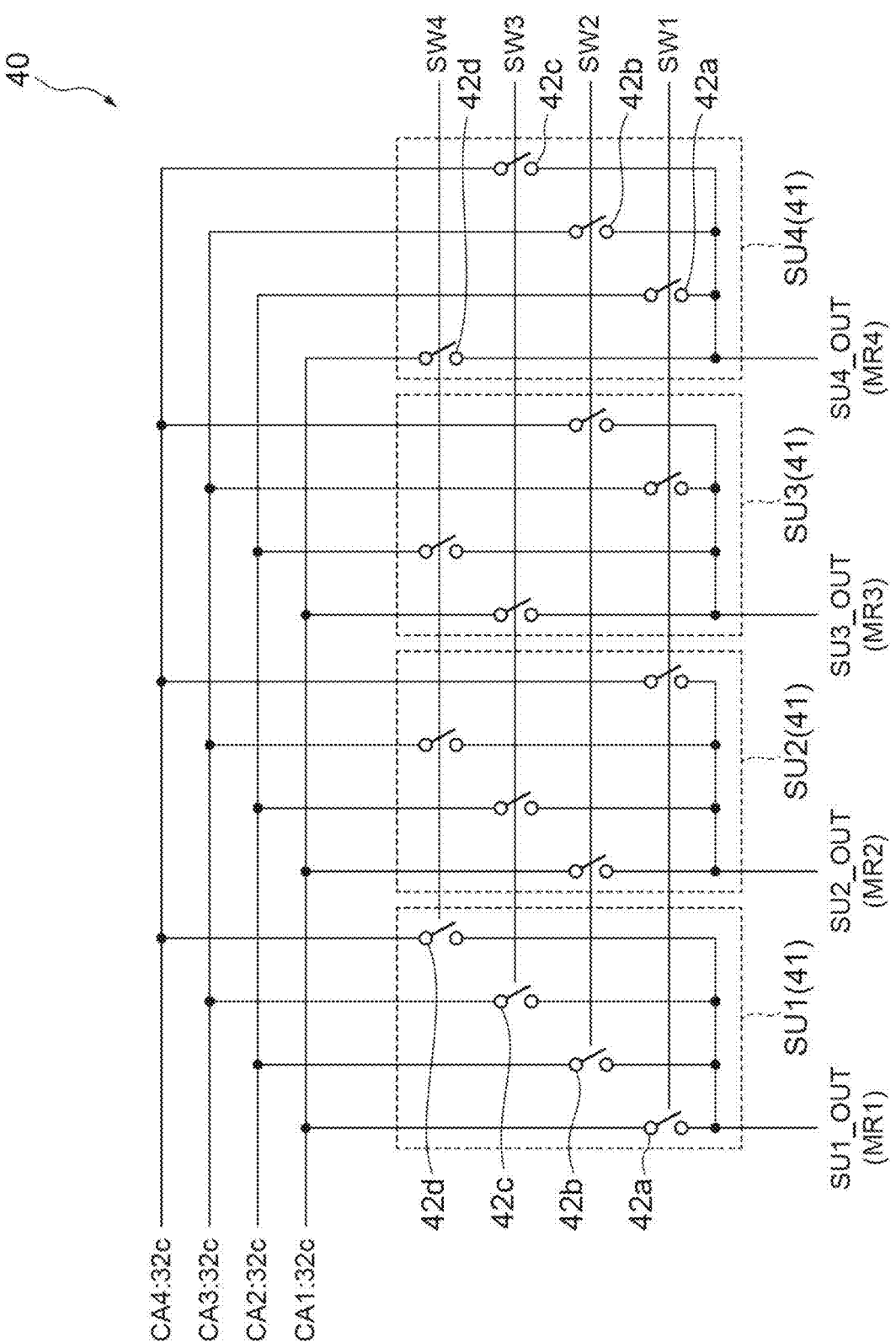
FIG. 4 is a diagram showing the circuit configuration of a switch array.

As shown in FIG. 4, the switch array 40 includes N (four in this example) switch units 41. Each switch unit 41 includes four switches 42a, 42b, 42c, and 42d connected to the four charge amplifiers 31 respectively. Output signals from the switch unit 41 are output to memory units MR1 to MR4, which will be described later. The switch array 40 is configured such that the connection state between the charge amplifiers CA1 to CA4 and the memory units MR1 to MR4 is switched according to the ON/OFF state of the switches 42a to 42d.

More specifically, in each switch unit 41, the switch 42a is turned on and off according to a switching signal SW1, the switch 42b is turned on and off according to a switching signal SW2, the switch 42c is turned on and off according to a switching signal SW3, and the switch 42d is turned on and off according to a switching signal SW4. The switch units 41 connected to the memory units MR1, MR2, MR3, and MR4 are referred to as the switch units SU1, SU2, SU3 and SU4, respectively.

FIG. 4 shows output nodes SU1_OUT, SU2_OUT, SU3_OUT, and SU4_OUT of the switch units SU1, SU2, SU3, and SU4.

When the switching signal SW1 is ON and the switching signals SW2 to SW4 are OFF, the charge amplifiers CA1, CA4, CA3, and CA2 are connected to the memory units MR1, MR2, MR3, and MR4, respectively. When the switching signal SW2 is ON and the switching signals SW1, SW3, and SW4 are OFF, the charge amplifiers CA2, CA1, CA4, and CA3 are connected to the memory units MR1, MR2, MR3, and MR4, respectively. When the switching signal SW3 is ON and the switching signals SW1, SW2, and SW4 are OFF, the charge amplifiers CA3, CA2, CA1, and CA4 are connected to the memory units MR1, MR2, MR3, and MR4, respectively. When the switching signal SW4 is ON and the switching signals SW1 to SW3 are OFF, the charge amplifiers CA4, CA3, CA2, and CA1 are connected to the memory units MR1, MR2, MR3, and MR4, respectively.

Figure 5:
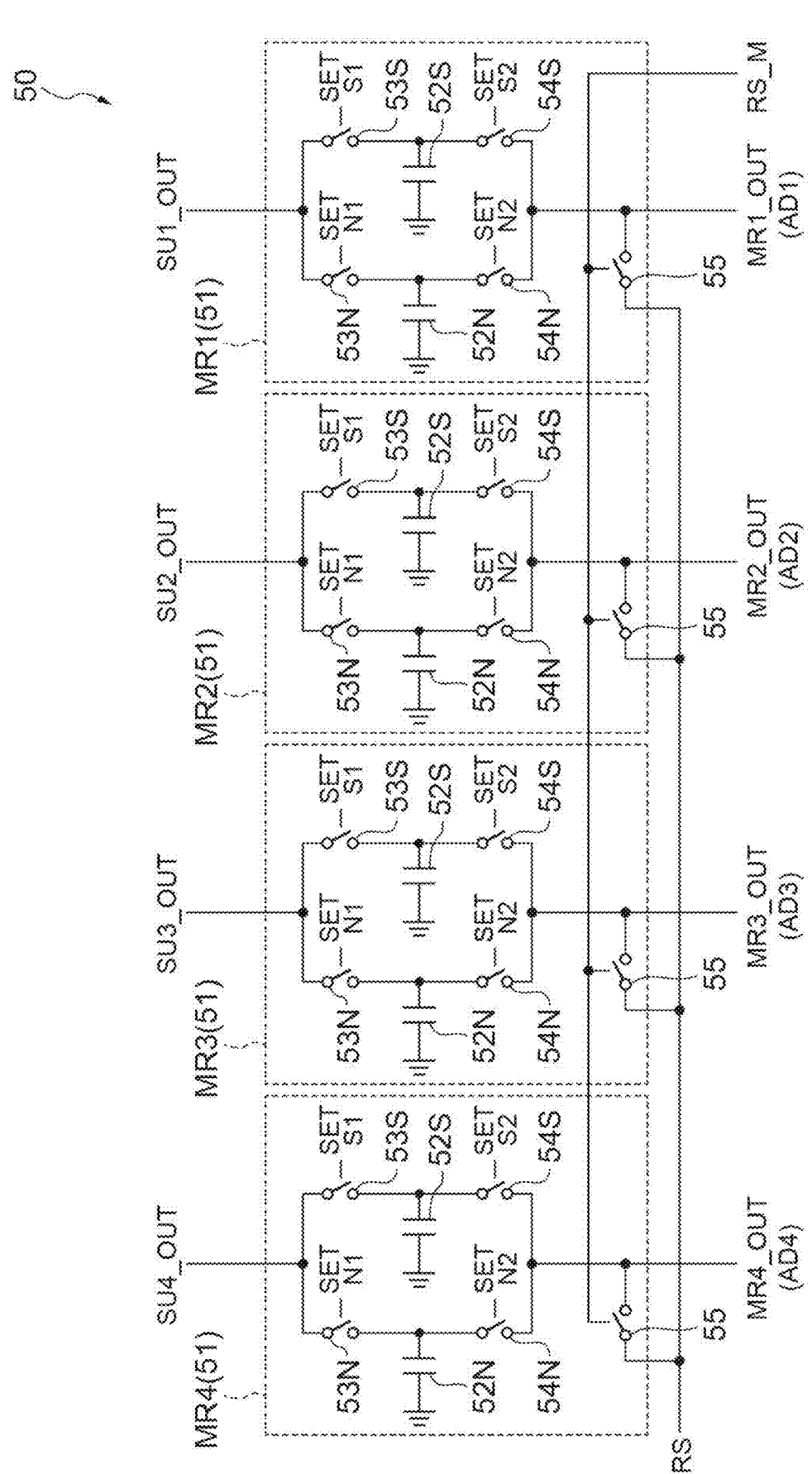
FIG. 5 is a diagram showing the circuit configuration of a memory array.

As shown in FIG. 5, the memory array 50 includes N (four in this example) memory units 51. In addition, the memory array 50 may include T (T is an integer of N or more) memory units 51. Each memory unit 51 includes capacitors 52N and 52S, switches 53N, 53S, 54N, and 54S, and a reset switch 55. The capacitor 52N holds a reference voltage (N level) in the voltage signal from the charge amplifier 31, and the capacitor 52S holds a signal voltage (S level) in the voltage signal from the charge amplifier 31. The difference between the signal voltage and the reference voltage is an effective signal.

The switches 53N and 53S are used to switch connection states between the capacitors 52N and 52S and the switch units SU1 to SU4, and the switches 54N and 54S are used to switch connection states between the capacitors 52N and 52S and A/D converters AD1 to AD4, which will be described later. The switches 53N and 53S are turned on and off according to switching signals SETN1 and SETS1, and the switches 54N and 54S are turned on and off according to switching signals SETN2 and SETS2.

The reset switch 55 is turned on and off according to a reset signal RS_M. When the reset switch 55 is turned on, a reset voltage VRS is supplied to reset the voltages of the input terminals of the A/D converters AD1 to AD4. The memory array 50 is provided to change the transfer order of signals because the order in which the voltage signal from the charge amplifier 31 is held in the capacitors 52N and 52S is the order of the S level and the N level and the order of AD conversion by an ADC array 60 is the order of the N level and the S level. Hereinafter, the memory units 51 connected to the switch units SU1, SU2, SU3, and SU4 (A/D converters AD1, AD2, AD3, and AD4) are also referred to as the memory units MR1, MR2, MR3, and MR4, respectively. FIG. 5 shows output nodes MR1_OUT, MR2_OUT, MR3_OUT, and MR4_OUT of the memory units MR1, MR2, MR3, and MR4.

Figure 6:
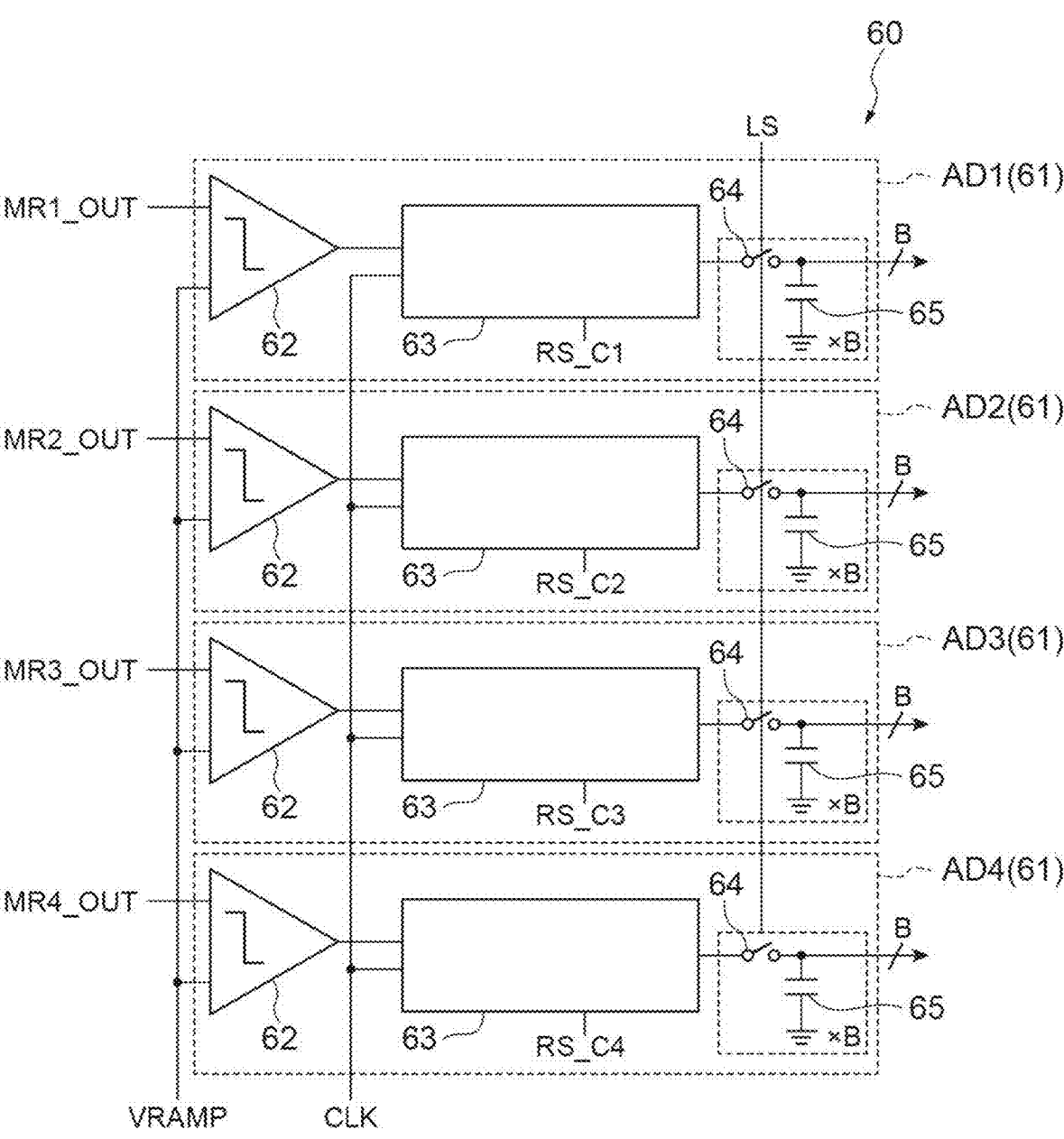
FIG. 6 is a diagram showing the circuit configuration of an ADC array.

As shown in FIG. 6, the ADC array 60 includes N (four in this example) A/D converters (additing portion) 61. In addition, the ADC array 60 may include T (T is an integer of N or more) A/D converters 61. In this example, each A/D converter 61 is of a single slope type, and includes a comparator 62, a counter 63 having B (B is an integer of 1 or more) bits, B latch switches 64, and B capacitors 65. The comparator 62 compares an output signal from the memory unit 51 with a ramp wave VRAMP. The counter 63 outputs a B-bit count value corresponding to the output signal from the comparator 62. The latch switch 64 latches the counter value output from the counter 63. The capacitor 65 holds the count value output from counter 63 according to ON/OFF of the latch switch 64. The counter 63 operates based on a clock pulse CLK. The latch switch 64 operates according to a latch signal LS.

In the A/D converter 61, the output of the comparator 62 changes according to the output signals from the memory units MR1 to MR4 (the charge signals from the pixel portions PD1 to PD4 and the voltage signals from the charge amplifiers CA1 to CA4), and the counter 63 performs counting according to the change. In this manner, A/D conversion for converting the voltage signal into a digital value is performed.

Assuming that the A/D converters 61 connected to the memory units MR1, MR2, MR3, and MR4 are A/D converters AD1, AD2, AD3, and AD4, respectively, individual reset signals RS_C1, RS_C2, RS_C3, and RS_C4 are input to the counters 63 of the A/D converters AD1, AD2, AD3, and AD4. Therefore, it is possible to independently reset the counters 63 of the A/D converters AD1 to AD4.

In each A/D converter 61, the counter 63 performs counting according to the received voltage signal and holds the count value. The counting performed by the counter 63 may be either counting up or counting down. In addition, the counter 63 performs counting according to the next input voltage signal based on the count value previously held in the counter 63, and holds the count value. That is, each counter 63 sequentially performs counting each time a voltage signal is input, and holds count values corresponding to all input voltage signals (addition processing).

The B capacitors 65 hold a voltage signal (addition signal) corresponding to the holding state (addition state) of the count value in the corresponding counter 63. That is, whether or not to hold the voltage signal in each capacitor 65 is determined according to the count value held in the corresponding counter 63. Therefore, by reading the holding state of the voltage signal in the B capacitors 65, a digital signal corresponding to the count value held in the counter 63 can be obtained. As described above, in the A/D converter 61, the comparator 62 and the counter 63 function as an addition processing portion that performs addition processing on the voltage signals output from any one of the charge amplifiers CA1 to CA4, and the B capacitor 65 functions as a holding portion that holds an addition signal corresponding to the addition state of the addition processing portion. The count value held in the counter 63 is reset by the input of the reset signals RS_C1 to RS_C4. The read timing of the holding state of the voltage signal in the capacitor 65 is controlled by the decoder 4.

Referring to FIG. 1 again, the M circuit units 5 are arranged so as to be adjacent to (face) the corresponding pixel array 12 in the first direction X1. Each circuit unit 5 has N arrangement regions R aligned in the second direction X2. In each arrangement region R, one charge amplifier 31, one memory unit 51, and one A/D converter 61 are arranged. The width of each arrangement region R in the second direction X2 is equal to or less than 1/N of the width of the pixel portion 11 in the second direction X2. That is, in the second direction X2, the width of an area including the N arrangement regions R is equal to or less than the width of the pixel portion 11.

[Tdi Operation]

A TDI operation using the imaging device 1 will be described with reference to FIGS. 7 to 9. In the timing chart of FIG. 7, in order from the top, temporal changes of the reset signal RS_A, voltage signals from the charge amplifiers CA1 to CA4, the switching signals SW1 to SW4, the switching signals SETN1, SETS1, SETN2, and SETS2, and the reset signal RS_M and the operating states of the A/D converters AD1 to AD4 are shown. In the operating states of the A/D converters AD1 to AD4, "A/D Convert: CA1" means that the voltage signal from the charge amplifier CA1 is being A/D converted, and similarly, "A/D Convert: CA2 to CA4" means that the voltage signals from the charge amplifiers CA2 to CA4 are being A/D converted. "H" means that the signal is held, and "O" means that the signal is reset. The waveforms of the voltage signals from the charge amplifiers CA1 to CA4 are examples. The same applies to FIGS. 17, 18, 23, 24, 29, and 30 to be described later. In the timing chart of FIG. 8, in order from the top, the operating states of the A/D converters AD1 to AD4 and temporal changes of the latch signal LS, the reset signals RS_C to RS_C4, and read signals D1 to D4 are shown. The read signals D1 to D4 are signals output from the decoder 4 in order to control the read timing of the voltage holding state in the capacitor 65. When the read signals D1, D2, D3, and D4 are turned on, the voltage holding states in the capacitors 65 of the A/D converters AD1, AD2, AD3, and AD4 are read and converted into digital values (digital signals) (FIG. 2).

Figure 7:
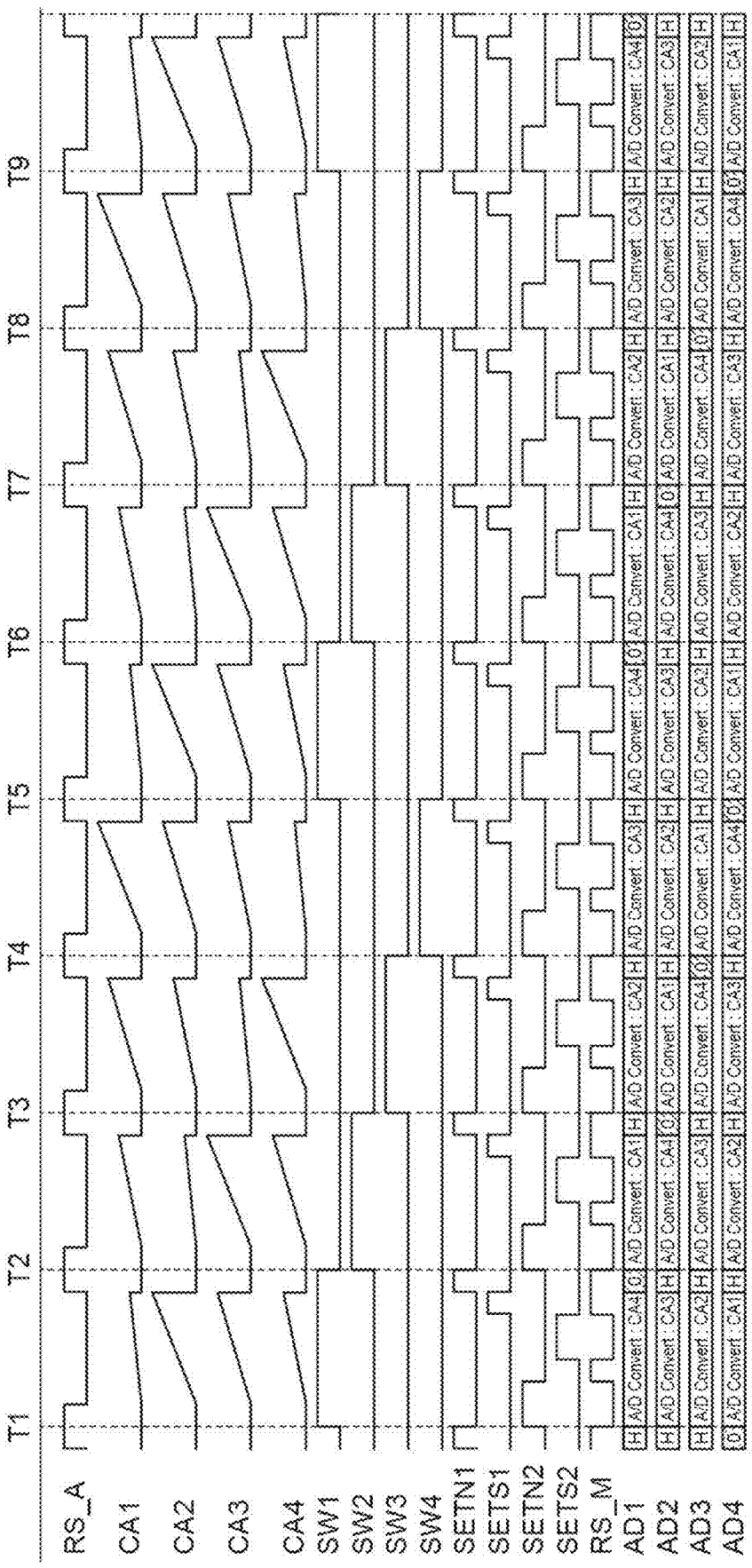
FIG. 7 is a timing chart showing the operation of the imaging device according to the embodiment.
Figure 8:
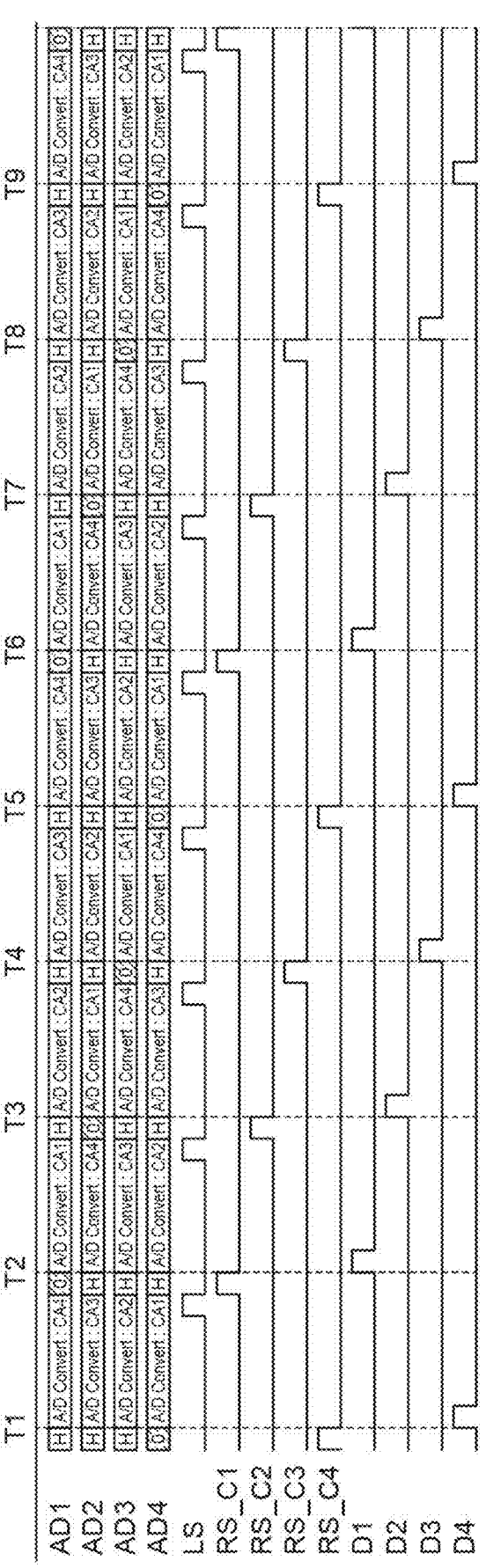
FIG. 8 is a timing chart showing the operation of the imaging device according to the embodiment.

As shown in FIGS. 7 to 9, in a period between times T1 and T2, the switching signal SW1 is turned on and the switching signals SW2 to SW4 are turned off, so that the charge amplifiers CA1, CA4, CA3, and CA2 are connected to the memory units MR1, MR2, MR3, and MR4, respectively. Then, when voltage signals (voltage signals corresponding to charge signals output from the pixel portions PD4, PD3, PD2 and PD1) are input from the charge amplifiers CA4, CA3, CA2, and CA1, each of the A/D converters AD1, AD2, AD3, and AD4 performs counting and holds the count value. At time T2, the read signal D1 is turned on, and the voltage state held in the capacitor 65 of the A/D converter AD1 is read and converted into a digital value. Before this reading, the reset signal RS_C1 is input to reset the counter 63 of the A/D converter AD1.

In a period between times T2 and T3, the switching signal SW2 is turned on and the switching signals SW1, SW3, and SW4 are turned off, so that the charge amplifiers CA2, CA1, CA4, and CA3 are connected to the memory units MR1, MR2, MR3, and MR4, respectively. Then, voltage signals (voltage signals corresponding to charge signals output from the pixel portions PD1, PD4, PD3, and PD2) are input from the charge amplifiers CA1, CA4, CA3, and CA2, and each of the A/D converters AD1, AD2, AD3, and AD4 performs counting and holds the count value. At time T3, the read signal D2 is turned on, and the voltage state held in the capacitor 65 of the A/D converter AD2 is read and converted into a digital value. Before this reading, the reset signal RS_C2 is input to reset the counter 63 of the A/D converter AD2.

In the period between times T2 and T3, the voltage signals from the charge amplifier 31 held in the capacitors 52N and 52S of the memory unit 51 in the period between times T1 and T2, which is a previous period, are transferred to the A/D converters AD1 to AD4 by turning on/off the switching signals SETN1, SETS1, SETN2, and SETS2. Therefore, in the period between times T2 and T3, the A/D converters AD1, AD2, AD3, and AD4 perform A/D conversion by performing counting according to the voltage signals from the charge amplifiers CA1, CA4, CA3, and CA2 connected to the memory units MR1, MR2, MR3, and MR4 in the period between times T1 and T2, which is a previous period. The same applies to other periods.

In a period between times T3 and T4, the switching signal SW3 is turned on and the switching signals SW1, SW2, and SW4 are turned off, so that the charge amplifiers CA3, CA2, CA1, and CA4 are connected to the memory units MR1, MR2, MR3, and MR4, respectively. Then, voltage signals (voltage signals corresponding to charge signals output from the pixel portions PD2, PD1, PD4, and PD3) are input from the charge amplifiers CA2, CA1, CA4, and CA3, and each of the A/D converters AD1, AD2, AD3, and AD4 performs counting. At time T4, the read signal D3 is turned on, and the voltage state held in the capacitor 65 of the A/D converter AD3 is read and converted into a digital value. Before this reading, the reset signal RS_C3 is input to reset the counter 63 of the A/D converter AD3.

In a period between times T4 and T5, the switching signal SW4 is turned on and the switching signals SW1 to SW3 are turned off, so that the charge amplifiers CA4, CA3, CA2, and CA1 are connected to the memory units MR1, MR2, MR3, and MR4, respectively. Then, voltage signals (voltage signals corresponding to charge signals output from the pixel portions PD3, PD2, PD1, and PD4) are input from the charge amplifiers CA3, CA2, CA1, and CA4, and each of the A/D converters AD1, AD2, AD3, and AD4 performs counting. At time T5, the read signal D4 is turned on, and the voltage state held in the capacitor 65 of the A/D converter AD4 is read and converted into a digital value. Before this reading, the reset signal RS_C4 is input to reset the counter 63 of the A/D converter AD4. An operation in a period between times T5 and T6, an operation in a period between times T6 and T7, an operation in a period between times T7 and T8, and an operation in a period between times T8 and T9 are similar to the operation in the period between times T1 and T2, the operation in the period between times T2 and T3, the operation in the period between times T3 and T4, and the operation in the period T4 and T5, respectively.

By the operation described above, the output signals from the N pixel portions 11 are added in a TDI manner. In the above example, continuous TDI-like addition processing is realized by shifting the reset timing of the counter 63 in the A/D converters AD1 to AD4 by one frame. One frame corresponds to the length of the period between times T1 and T2. In this addition processing, the capacitors 65 (holding portions) of the A/D converters AD1 to AD4, which hold voltage signals corresponding to the charge signals output from the pixel portions PD1 to PD4, are switched according to the arrangement order of the pixel portions PD1 to PD4 along the first direction X1. In other words, the switch array 40 switches connection states between the charge amplifiers CA1 to CA4 and the capacitors 65 of the A/D converters AD1 to AD4 so that the above switching occurs.

Figure 10:
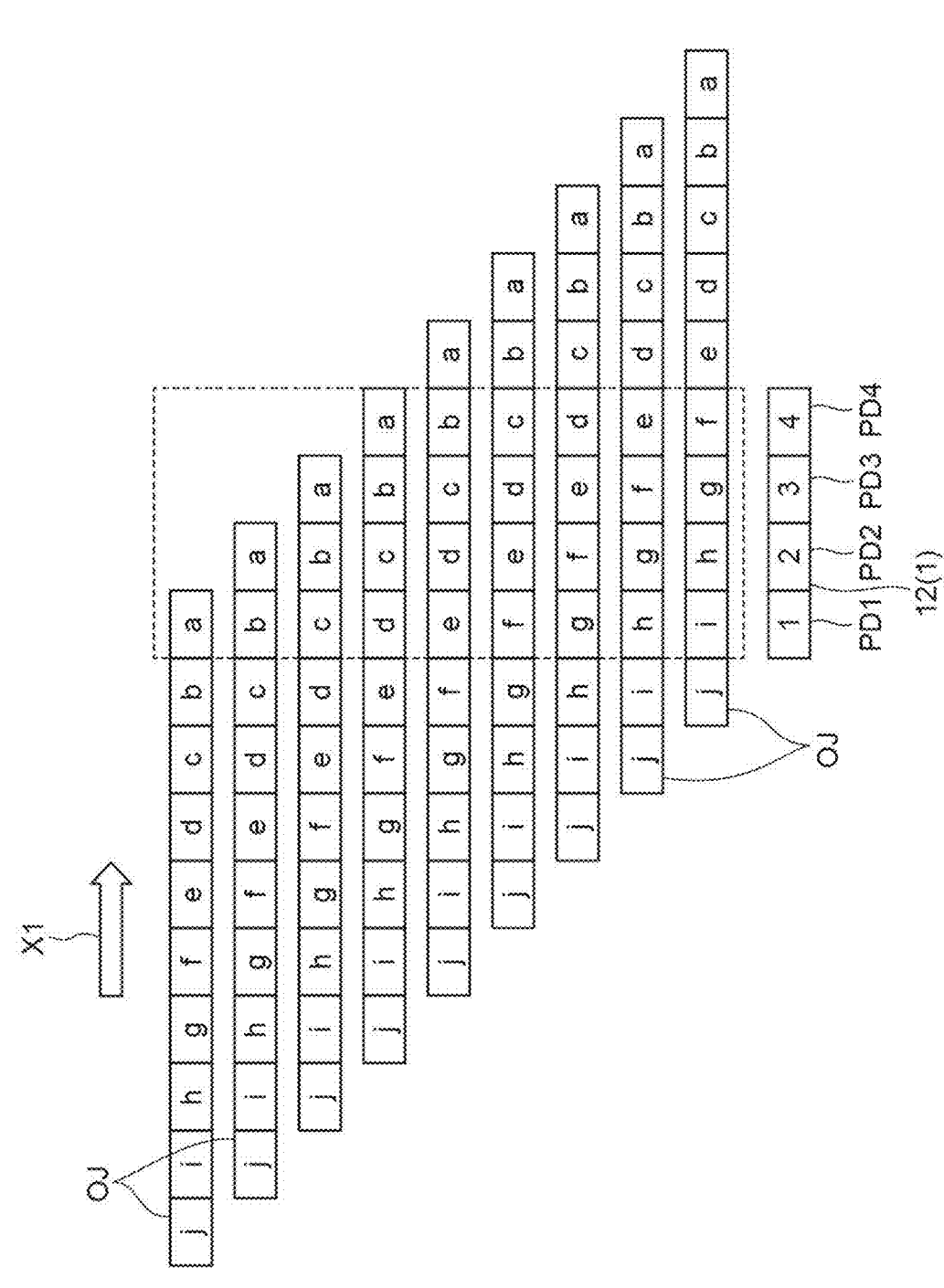
FIG. 10 is a diagram for explaining a TDI operation.

FIGS. 10 and 11 are diagrams for explaining addition processing by the TDI operation. FIGS. 10 and 11 show an example in which the imaging device 1 detects light (electromagnetic waves) from an object OJ transported along the transport direction (first direction X1). If the object OJ is divided into regions a to j according to the position along the transport direction, as shown in FIGS. 10 and 11, signals corresponding to the charge signals output from the pixel portions PD1 to PD4 when light transmitted through the same region in the object OJ is detected are input to the same A/D converters AD1 to AD4 by the TDI operation. For example, a signal based on the detection of light from the region a is input to the A/D converter AD1. Then, a voltage signal (4*a*) corresponding to the count value corresponding to signals for four frames is held in the capacitor 65, and the voltage signal (4*a*) is read as a digital value from the A/D converter AD1 at time T6. By acquiring the count value corresponding to the signal for N frames in this manner, the S/N ratio in the acquired image can be improved. In the TDI operation, the timing at which the switch array 40 switches the connection states between the charge amplifiers CA1 to CA4 and the A/D converters AD1 to AD4 is synchronized with the transportation (for example, transport speed) of the object OJ along the first direction X1.

[Function and Effect]

In the imaging device 1, each of the M circuit units 5 includes N charge amplifiers 31, N A/D converters 61, and the switch array 40 (switch circuit). Then, in each circuit unit 5, the connection state between the charge amplifier 31 and the capacitor 65 of the A/D converter 61 is switched so that the capacitor 65 (holding portion) of the A/D converter 61 that holds a voltage signal (addition signal) corresponding to the charge signal output from the pixel portion 11 is switched in accordance with the arrangement order of N pixel portions 11 along the first direction X1. In this manner, the TDI operation is realized. By realizing the TDI operation by such addition processing using the A/D converter 61, an increase in circuit size can be suppressed as compared with a case where a memory for simply digitally adding signals is provided in the circuit unit 5, for example. In addition, the amount of output signal can be reduced as compared with a case where signals are output to the outside of the imaging device 1 and digital addition processing is performed outside, for example. In addition, in the imaging device 1, the charge signal output from the pixel portion 11 is converted into a voltage signal by the charge amplifier 31, and the voltage signal is added by the A/D converter 61. Therefore, since the loss in transferring the charge signal from the pixel portion 11 can be reduced, an efficient TDI operation can be realized. As a result, according to the imaging device 1, an efficient TDI operation can be realized while suppressing an increase in circuit size and reducing the amount of output signal.

Figure 12:
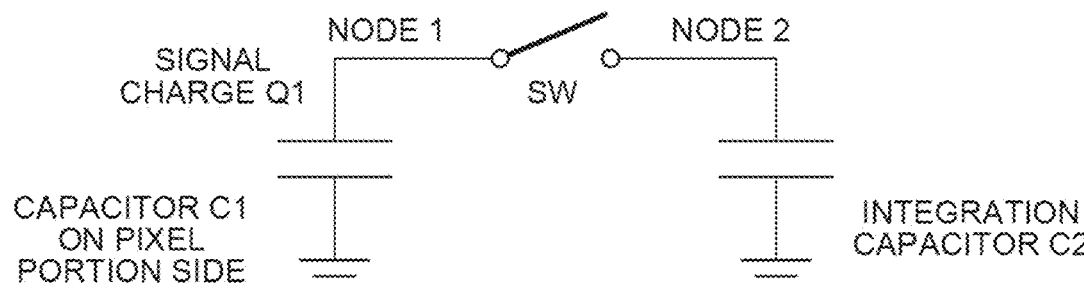
FIG. 12 is a circuit diagram for explaining charge transfer in a comparative example.
Figure 13:
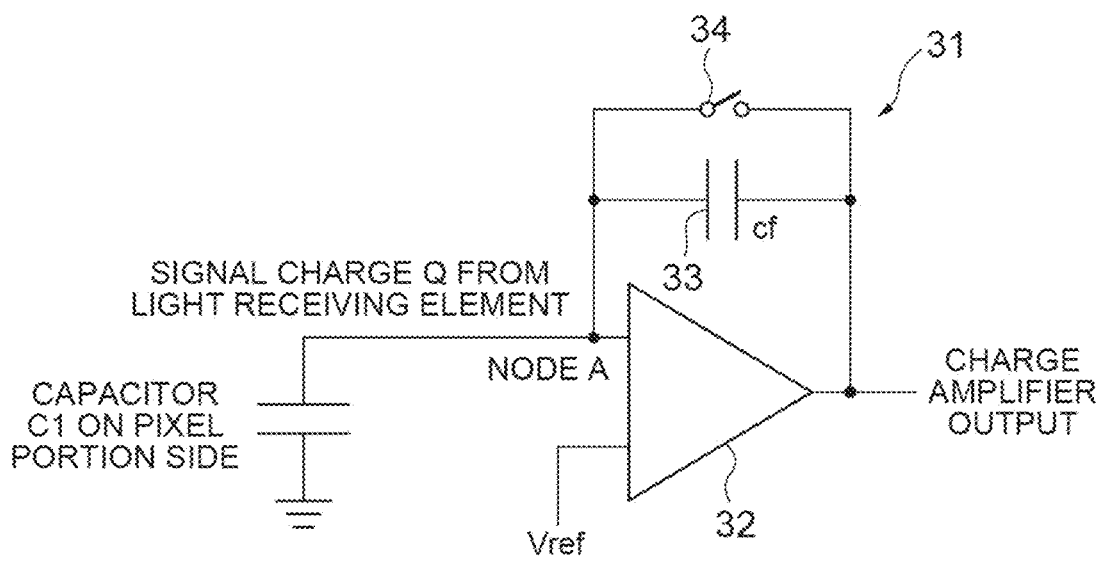
FIG. 13 is a circuit diagram for explaining charge transfer in the embodiment.

Reduction of the loss in transferring the charge signal from the pixel portion 11 will be described with reference to FIGS. 12 and 13. FIG. 12 is a circuit diagram for explaining charge transfer in a comparative example, and FIG. 13 is a circuit diagram for explaining charge transfer in the embodiment. In the comparative example shown in FIG. 12, a signal charge Q1 from a pixel portion is transferred to an integration capacitor C2 by turning on a switch SW. In this case, assuming that the capacitance on the pixel portion side (for example, the capacitance of a photodiode) is C1, a voltage V2 at node 2 is Q1/C2 if the signal charge Q1 is completely transferred. In practice, however, the voltage V2 at node 2 is Q1/(C1+C2). Thereafter, even if the switch SW is turned off, the charge transferred to the integration capacitor C2 is Q1×C2/(C1+C2), resulting in insufficient charge transfer (capacitance division).

On the other hand, as shown in FIG. 13, when the charge amplifier 31 is connected to the pixel portion 11, the electric potential at node A does not change depending on the signal charge Q from the pixel portion 11. Due to the effect of virtual grounding of the operational amplifier 32, the electric potential at node A continues to be the same potential as the reference voltage Vref. Since the electric potential at node A does not change, the entire signal charge Q is accumulated in the capacitive portion 33, and the output voltage from the charge amplifier 31 becomes Q/Cf. Therefore, the loss in transferring the charge signal can be reduced. Cf is the capacitance of the capacitive portion 33.

Each A/D converter 61 is of a single slope type. Therefore, it is possible to realize an efficient TDI operation with a simple configuration.

The switch array 40 is connected between the charge amplifier 31 and the comparator 62 (addition processing portion) of the A/D converter 61. Therefore, it is possible to realize an efficient TDI operation with a simple configuration.

The width of each arrangement region R in the second direction X2 is equal to or less than 1/N of the width of the pixel portion 11 in the second direction X2. Therefore, since the circuit units 5 can be arranged efficiently, an increase in circuit size can be further suppressed.

Each pixel portion 11 includes a surface type photodiode. Therefore, the area of the pixel portion 11 can be increased.

N is an integer of 8 or more. When the number of pixels is large like this, an increase in circuit size or an increase in the amount of output signal is likely to become a problem. However, even in such a case, the imaging device 1 can realize an efficient TDI operation while suppressing an increase in circuit size and reducing the amount of output signal.

MODIFICATION EXAMPLES

Figure 14:
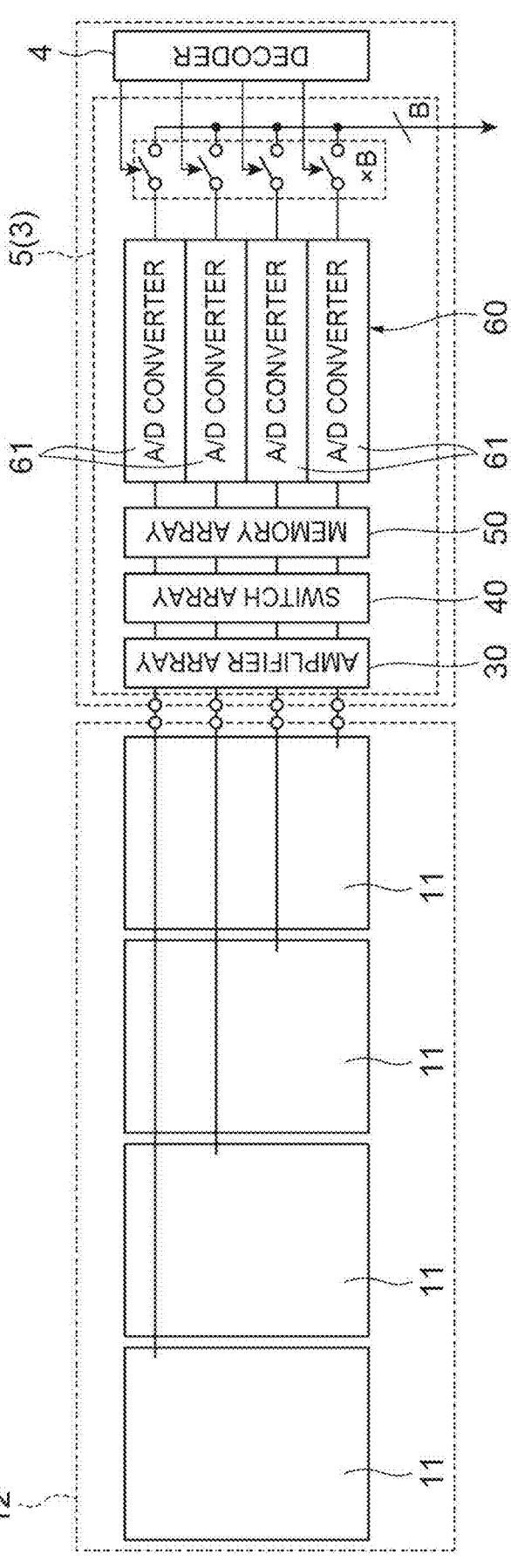
FIG. 14 is a diagram showing the circuit configurations of a pixel array and a circuit unit in a first modification example.

The imaging device 1 may be configured as in a first modification example shown in FIG. 14. In the embodiment described above, the entire imaging device 1 is formed on one chip. However, in the first modification example, the pixel unit 2, the circuit section 3, and the decoder 4 are formed on separate chips to be separated from each other. During use, the pixel unit 2 is electrically connected to the circuit section 3 (amplifier array 30). According to the first modification example as well, as in the embodiment described above, it is possible to realize an efficient TDI operation while suppressing an increase in circuit size and reducing the amount of output signal.

Figure 15:
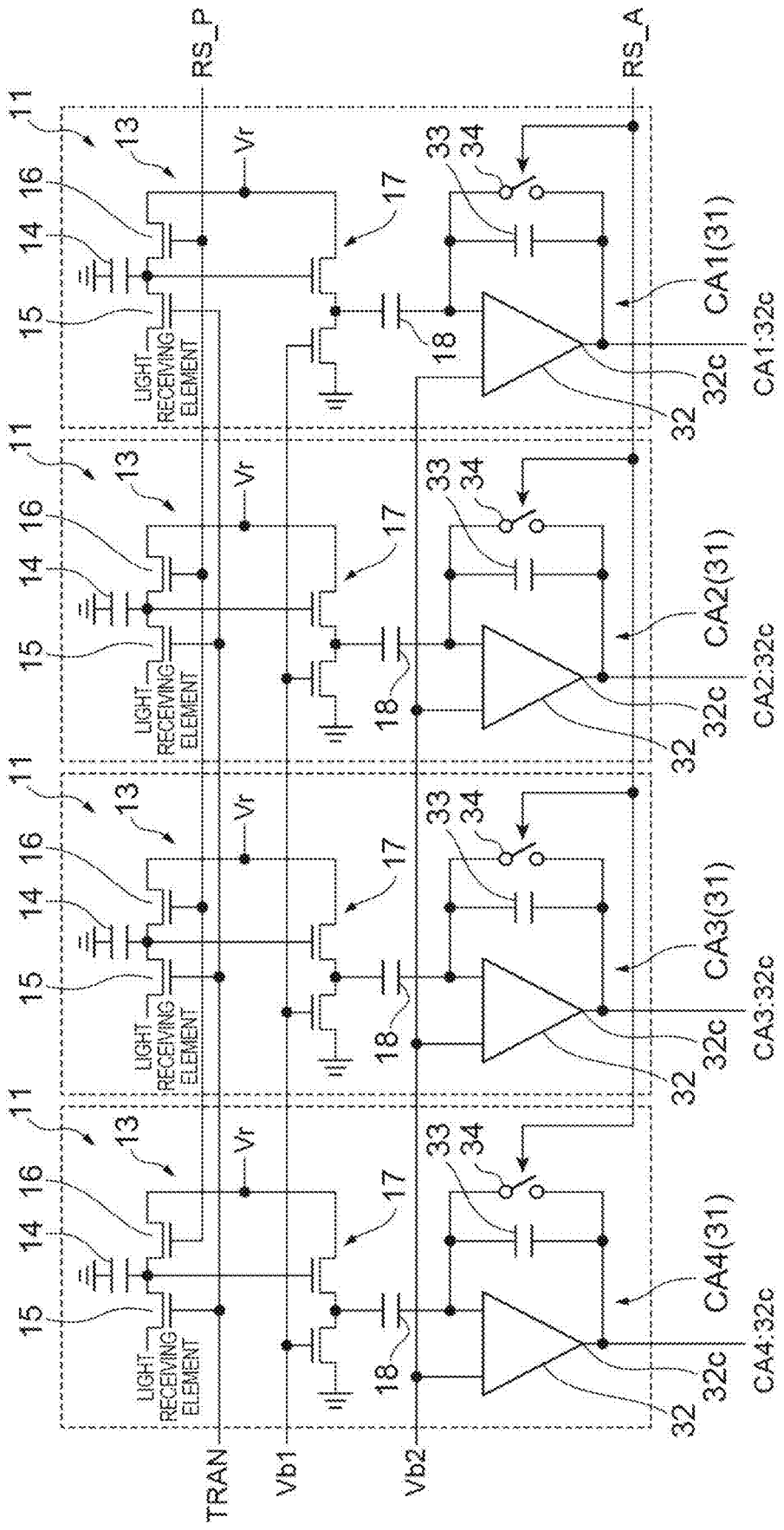
FIG. 15 is a diagram showing the circuit configurations of a pixel array and an amplifier array in a second modification example.

The imaging device 1 may be configured as in a second modification example shown in FIGS. 15 to 18. In the second modification example, the light receiving element of each pixel portion 11 is an embedded photodiode. Each pixel portion 11 has a pixel amplifier 13 in addition to the light receiving element. The pixel amplifier 13 includes a capacitor 14, transistors 15 and 16, and a source follower amplifier 17. The capacitor 14 is, for example, a floating diffusion, and is an accumulation region formed in a semiconductor substrate. All the signal charges of the light receiving element are transferred to the capacitor 14 and converted into a voltage. The transistor 15 is, for example, a MOS transistor, and controls transfer of the signal from the light receiving element to the capacitor 14. The transistor 16 is, for example, a MOS transistor, and controls resetting of the capacitor 14. The source follower amplifier 17 amplifies a voltage signal from the capacitor 14 and outputs the amplified voltage signal. The source follower amplifier 17 is connected to the charge amplifier 31 through a coupling capacitor 18. The output signal from the source follower amplifier 17 is converted into charge by the coupling capacitor 18 and then converted from charge to voltage again by the charge amplifier 31. In FIG. 15, Vr is the reset voltage of the capacitor 14, Vb1 is a bias voltage, Vb2 is a reference voltage, TRAN is a transfer signal, and RS_P is the reset signal of the capacitor 14.

Figure 16:
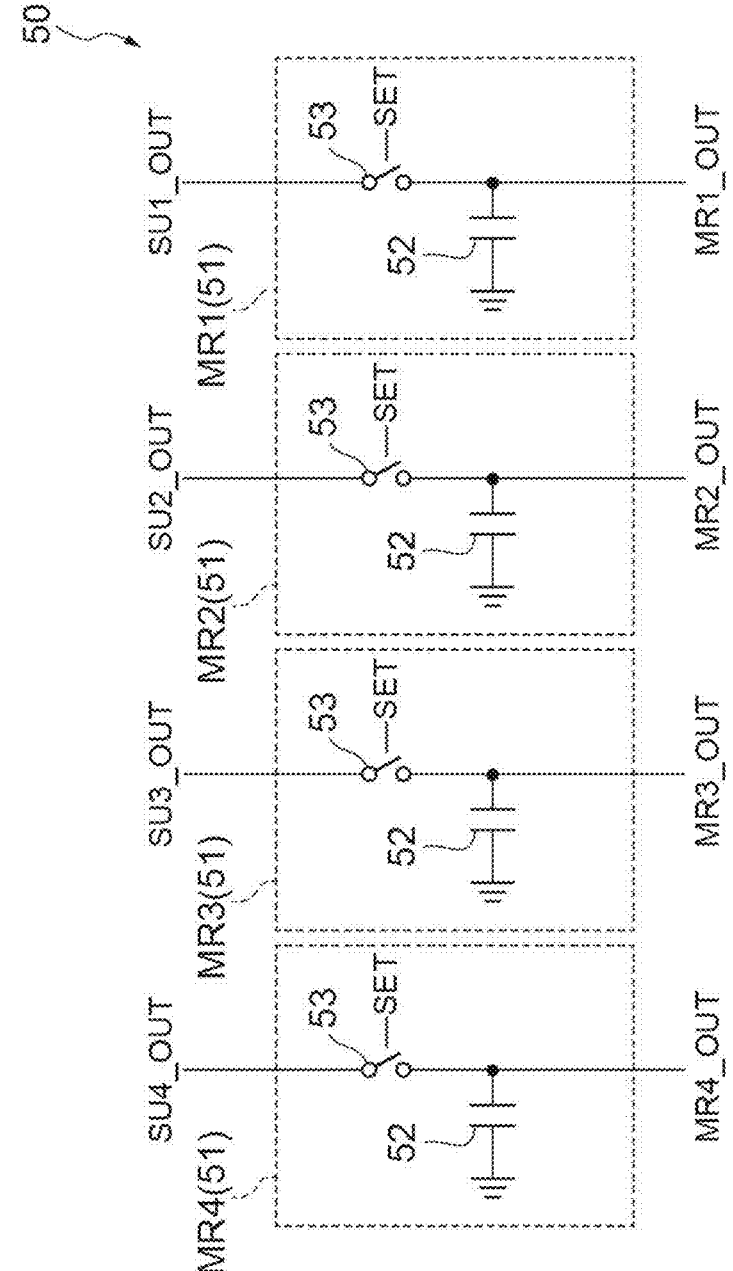
FIG. 16 is a diagram showing the circuit configuration of a switch array in the second modification example.

In the second modification example, as shown in FIG. 16, the memory unit 51 includes one capacitor 52 and one switch 53. In the second modification example, the order in which the voltage signal from the charge amplifier 31 is held in the capacitor 52 is the order of the N level and the S level, which is the same as the order of AD conversion by the ADC array 60. Therefore, only one pair of capacitor 52 and switch 53 are provided. The switch 53 is turned on and off according to a switching signal SET.

Figure 17:
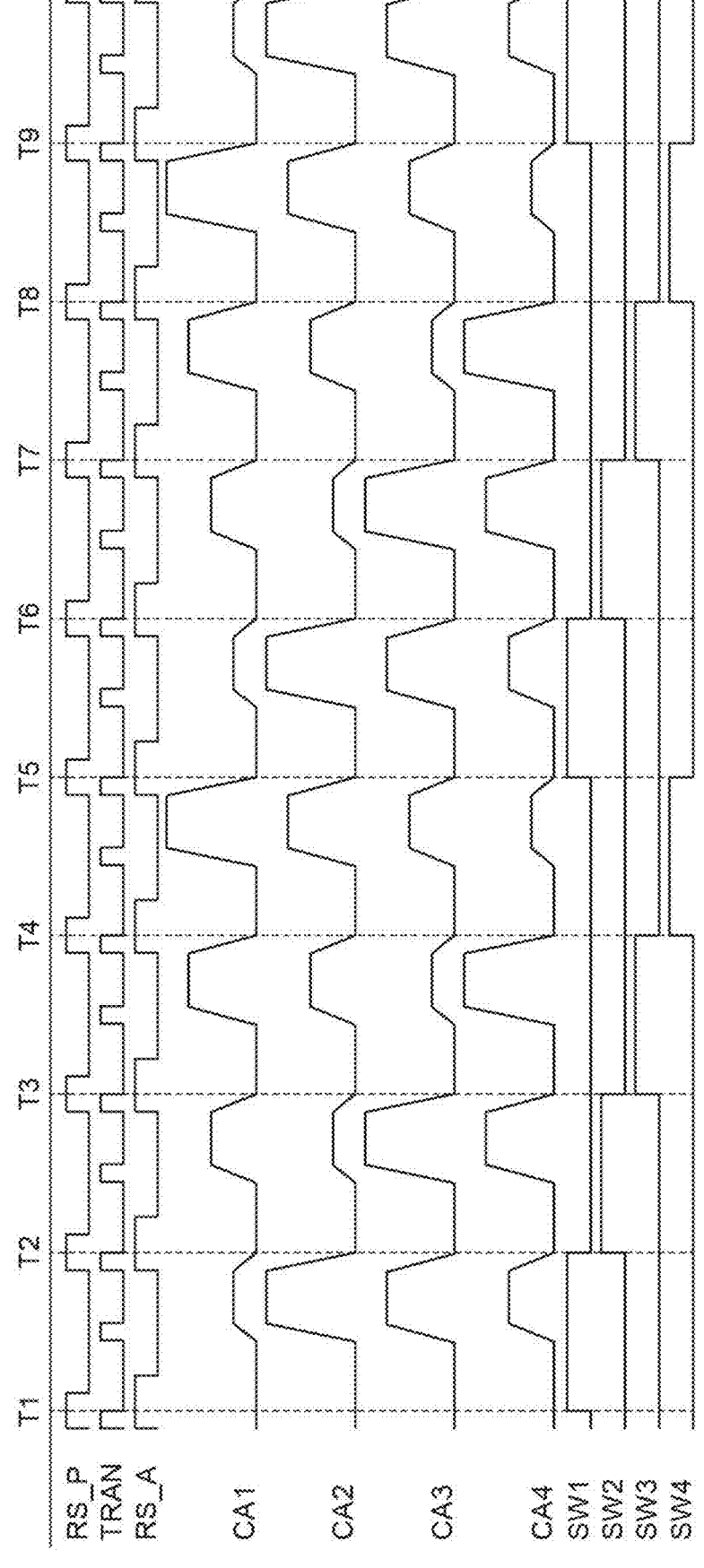
FIG. 17 is a timing chart showing the operation of an imaging device according to the second modification example.
Figure 18:
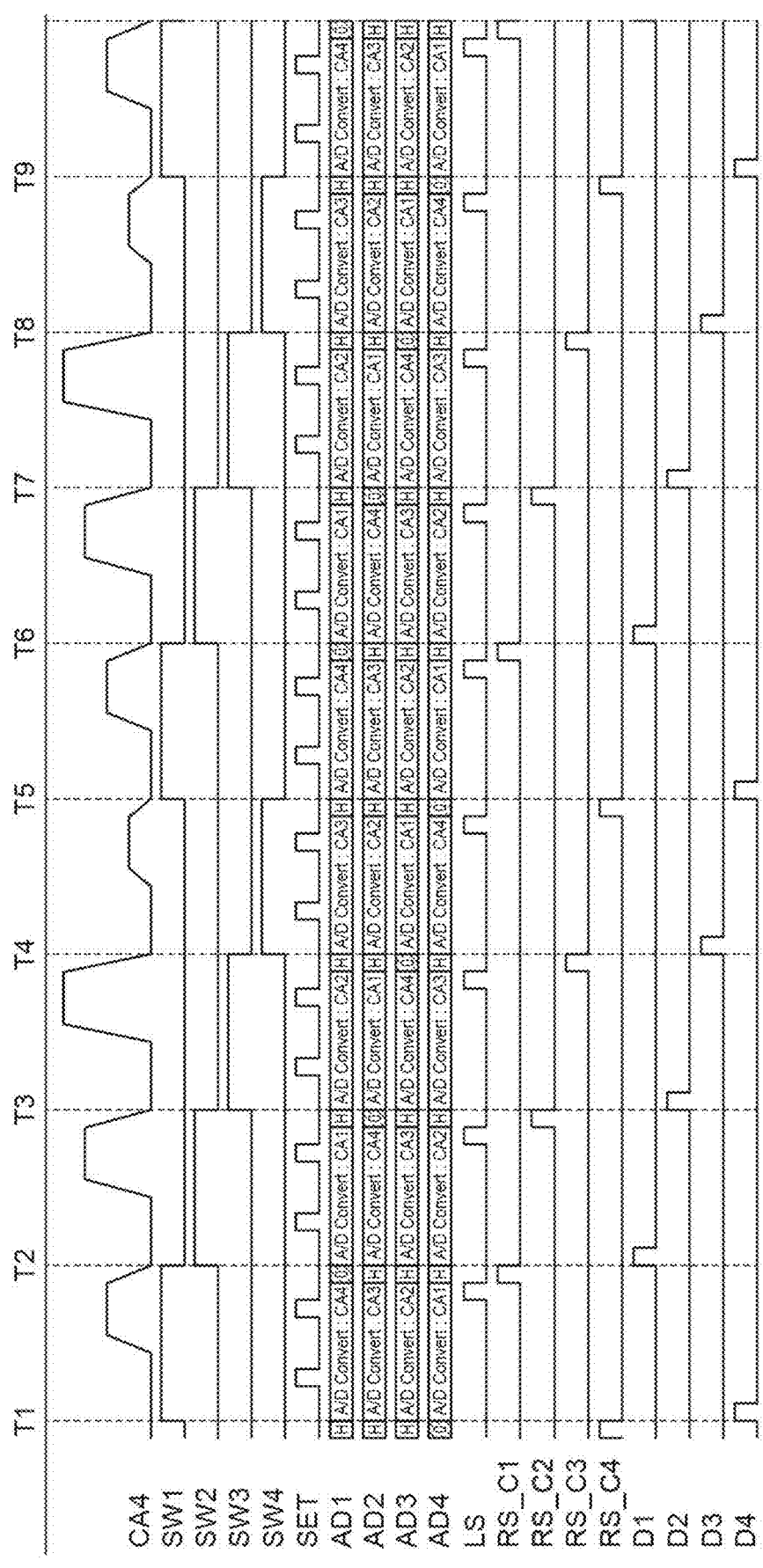
FIG. 18 is a timing chart showing the operation of the imaging device according to the second modification example.

FIGS. 17 and 18 are timing charts showing the operation of the imaging device 1 according to the second modification example. In the second modification example as well, the switch array 40 switches the connection states between the charge amplifiers CA1 to CA4 and the capacitors 65 of the A/D converters AD1 to AD4 so that the capacitors 65 (holding portions) of the A/D converters AD1 to AD4 that hold voltage signals corresponding to the charge signals output from the pixel portions PD1 to PD4 are switched according to the arrangement order of the pixel portions PD1 to PD4 along the first direction X1.

According to the second modification example as well, as in the first embodiment described above, it is possible to realize an efficient TDI operation while suppressing an increase in circuit size and reducing the amount of output signal. In addition, since each pixel portion 11 includes an embedded photodiode, it is possible to achieve high sensitivity and low noise.

Figure 19:
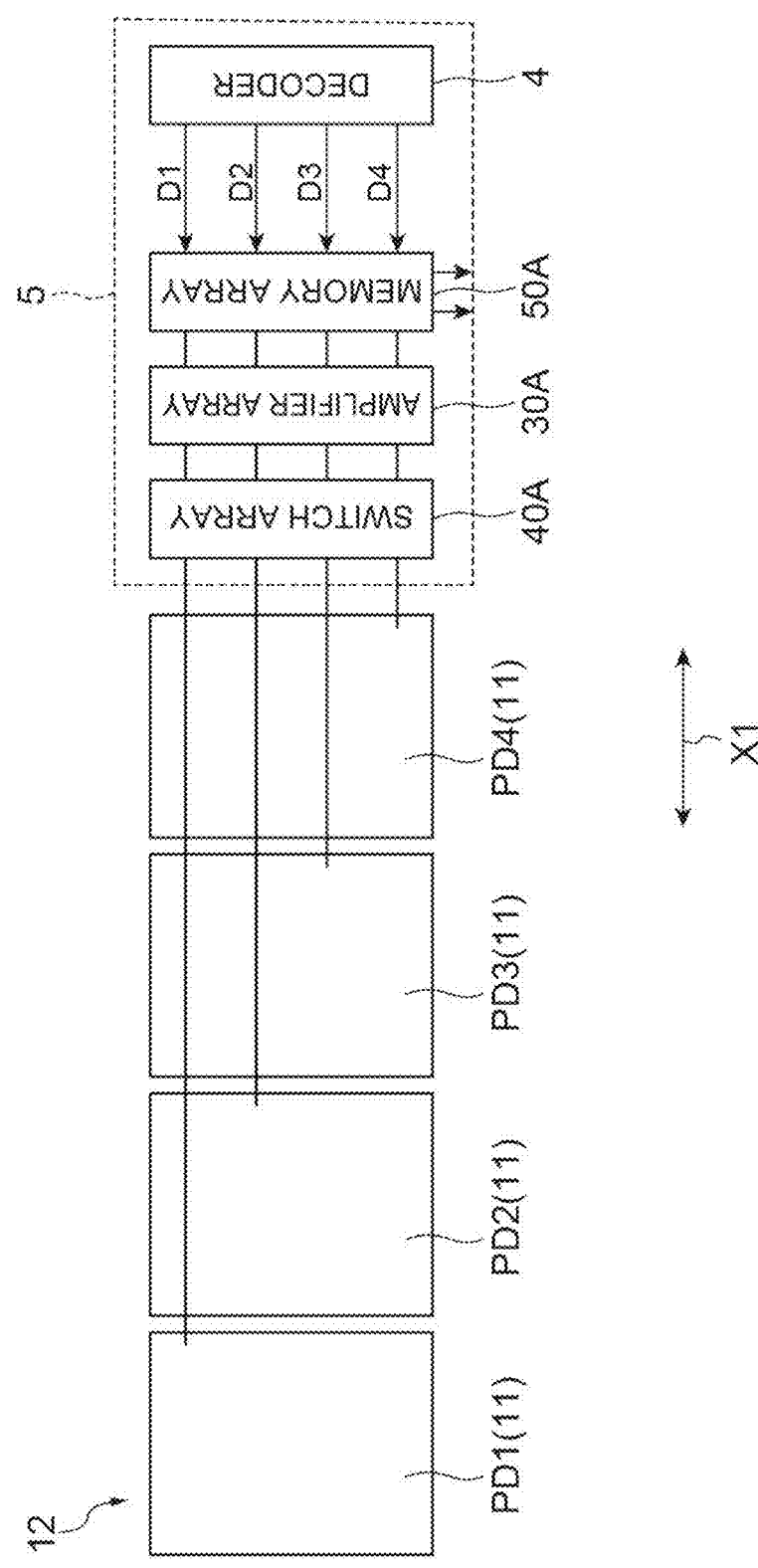
FIG. 19 is a diagram showing the circuit configurations of a pixel array and a circuit unit in a third modification example.

The imaging device 1 may be configured as in a third modification example shown in FIGS. 19 to 27. In the third modification example, the light receiving element of each pixel portion 11 is a surface type photodiode. As shown in FIG. 19, each circuit unit 5 includes a switch array (switch circuit) 40A, an amplifier array 30A, and a memory array 50A.

Figure 20:
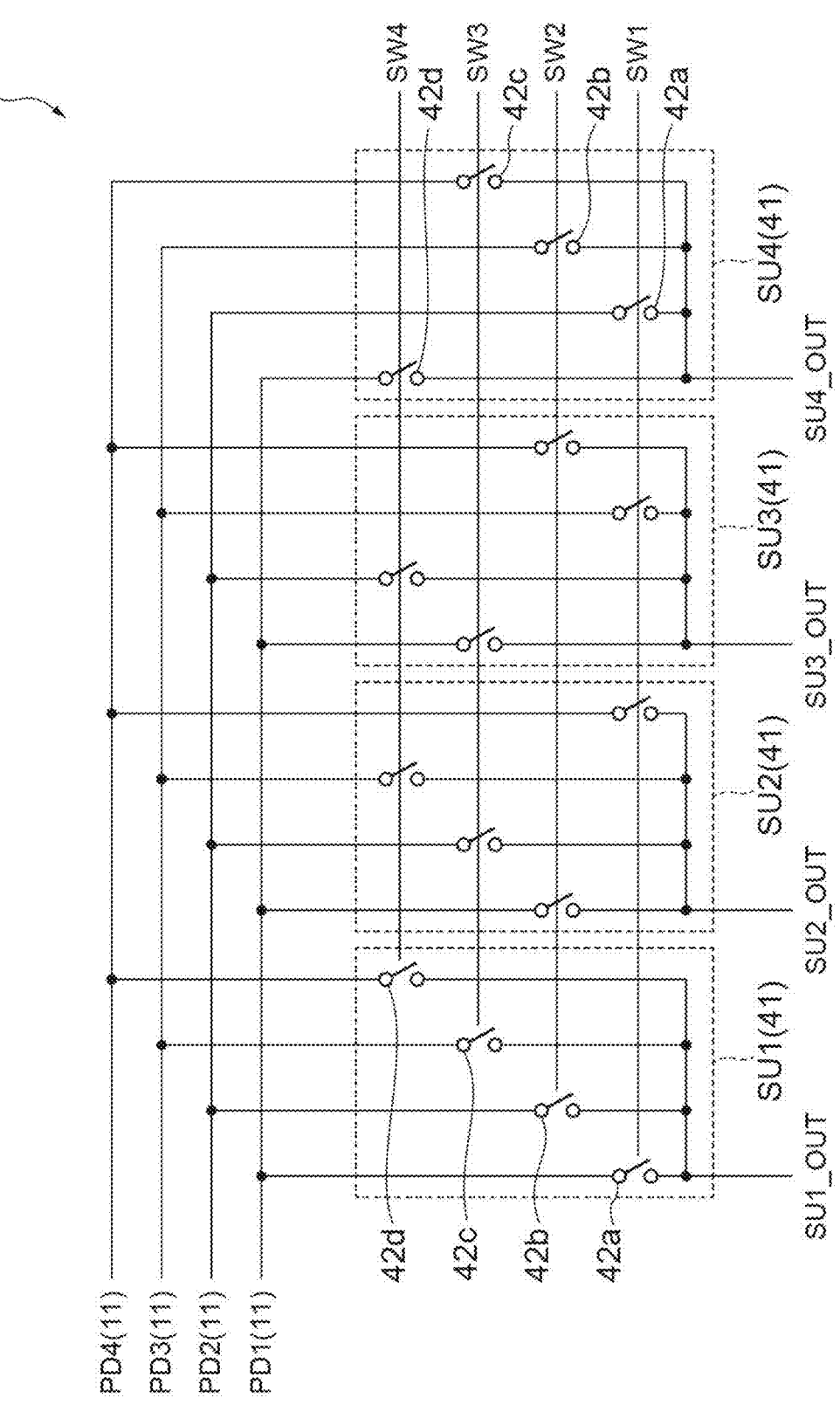
FIG. 20 is a diagram showing the circuit configuration of a switch array in the third modification example.

As shown in FIG. 20, the switch array 40A is configured similarly to the switch array 40 in the above-described first embodiment except that the switch array 40A is connected between the pixel portion 11 and the amplifier array 30A. The switch array 40A is configured such that the connection states between the pixel portions PD1 to PD4 and the capacitive portions 33 of the charge amplifiers CA1 to CA4 (adding sections) are switched according to ON/OFF of the switches 42a to 42Cd.

Figure 21:
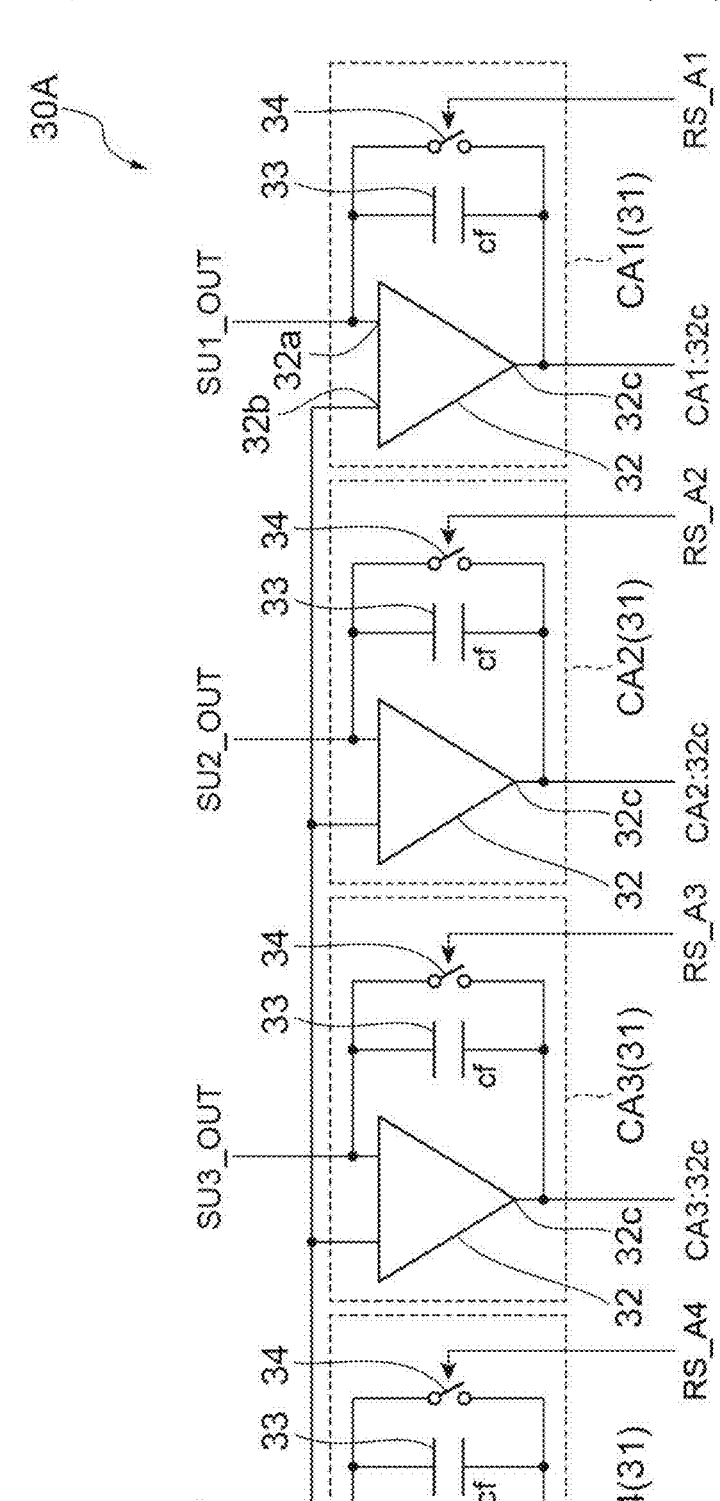
FIG. 21 is a diagram showing the circuit configuration of an amplifier array in the third modification example.

As shown in FIG. 21, the amplifier array 30A is connected between the switch units SU1 to SU4 and the memory units MR1 to MR4. Separate reset signals RS_A1, RS_AC2, RS_A3, and RS_A4 are input to the reset switches 34 of the charge amplifiers CA1, CA2, CA3, and CA4. Therefore, it is possible to independently reset the capacitive portions 33 of the charge amplifiers CA1 to CA. The amplifier array 30A is configured similarly to the amplifier array 30 in the above-described first embodiment except for these points.

Figure 22:
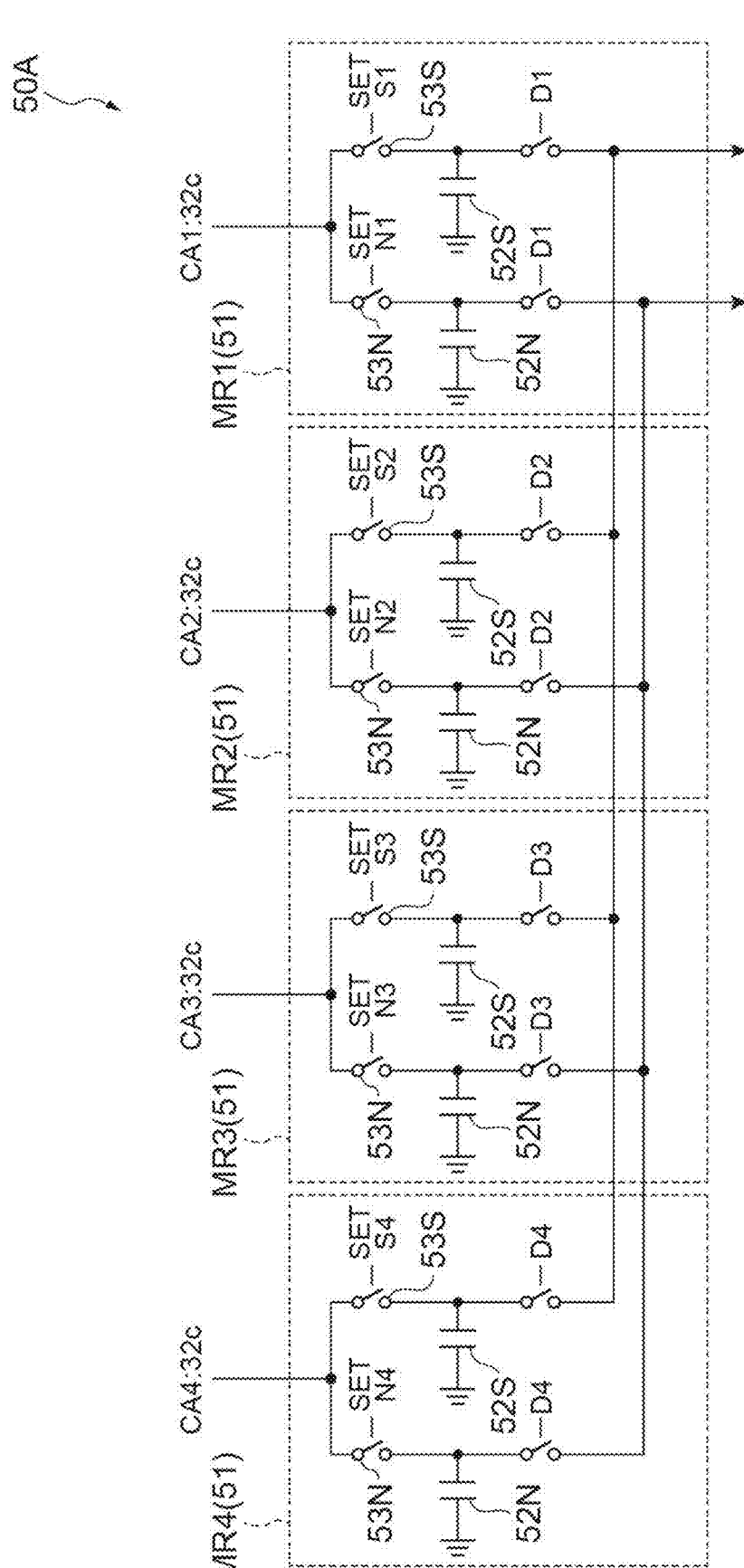
FIG. 22 is a diagram showing the circuit configuration of a switch array in the third modification example.

As shown in FIG. 22, voltage signals from the charge amplifiers CA1 to CA4 are input to the memory array 50A. Output signals from the memory units MR1 to MR4 are read by using, for example, a differential amplifier. In the memory unit MR1, the switches 53N and 53S are turned on and off according to the switching signals SETN1 and SETS1, and the switches 54N and 54S are turned on and off according to the read signal D1. In the memory unit MR2, the switches 53N and 53S are turned on and off according to the switching signals SETN2 and SETS2, and the switches 54N and 54S are turned on and off according to the read signal D2. In the memory unit MR3, the switches 53N and 53S are turned on and off according to the switching signals SETN3 and SETS3, and the switches 54N and 54S are turned on and off according to the read signal D3. In the memory unit MR4, the switches 53N and 53S are turned on and off according to the switching signals SETN4 and SETS4, and the switches 54N and 54S are turned on and off according to the read signal D4. The memory array 50A does not have the reset switch 55, and is reset when the differential amplifier described above is reset. The memory array 50A is configured similarly to the memory array 50 in the above-described first embodiment except for these points.

In the third modification example as well, the M circuit units 5 are arranged so as to be adjacent to the corresponding pixel array 12 in the first direction X1, and each circuit unit 5 has N arrangement regions R aligned in the second direction X2. In addition, each circuit unit 5 may have T (T is an integer of N or more) arrangement regions R. In the third modification example, one charge amplifier 31 and one memory unit 51 are arranged in each arrangement region R. The width of each arrangement region R in the second direction X2 is equal to or less than 1/N of the width of the pixel portion 11 in the second direction X2.

Figure 23:
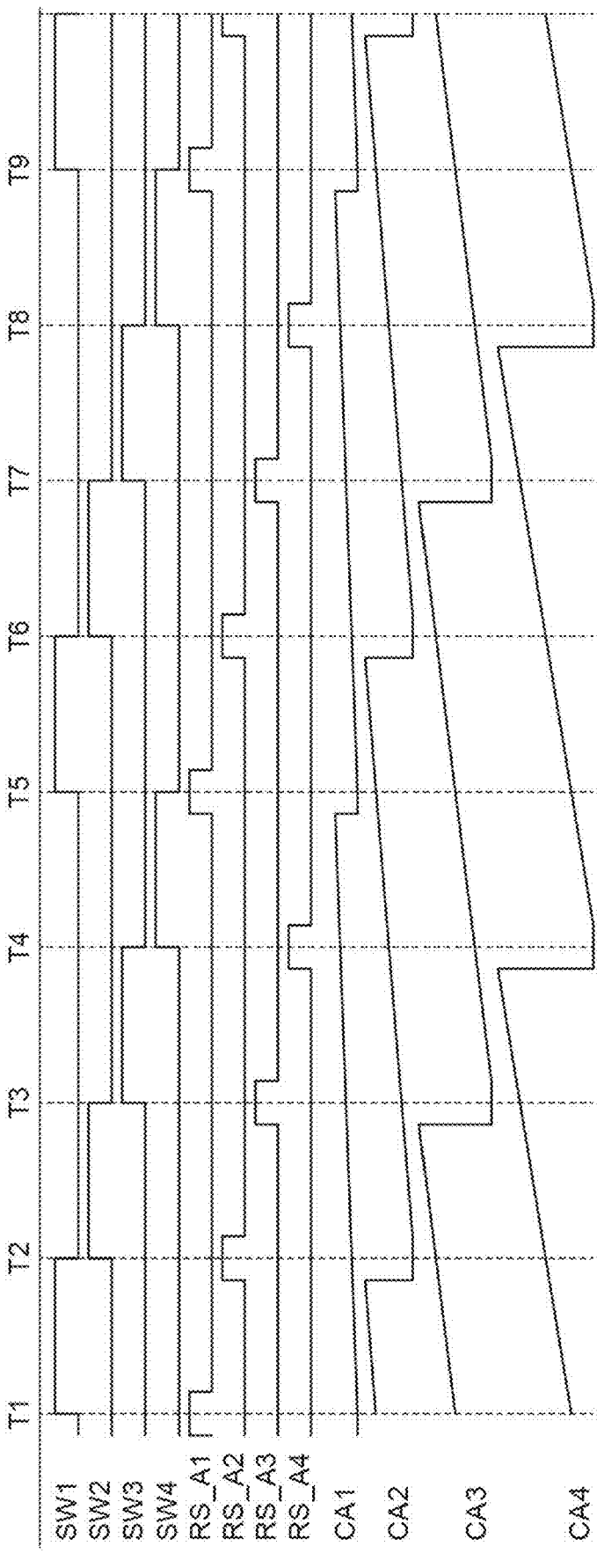
FIG. 23 is a timing chart showing the operation of an imaging device according to the third modification example.
Figure 24:
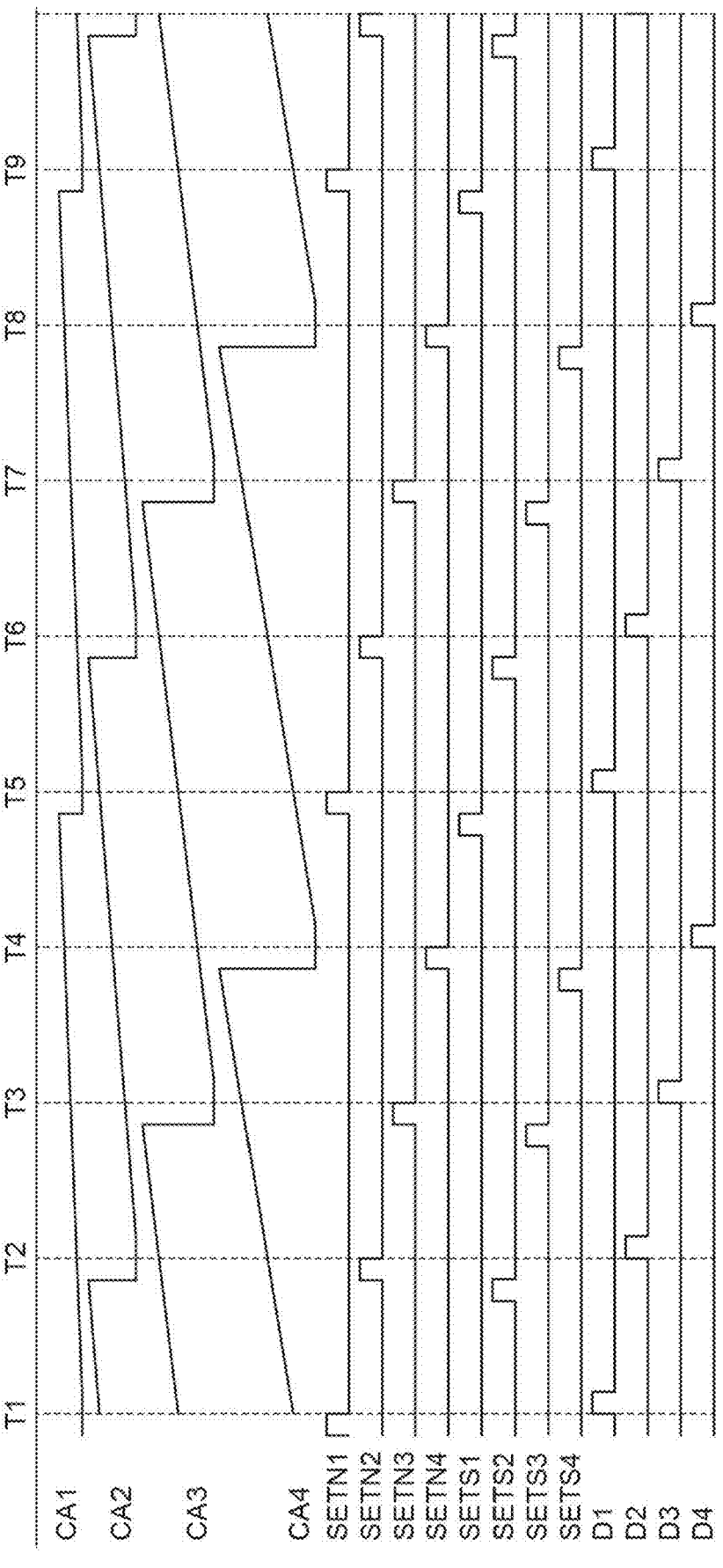
FIG. 24 is a timing chart showing the operation of the imaging device according to the third modification example.
Figure 26:
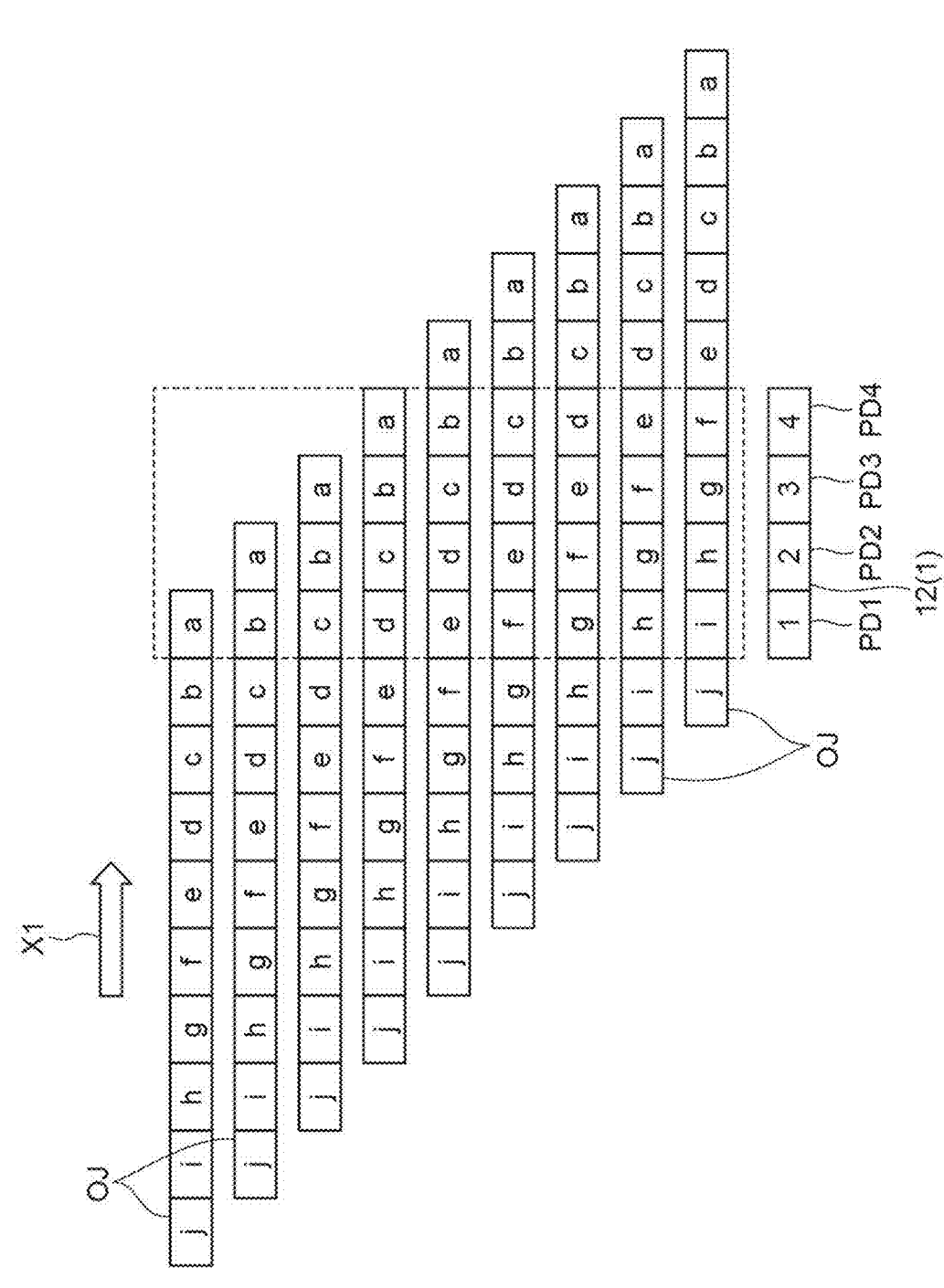
FIG. 26 is a diagram for explaining a TDI operation in the third modification example.

FIGS. 23 to 25 are timing charts showing the operation of the imaging device 1 according to the third modification example, and FIGS. 26 and 27 are diagrams for explaining addition processing by the TDI operation in the third modification example. In the third modification example, the capacitive portions 33 of the charge amplifiers CA1 to CA4 in which the charge signals output from the pixel portions PD1 to PD4 are accumulated are switched according to the arrangement order of the pixel portions PD1 to PD4 along the first direction X1.

That is, by each portion operating as shown in FIGS. 23 and 24, as shown in FIG. 25, the charge signals output from the pixel portions PD1, PD4, PD3, and PD2 are accumulated in the capacitive portions 33 of the charge amplifiers CA1, CA2, CA3, and CA4, respectively, in the period between times T1 and T2. At time T2, the charge signal accumulated in the capacitive portion 33 of the charge amplifier CA2 is read. In the period between times T2 and T3, the charge signals output from the pixel portions PD2, PD1, PD4, and PD3 are accumulated in the capacitive portions 33 of the charge amplifiers CA1, CA2, CA3, and CA4, respectively. At time T3, the charge signal accumulated in the capacitive portion 33 of the charge amplifier CA3 is read. In the period between times T3 and T4, the charge signals output from the pixel portions PD3, PD2, PD1, and PD4 are accumulated in the capacitive portions 33 of the charge amplifiers CA1, CA2, CA3, and CA4, respectively. At time T4, the charge signal accumulated in the capacitive portion 33 of the charge amplifier CA4 is read. In the period between times T4 and T5, the charge signals output from the pixel portions PD4, PD3, PD2, and PD1 are accumulated in the capacitive portions 33 of the charge amplifiers CA1, CA2, CA3, and CA4, respectively. At time T5, the charge signal accumulated in the capacitive portion 33 of the charge amplifier CA1 is read.

As shown in FIGS. 26 and 27, in the TDI operation in the third modification example, the charge signals output from the pixel portions PD1 to PD4 when light transmitted through the same region in the object OJ is detected are added (accumulated) as analog values in the same charge amplifiers CA1 to CA4. For example, a signal based on the detection of light from the region a is added by the charge amplifier CA1. Then, a charge signal (4a) obtained by adding the signals for four frames is read from the charge amplifier CA1 at time T5.

According to the third modification example as well, it is possible to realize an efficient TDI operation while suppressing an increase in circuit size and reducing the amount of output signal. That is, in the imaging device 1 according to the third modification example, each of the M circuit units 5 includes the N charge amplifiers 31 and the switch array 40A (switch circuit). Then, in each circuit unit 5, the connection state between the pixel portion 11 and the charge amplifier 31 is switched so that the capacitive portion 33 of the charge amplifier 31 in which the charge signal output from the pixel portion 11 is accumulated (added as charge (analog value)) is switched according to the arrangement order of N pixel portions 11 along the first direction X1. In this manner, the TDI operation is realized. By realizing the TDI operation by such analog addition processing using the charge amplifier 31, an increase in circuit size can be suppressed as compared with a case where a memory for simply digitally adding signals is provided in the circuit unit 5, for example. In addition, the amount of output signal can be reduced as compared with a case where signals are output to the outside of the imaging device 1 and digital addition processing is performed outside, for example. In addition, in the imaging device 1, the charge signal output from the pixel portion 11 is accumulated in the capacitive portion 33 of the charge amplifier 31, analog-added, and converted into a voltage signal by the charge amplifier 31. Therefore, since the loss in transferring the charge signal from the pixel portion 11 can be reduced, an efficient TDI operation can be realized. As a result, even with the imaging device 1 according to the third modification example, it is possible to realize an efficient TDI operation while suppressing an increase in circuit size and reducing the amount of output signal.

In addition, since the width of each arrangement region R in the second direction X2 is equal to or less than 1/N of the width of the pixel portion 11 in the second direction X2, the circuit units 5 can be efficiently arranged. As a result, an increase in circuit size can be further suppressed. In addition, in the third modification example, a memory section having only one memory unit 51 may be provided instead of the memory array 50, and a shift register may be provided instead of the decoder 4. Even in this case, the TDI operation can be realized. However, by performing reading with the decoder 4 using the memory array 50 having N memory units 51 as in the third modification example, it is possible to change the number of frames to be added.

Figure 28:
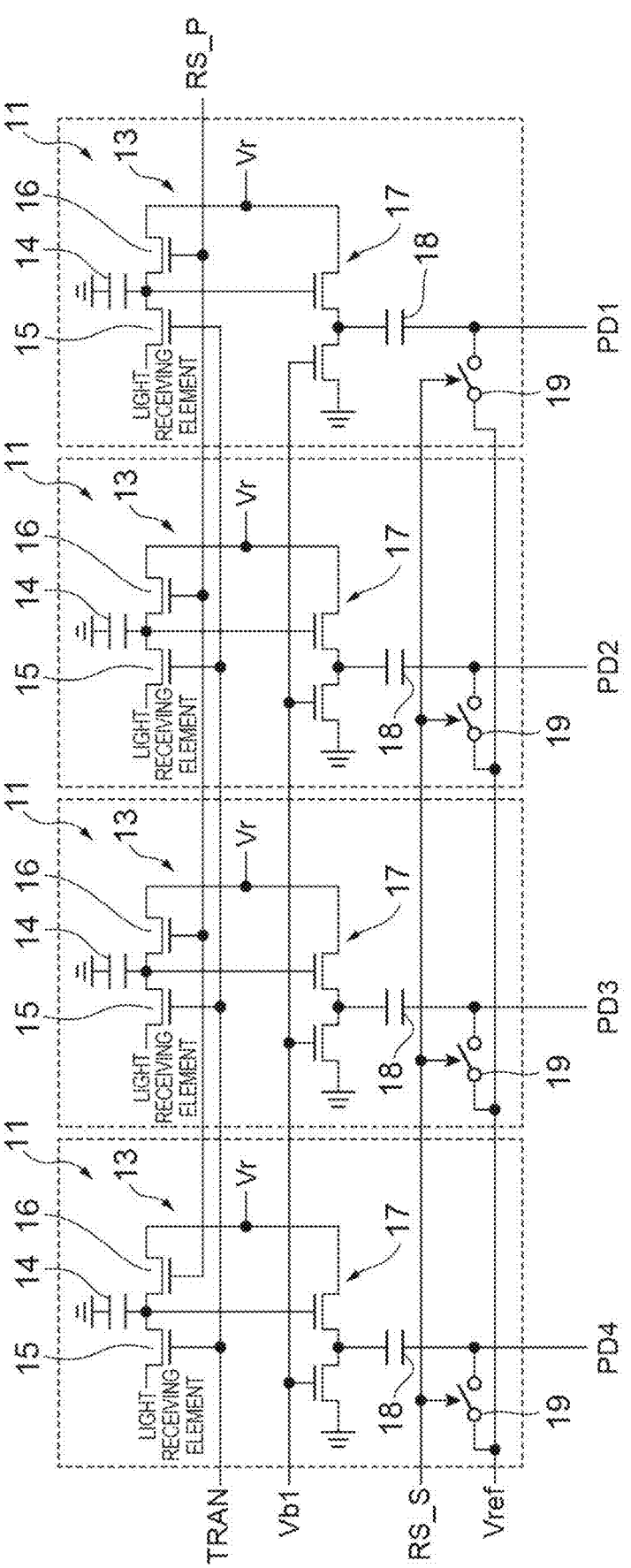
FIG. 28 is a diagram showing the circuit configurations of a pixel array and a circuit unit in a fourth modification example.
Figure 29:
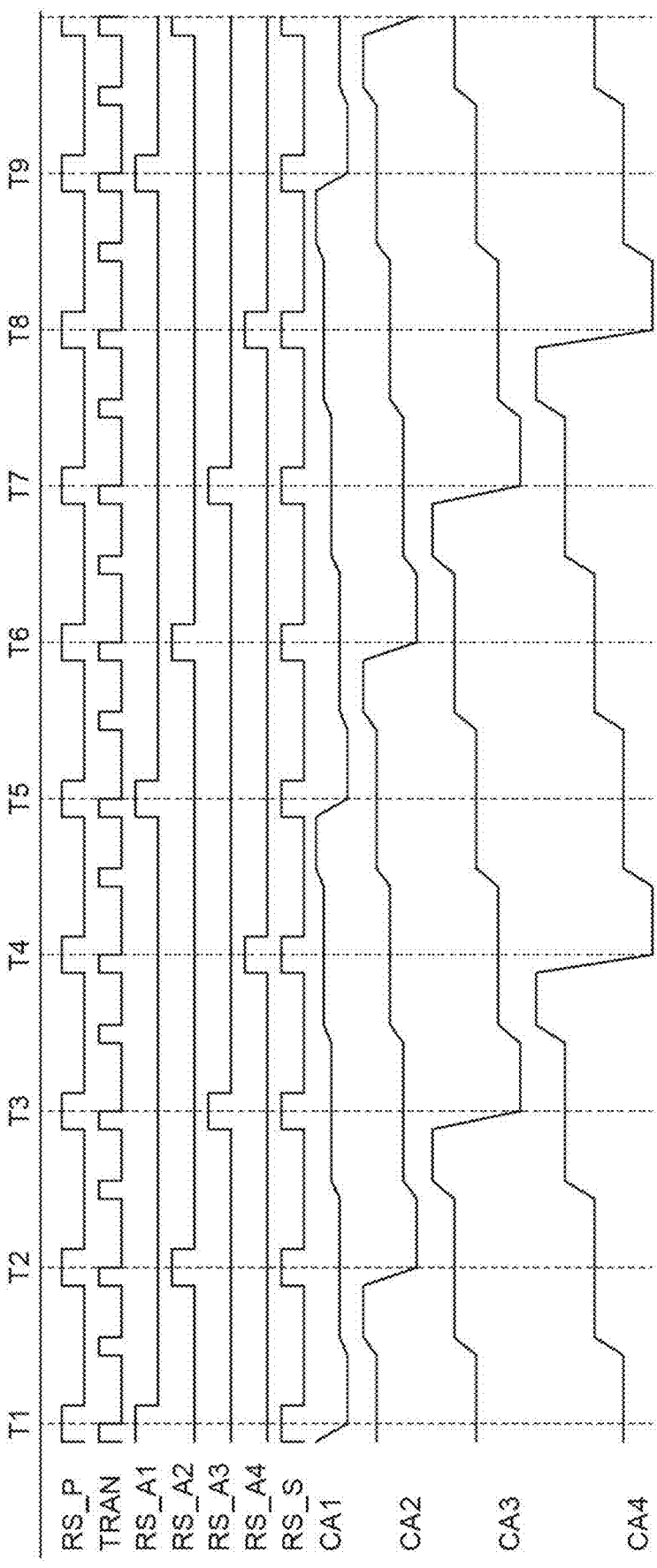
FIG. 29 is a timing chart showing the operation of an imaging device according to the fourth modification example.
Figure 30:
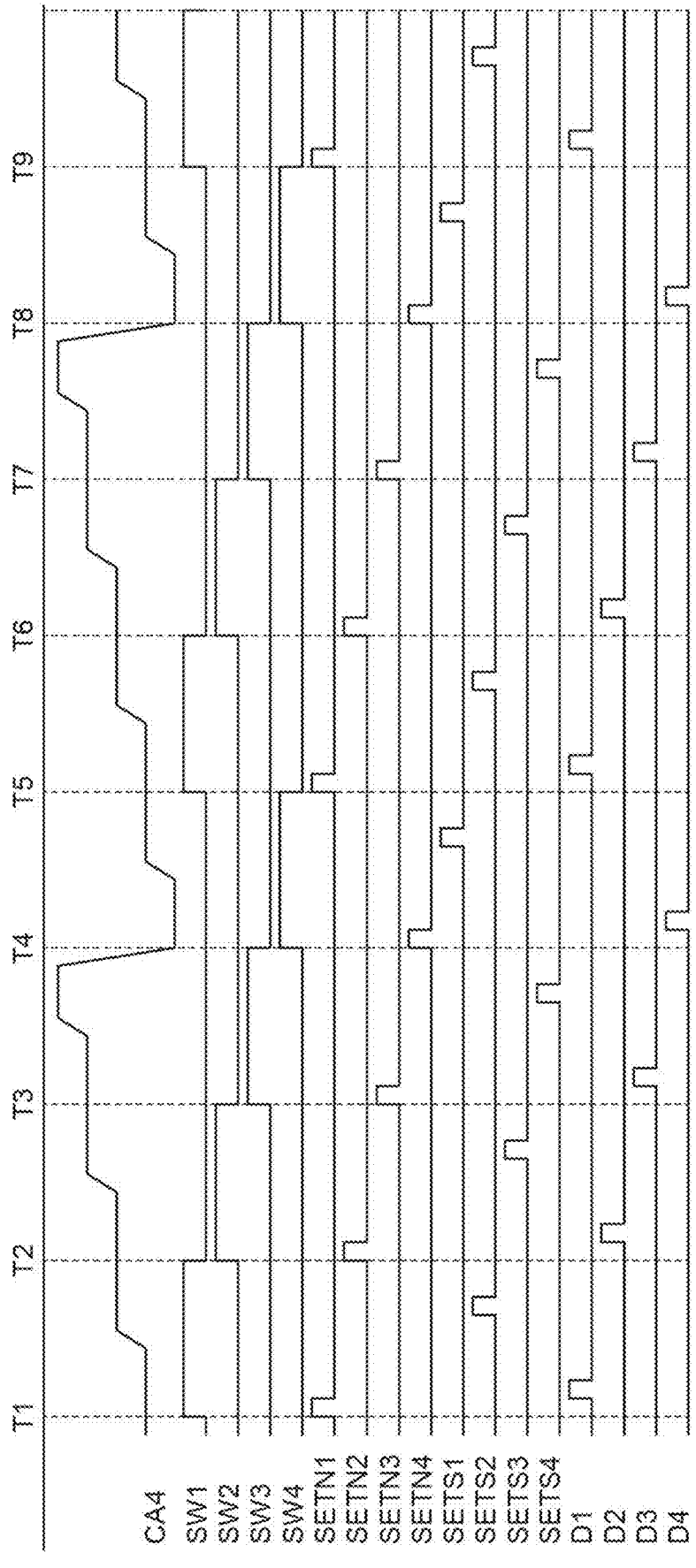
FIG. 30 is a timing chart showing the operation of the imaging device according to the fourth modification example.

As a fourth modification example, the light receiving element of each pixel portion 11 may be an embedded photodiode in the third modification example. In the fourth modification example, as shown in FIG. 28, each pixel portion 11 has a pixel amplifier 13 in addition to the light receiving element, similarly to the second modification example. Each pixel portion 11 is connected to the switch unit 41 through the coupling capacitor 18. A switch 19 that is turned on and off according to a reset signal RS_S is provided between the coupling capacitor 18 and the switch unit 41. A charge signal generated by the light receiving element is converted into a voltage signal by the source follower amplifier 17. The voltage signal is converted into a charge signal through the coupling capacitor 18. In FIG. 28, PD1, PD2, PD3, and PD4 are shown as outputs from the pixel portions 11. The imaging device 1 according to the fourth modification example operates according to the timing charts shown in FIGS. 29 and 30. According to the fourth modification example as well, as in the third modification example described above, it is possible to realize an efficient TDI operation while suppressing an increase in circuit size and reducing the amount of output signal.

The present disclosure is not limited to the embodiment and its modification examples described above. For example, the pixel portion 11 may perform photoelectric conversion, and may detect not only visible light but also infrared rays or X-rays. In the first embodiment described above, the A/D converter 61 is not limited to the single slope type. The A/D converter 61 may convert the input voltage signal into a digital value and sequentially add the digital value. In the first embodiment described above, the switch array 40 may be connected between the comparator 62 and the counter 63 of the A/D converter 61. Even in this case, the connection states between the charge amplifiers CA1 to CA4 and the capacitors 65 of the A/D converters AD1 to AD4 can be switched by the switch array 40.

In the first embodiment described above, the count value obtained by counting according to the signals for four frames is read as a digital value. However, by changing the timings of the reset signals RS_C1 to RS_C4 input to the counters 63 of the A/D converters AD1 to AD4 and the read signals D1 to D4 from the decoder 4, the number of frames to be added can be changed. In the third and fourth modification examples as well, the pixel unit 2, the circuit section 3, and the decoder 4 may be formed on separate chips as in the first modification example.

Second Embodiment

Figure 31:
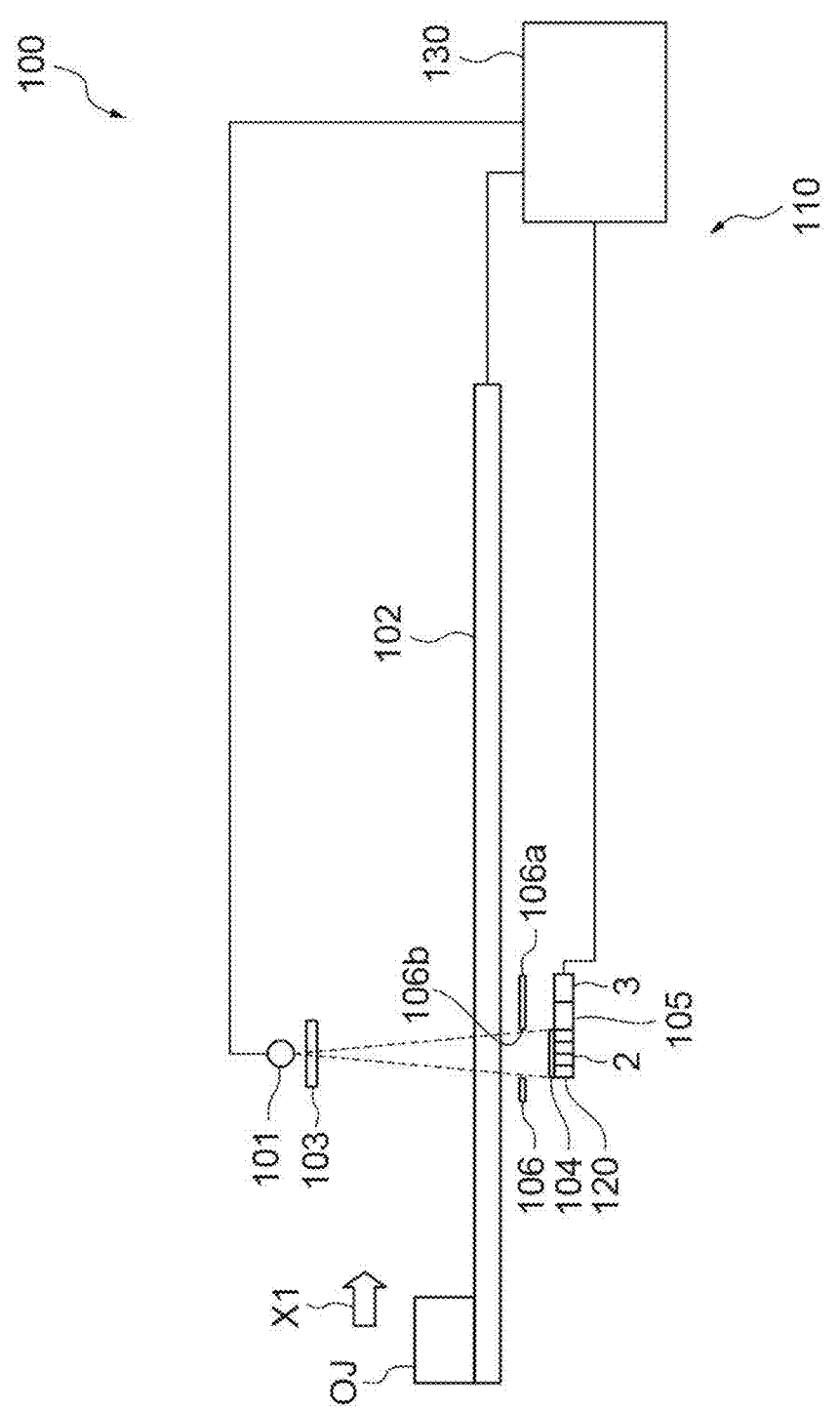
FIG. 31 is a configuration diagram of an X-ray image acquisition device according to a second embodiment.

An X-ray image acquisition system 100 shown in FIG. 31 is a system that acquires an X-ray image of an object OJ transported along the first direction X1. The X-ray image acquisition system 100 includes an X-ray source 101, a transport unit 102, and an X-ray image acquisition device 110. The X-ray image acquisition device 110 includes an imaging device 120 and a control unit 130.

The X-ray source 101 outputs X-rays. A slit member 103 for defining the emission range of X-rays from the X-ray source 101 is arranged in front of the X-ray source 101. The transport unit 102 is, for example, a belt conveyor, and transports the object OJ placed on the belt along the first direction X1 by rotating the belt. A transport path by the transport unit 102 is set so as to pass through the emission range of X-rays from the X-ray source 101. As an example, the object OJ is food, and the X-ray image acquisition system 100 is used to inspect whether or not foreign matter is mixed in the object OJ.

As shown in FIGS. 1 and 2, the imaging device 120 includes the pixel unit 2 and the circuit section 3. In addition, although not shown, the imaging device 120 further includes the decoder 4 described above. The circuit section 3 includes M circuit units 5 provided corresponding to the M pixel arrays 12. Each circuit unit 5 includes an amplifier array 30, a switch array (switch section) 40, a memory array 50, and an ADC array 60. The imaging device 120 is configured in the same manner as the imaging device 1 according to the first embodiment, except for the points described below.

In the imaging device 120, the width DS of a gap portion 105, which is a portion between the pixel unit 2 and the circuit section 3 in the first direction X1, is twice or more the width of the pixel portion 11 in the first direction X1. In other words, between the pixel unit 2 and the M circuit units 5, there is a gap of twice or more the width of the pixel portion 11. The gap DS may be five times or more the width of the pixel portion 11. The gap DS is, for example, approximately 2 mm.

The X-ray image acquisition device 110 further includes a scintillator 104 arranged above the pixel unit 2 (between the pixel unit 2 and the transport unit 102). The scintillator 104 converts X-rays transmitted through the object OJ into scintillation light. Each pixel portion 11 of the imaging device 120 receives and detects the scintillation light converted by the scintillator 104.

The X-ray image acquisition device 110 further includes a shielding member 106 arranged between the imaging device 120 and the transport unit 102. The shielding member 106 has a main body portion 106a that is formed of, for example, lead and has an impermeablity (shieling property) with X-rays. A slit (opening) 106b is formed in the main body portion 106a. The shielding member 106 is arranged such that the pixel unit 2 faces the slit 106b and the M circuit units 5 face the main body portion 106a (a portion of the shielding member 106 other than the slit 106b). As a result, X-rays output from the X-ray source 101 and directed to the pixel unit 2 pass through the slit 106b, and X-rays output from the X-ray source 101 and directed to the circuit unit 5 are shielded by the shielding member 106. The shielding member 106 may cover the gap portion 105 in the imaging device 120. That is, the gap portion 105 may face the main body portion 106a of the shielding member 106.

Figure 32:
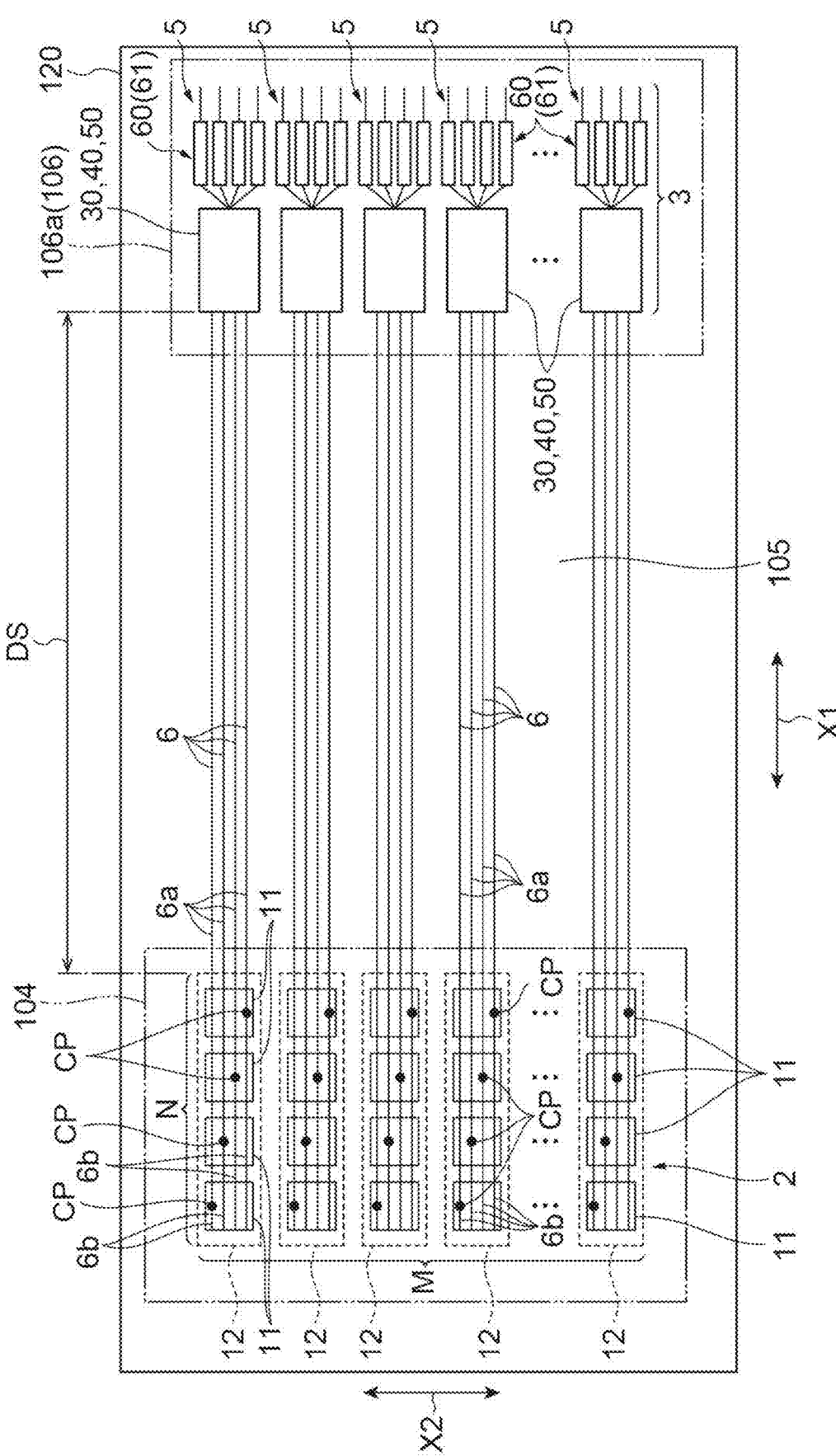
FIG. 32 is a plan view of an imaging device according to the second embodiment.

In the imaging device 120, the N pixel portions 11 of each of the M pixel arrays 12 and the M circuit units 5 are electrically connected to each other by N×M wirings 6. Each wiring 6 extends linearly along the first direction X1 so as to pass over the pixel portion 11. Each wiring 6 includes a main body portion 6a extending linearly from the circuit unit 5 to the pixel portion 11 and an extending portion 6b extending linearly from a connection point CP between the main body portion 6a and the pixel portion 11 to a side opposite to the circuit unit 5 (left side in FIG. 32). In this example, the extending portion 6b is electrically isolated from the main body portion 6a. That is, the pixel portion 11 and the circuit unit 5 are electrically connected to each other by the main body portion 6a.

The control unit 130 is formed by, for example, a computer including a processor (CPU) and a RAM and a ROM that are recording media. The control unit 130 is electrically connected to the X-ray source 101, the transport unit 102, and the imaging device 120, and controls the operations of the X-ray source 101, the transport unit 102, and the imaging device 120. In addition, a control unit for controlling the X-ray source 101, the transport unit 102, and the imaging device 120 may be provided separately.

[TDI Operation]

Figure 33:
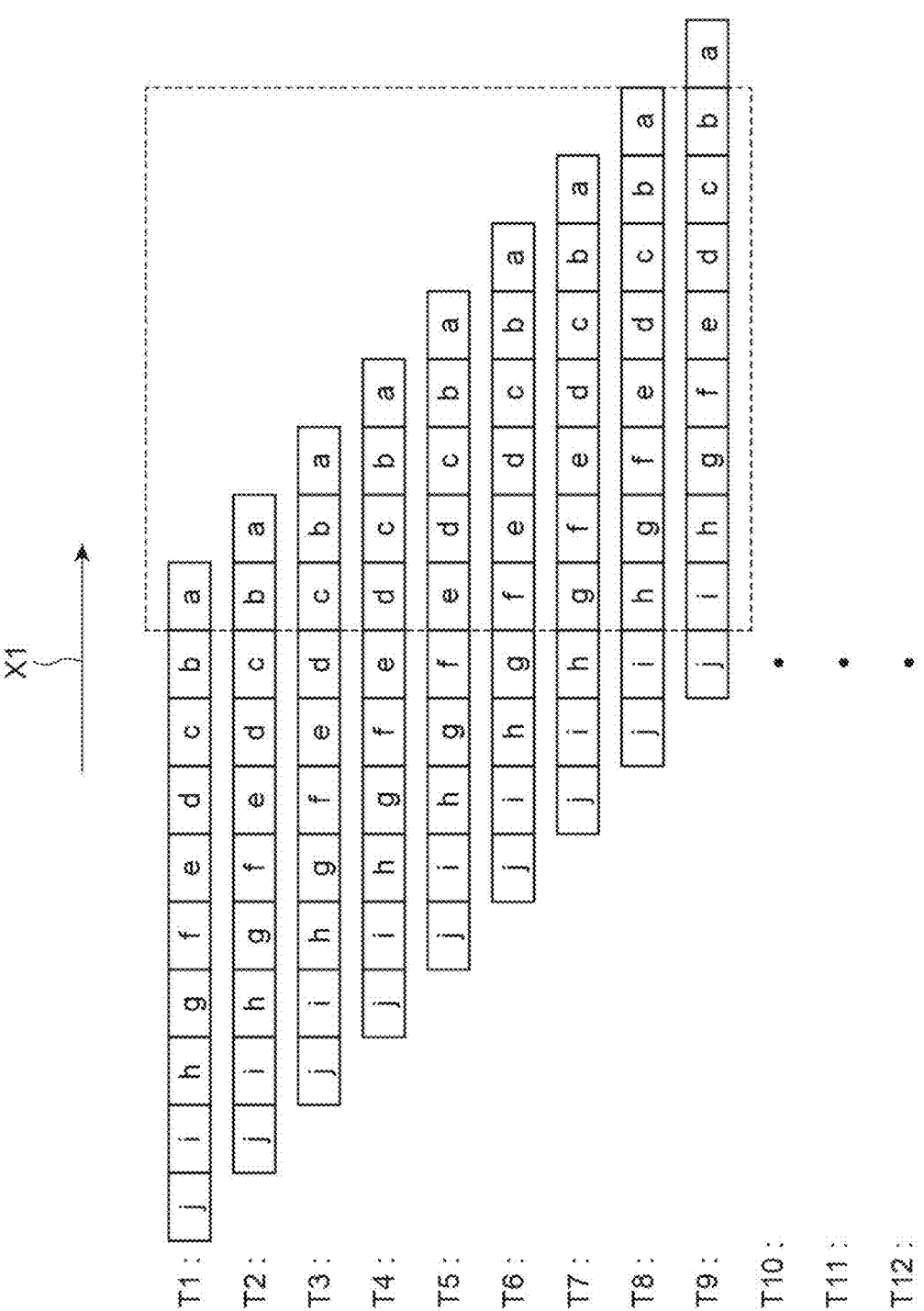
FIG. 33 is a diagram for explaining a TDI operation in the second embodiment.

A TDI operation in the X-ray image acquisition system 100 will be described with reference to FIGS. 33 and 34. The TDI operation is realized by controlling each unit by the control unit 130. Hereinafter, a case where N is 8 will be described as an example. However, the same applies when N is other values. The eight pixel portions 11 provided in one pixel array 12 are assumed to be pixel portions PD1 to PD8 according to the arrangement order in the first direction X1, respectively, and the A/D converters 61 that convert voltage signals corresponding to charge signals from the pixel portions PD1, PD2, PD3, PD4, PD5, PD6, PD7, and PD8 into digital values are assumed to be adding sections AN1, AN2, AN3, AN4, AN5, AN6, AN7, and AN8, respectively.

Also in this TDI operation, as in the first embodiment described above, the switch array 40 switches the connection state between the charge amplifier 31 and the A/D converter 61 (between the pixel portions PD1 to PD8 and the adding sections AN1 to AN8) so that the adding sections AN1 to AN8 that perform counting according to electrical signals (voltage signals) corresponding to the output signals (charge signals) output from the pixel portions PD1 to PD8 are switched according to the arrangement order of the pixel portions PD1 to PD8 along the first direction X1. As a result, the electrical signals (voltage signals) corresponding to the output signals (charge signals) output from the pixel portions PD1 to PD8 by detecting light transmitted through the same region of the object OJ are added by the same adding sections AN1 to AN8.

For example, as shown in FIG. 34, in a period between times T2 and T3, the electrical signal corresponding to the output signal from the pixel portion PD1 is added by the adding section AN1. In a period between times T3 and T4, the electrical signals corresponding to the output signals from the pixel portions PD1 and PD2 are added by the adding sections AN2 and AN1, respectively. In a period between times T4 and T5, the electrical signals corresponding to the output signals from the pixel portions PD1, PD2, and PD3 are added by the adding sections AN3, AN2, and AN1, respectively. In a period between times T5 and T6, the electrical signals corresponding to the output signals from the pixel portions PD1, PD2, PD3, and PD4 are added by the adding sections AN4, AN3, AN2, and AN1, respectively. Addition processing is sequentially performed at subsequent times. At time T10, a voltage signal (8a) obtained by adding the signals for eight frames is read from the adding section AN1 and converted into a digital value. Thus, in this example, signals for eight frames are added and acquired. The data output from the X-ray image acquisition device 110 may be the digital signal itself converted into a digital value (addition operation), or may be an average value obtained by dividing the digital value by the number of frames added (average calculation). The calculation method may be selectable from the addition operation and the average calculation.

In this TDI operation, the timing at which the switch array 40 switches the connection states between the pixel portions PD1 to PD8 and the adding sections AN1 to AN8 is synchronized with the transportation (for example, transport speed) of the object OJ along the first direction X1. For example, the control unit 130 may generate a periodic line signal synchronized with the transportation of the object OJ. In this case, the control unit 130 controls the switching timing of the switch array 40 based on the line signal, and causes the imaging device 120 to perform a TDI operation. Alternatively, the control unit 130 may receive an external synchronization signal generated by an element other than the control unit 130. In this case, the control unit 130 controls the switching timing of the switch array 40 based on the synchronization signal, and causes the imaging device 120 to perform a TDI operation. Such a synchronization signal may be generated by an encoder provided in the transport unit 102, for example. The transport speed is, for example, about 10 m/min to 60 m/min.

[Function and Effect]

In the X-ray image acquisition device 110, each of the M circuit units 5 includes N A/D converters 61 (adding sections) and the switch array 40 (switch section). Then, in each circuit unit 5, the connection states between the N pixel portions 11 and the N A/D converters 61 are switched in synchronization with the transportation of the object OJ along the first direction X1 so that the electrical signals (voltage signals) corresponding to the output signals (charge signals) output from the pixel portions 11 by detecting X-rays transmitted through the same region of the object OJ are added by the same A/D converter 61, thereby realizing the TDI operation. By realizing the TDI operation by addition processing in the circuit unit 5 as described above, it is possible to avoid the problem of the speed of the addition operation in the storage means described above. Therefore, it is possible to realize the TDI operation even when the number of pixel portions 11 increases. In addition, since a memory such as the storage means described above can be omitted, the configuration can be simplified. In addition, in the X-ray image acquisition device 110, the TDI operation is realized by switching the connection state between the pixel portion 11 and the A/D converter 61 using the switch array 40. Therefore, the circuit size can be reduced as compared with a case where a memory for simply digitally adding signals is provided in the circuit unit 5, for example. As a result, according to the X-ray image acquisition device 110, the TDI operation can be realized even when the number of pixel portions 11 increases, and the configuration can be simplified and the circuit size can be reduced. In addition, the S/N ratio in the acquired image can be improved by acquiring the signals added by the TDI operation. Such a TDI operation is particularly effective when the output power of the X-ray source 101 is reduced in order to reduce the amount of X-ray leakage or extend the life of the X-ray source 101. This is because when the output power of the X-ray source 101 is reduced, the amount of signal decreases to reduce the S/N ratio. In addition, since addition processing is performed within the imaging device 120, the number of wirings for connection to the outside can be reduced. As a result, it is possible to realize multiple rows of small pixels. In addition, in the case of the digital addition operation in the storage means described above, data recording, calculation, and erasing should be performed repeatedly, which imposes a heavy load on the computer. In the X-ray image acquisition device 110, however, since data accumulation is performed in the adding section by the switching of the switch array 40, the load on the computer (control unit 130) can be reduced. In addition, as described above, the ADC array 60 may include T (T is an integer of N or more) A/D converters 61. That is, each circuit unit 5 may have T A/D converters 61 (adding sections). Even in this case, the TDI operation can be performed in the same manner as in the embodiment described above.

The N pixel portions 11 receive scintillation light converted by the scintillator 104. Therefore, X-rays can be converted into scintillation light to be detected.

The adding section is formed by the A/D converter 61. Therefore, the TDI operation can be realized using the A/D converter 61.

Between the pixel unit 2 and the M circuit units 5, there is the gap DS that is twice or more the width of the pixel portion 11. As a result, it is possible to suppress the incidence of X-rays on the circuit unit 5 having lower durability against X-rays than the pixel unit 2.

The pixel unit 2 faces the slit 106b of the shielding member 106, and the M circuit units 5 face the main body portion 106a of the shielding member 106 (a portion of the shielding member 106 other than the slit 106b). Therefore, it is possible to suppress the incidence of X-rays on the circuit unit 5 while allowing the incidence of X-rays on the pixel unit 2.

Each of the N×M wirings 6 extends so as to pass over the N pixel portions 11. Therefore, since the N wirings 6 are not concentrated between the M pixel arrays 12 aligned in the second direction X2, it is possible to avoid localized generation of a dead portion.

Each of the N×M wirings 6 includes the main body portion 6a extending from the circuit unit 5 to the pixel portion 11 and the extending portion 6b extending from the connection point CP between the main body portion 6a and the pixel portion 11 to the side opposite to the circuit unit 5, and the extending portion 6b is electrically isolated from the main body portion 6a. Therefore, the aperture ratio of the N pixel portions 11 can be made uniform, and the occurrence of parasitic capacitance due to the extending portion can be suppressed.

N is an integer of 8 or more. According to the X-ray image acquisition device 110, even when the number of pixel portions 11 is large like this, the TDI operation can be realized, and the configuration can be simplified and the circuit size can be reduced.

MODIFICATION EXAMPLES

As a fifth modification example, the X-ray image acquisition device 110 may have a function of switching the number of frames to be added (the number of pixel portions 11 that perform addition processing). In the example shown in FIGS. 33 and 34, signals for eight frames (all frames) are added and acquired, that is, the number of frames to be added is 8. However, the number of frames to be added may be selectable from 1 to N. More specifically, the control unit 130 may control each circuit unit 5 so that electrical signals corresponding to output signals from L pixel portions 11 aligned in the first direction X1 are added by the A/D converter 61 and then read after being converted into a digital signal by the A/D converter 61. The value of L can be selected from integers of 1 to N. 0 may be set as the value of L. That is, the X-ray image acquisition device 110 may have a mode in which addition processing is not performed.

Figure 35:
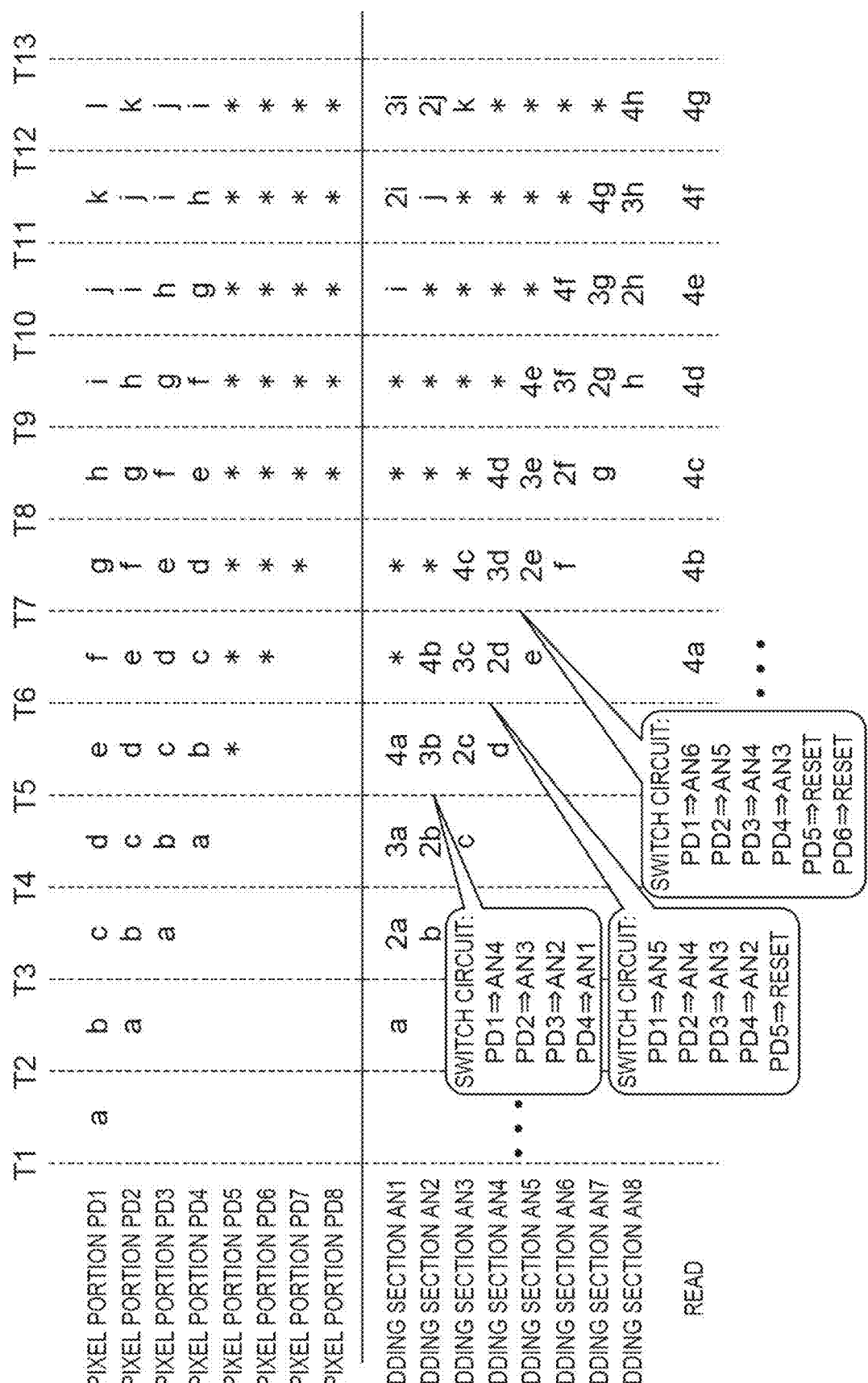
FIG. 35 is a diagram for explaining a TDI operation when switching the number of frames to be added.

FIG. 35 is a diagram for explaining a TDI operation when switching the number of frames to be added. FIG. 35 shows an example when L is 4. "*" in FIG. 35 indicates that the state may be arbitrary. That is, in the case of "*", a reset state may be applied, or there may be no connections to the adding sections AN1 to AN8. Alternatively, there may be connections to the adding sections AN1 to AN8. For example, if the signal has already been read, any state may be applied thereafter. The same applies to FIGS. 38, 39, and 46, which will be described later.

As shown in FIG. 35, in a period between times T5 and T6, the electrical signals corresponding to the output signals from the pixel portions PD1, PD2, PD3, and PD4 are added by the adding sections AN4, AN3, AN2, and AN1, respectively. In a period between times T6 and T7, the electrical signals corresponding to the output signals from the pixel portions PD1, PD2, PD3, and PD4 are added by the adding sections AN5, AN4, AN3, and AN2, respectively, and the pixel portion PD5 is in a reset state. In a period between times T7 and T8, the electrical signals corresponding to the output signals from the pixel portions PD1, PD2, PD3, and PD4 are added by the adding sections AN6, AN5, AN4, and AN3, respectively, and the pixel portions PD5 and PD6 are in a reset state. At time T6, a voltage signal (4a) obtained by adding the signals for four frames is read from the adding section AN1 and converted into a digital value. Thus, in this example, signals for four frames are added and acquired as a digital value.

According to the fifth modification example as well, as in the second embodiment described above, the TDI operation can be realized even when the number of pixel portions 11 increases, and the configuration can be simplified and the circuit size can be reduced. In addition, the number of pixel portions 11 for addition processing can be selected according to the amount of X-ray leakage or the thickness of the object, for example.

This point will be described with reference to FIGS. 36 and 37. As shown in FIGS. 36(*a*) and 36(*b*), emission of X-rays to the object OJ may be performed within a shielding box 140 in order to suppress X-ray leakage. As the emission range of X-rays becomes wider, X-rays are more likely to leak from the shielding box 140. Therefore, it is necessary to improve the shielding performance of the shielding box 140. In FIG. 36(*b*), the X-ray emission range is wider than in FIG. 36(*a*), and the amount of X-ray leakage is large. Here, if the number of frames to be added is increased, the S/N ratio can be improved. On the other hand, since it is necessary to widen the X-ray emission range, the amount of X-ray leakage increases. In this regard, according to the fifth modification example, since there is a function of switching the number of frames to be added, the number of frames to be added can be selected in consideration of the balance between the improvement of the S/N ratio and the amount of X-ray leakage.

As shown in FIGS. 37(*a*) and 37(*b*), when the X-ray source 101 is a point light source, X-rays spread in the transport direction (first direction X1) to be emitted to the object OJ. In FIG. 37(*b*), the spread range of X-rays is wider than in FIG. 37(*a*). Since the object OJ has a thickness, squint occurs due to the difference in the incident angle of X-rays. For example, positions where X-rays pass through the object OJ are different between the central pixel portion 11 and the edge pixel portion 11. When squint occurs, blurring may occur in the image. If it is necessary to suppress such blurring, it is effective to narrow the emission range of X-rays by reducing the number of frames to be added. Thus, according to the fifth modification example, it is possible to select the number of frames to be added according to the thickness of the object OJ.

As a sixth modification example, the X-ray image acquisition device 110 may have a function of switching the addition range (the range of the pixel portion 11 that performs addition processing). More specifically, the control unit 130 may control each circuit unit 5 so that electrical signals corresponding to output signals from the P-th to Q-th (P<Q) pixel portions 11 in the first direction X1 are added by the A/D converter 61 and then read from the A/D converter 61 as a digital value. The values of P and Q are selected from integers of 1 to N.

Figure 38:
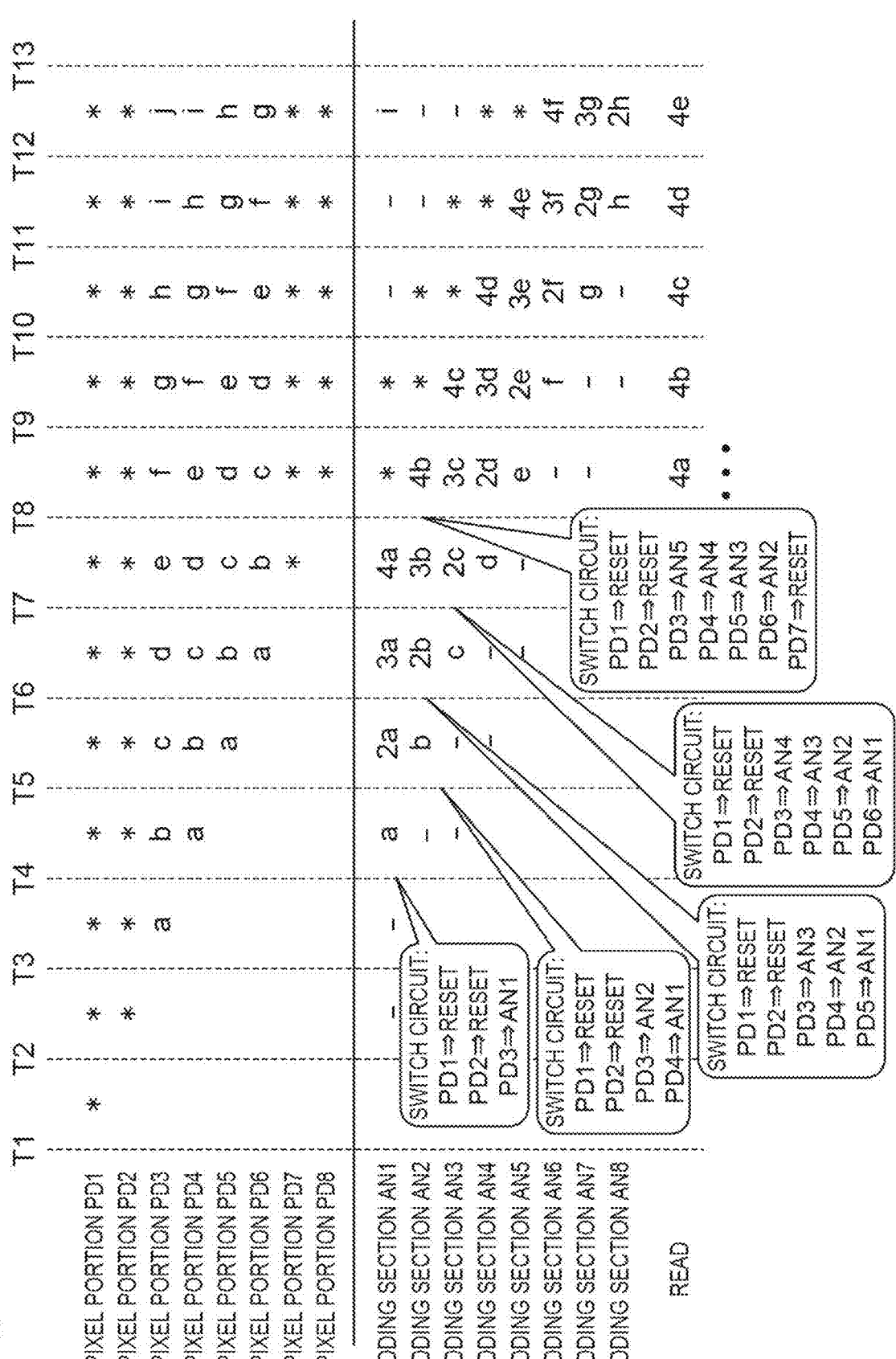
FIG. 38 is a diagram for explaining a TDI operation when switching the addition range.
Figure 39:
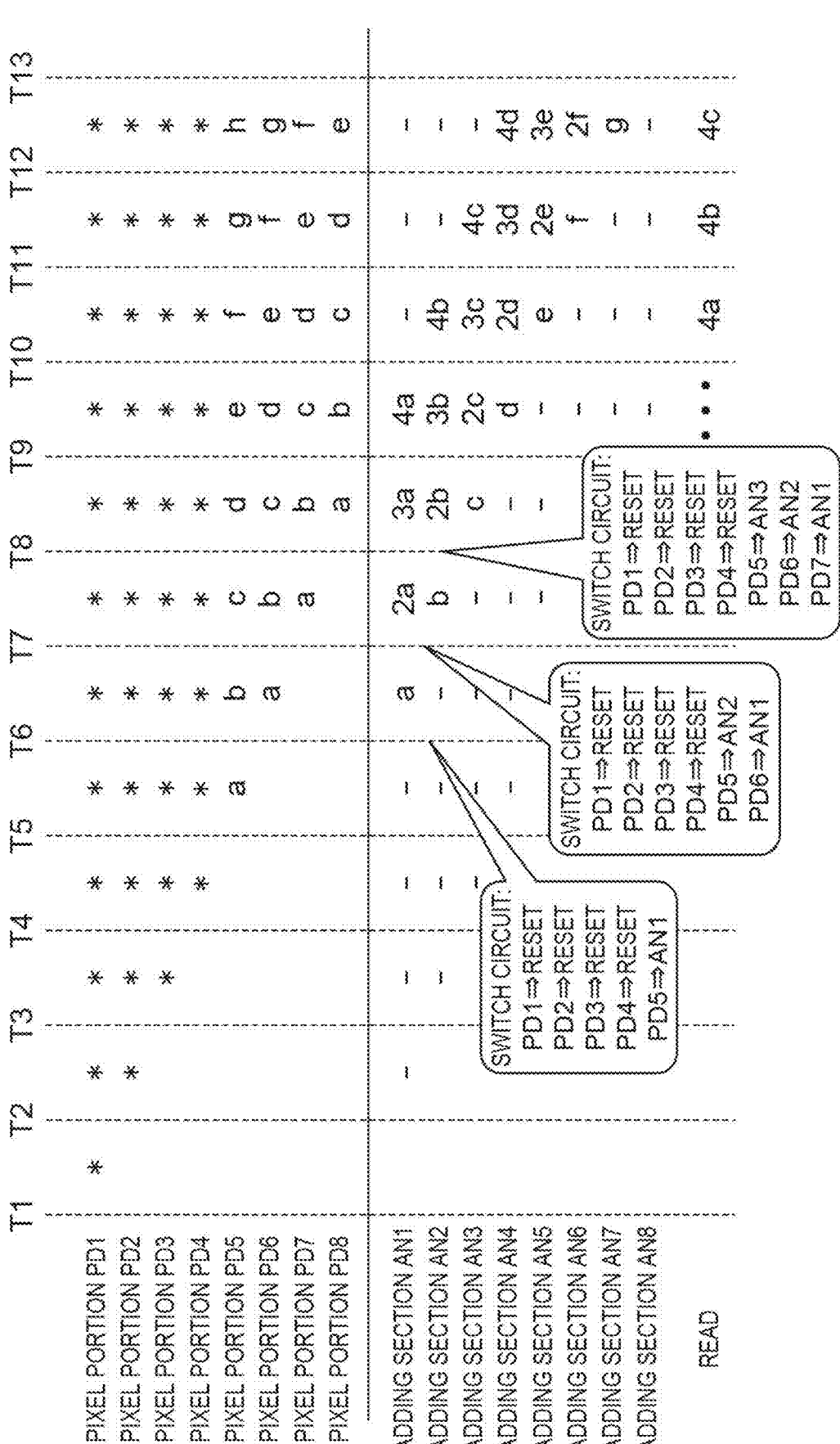
FIG. 39 is a diagram for explaining a TDI operation when switching the addition range.

FIGS. 38 and 39 are diagrams for explaining the TDI operation when switching the addition range. FIG. 38 shows an example when P is 3 and Q is 6. "-" in FIG. 38 indicates a clear state. The same applies to FIGS. 39 and 44, which will be described later.

As shown in FIG. 38, in a period between times T4 and T5, the electrical signal corresponding to the output signal from the pixel portion PD3 is added by the adding section AN1, and the pixel portions PD1 and PD2 are in a reset state. In a period between times T5 and T6, the electrical signals corresponding to the output signals from the pixel portions PD3 and PD4 are added by the adding sections AN2 and AN1, respectively, and the pixel portions PD1 and PD2 are in a reset state. In a period between times T6 and T7, the electrical signals corresponding to the output signals from the pixel portions PD3, PD4, and PD5 are added by the adding sections AN3, AN2, and AN1, respectively, and the pixel portions PD1 and PD2 are in a reset state. In a period between times T7 and T8, the electrical signals corresponding to the output signals from the pixel portions PD3, PD4, PD5, and PD6 are added by the adding sections AN4, AN3, AN2, and AN1, respectively, and the pixel portions PD1 and PD2 are in a reset state. In a period between times T8 and T9, the electrical signals corresponding to the output signals from the pixel portions PD3, PD4, PD5, and PD6 are added by the adding sections AN5, AN4, AN3, and AN2, respectively, and the pixel portions PD1, PD2, and PD7 are in a reset state. At time T8, a voltage signal (4a) obtained by adding the signals for four frames is read from the adding section AN1 as a digital value.

FIG. 39 shows an example when P is 5 and Q is 8. As shown in FIG. 38, in a period between times T6 and T7, the electrical signal corresponding to the output signal from the pixel portion PD5 is added by the adding section AN1, and the pixel portions PD1 to PD4 are in a reset state. In a period between times T7 and T8, the electrical signals corresponding to the output signals from the pixel portions PD5 and PD6 are added by the adding sections AN2 and AN1, respectively, and the pixel portions PD1 to PD4 are in a reset state. In a period between times T8 and T9, the electrical signals corresponding to the output signals from the pixel portions PD5, PD6, and PD7 are added by the adding sections AN3, AN2, and AN1, respectively, and the pixel portions PD1 to PD4 are in a reset state. At time T10, a voltage signal (4a) obtained by adding the signals for four frames is read from the adding section AN1 as a digital value.

According to the sixth modification example as well, as in the second embodiment described above, the TDI operation can be realized even when the number of pixel portions 11 increases, and the configuration can be simplified and the circuit size can be reduced. In addition, for example, it is possible to cope with variations in the positional relationship between the X-ray source 101 and the pixel unit 2.

This point will be described with reference to FIG. 40. When assembling the imaging device 120 into the X-ray image acquisition system 100, the positional relationship between the X-ray source 101 and the imaging device 120 (pixel unit 2) may vary. FIGS. 40(a) and 40(b) show different positional relationships. If the positional relationship is different, the X-ray emission range is different. In contrast, according to the sixth modification example, it is possible to cope with variations in the positional relationship between the X-ray source 101 and the pixel unit 2 by switching the addition range. If the signals from the pixel portions 11 to which X-rays are not emitted are also added, noise increases. However, according to the X-ray image acquisition device 110 of the sixth modification example, adjustment can be made so that signals from only the pixel portions 11 that receive X-rays are added by switching the addition range. As a result, an increase in noise can be suppressed.

Figure 41:
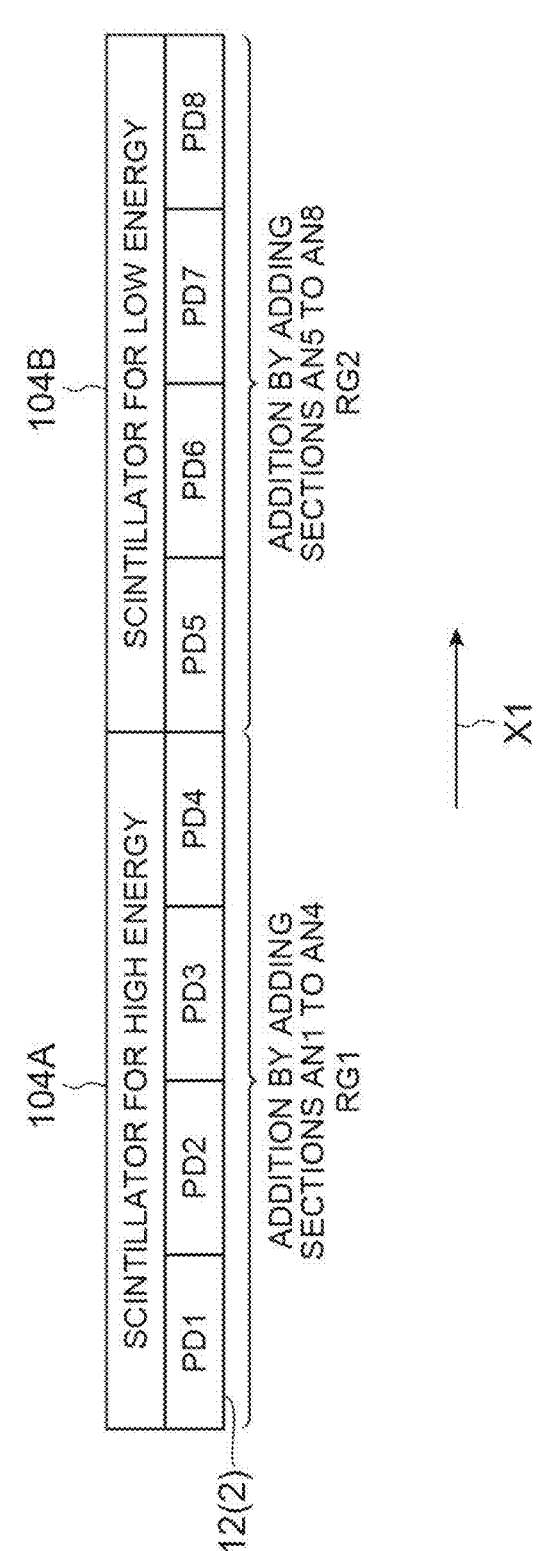
FIG. 41 is a diagram for explaining a dual mode.

As a seventh modification example, the X-ray image acquisition device 110 may have not only the normal mode but also a dual mode as operation modes. In this case, for example, as shown in FIG. 41, the X-ray image acquisition device 110 may include, as the scintillators 104, a scintillator 104A arranged above the pixel portions PD1 to PD4 and a scintillator 104B arranged above the pixel portions PD5 to PD8.

The scintillator 104A converts high-energy (first energy) X-rays into scintillation light, and the scintillator 104B converts low-energy (second energy lower than the first energy) X-rays into scintillation light. The scintillators 104A and 104B may have different thicknesses or may be formed of different materials, for example. The pixel portions PD1 to PD4 are the pixel portions 11 located in a first region RG1 in the first direction X1, and detect scintillation light from the scintillator 104A. The pixel portions PD5 to PD8 are pixel portions 11 located in a second region RG2 that is continuous with the first region RG1 in the first direction X1, and detect scintillation light from the scintillator 104B. The electrical signals corresponding to the output signals from the pixel portions PD1 to PD4 are added by the adding sections AN1 to AN4 (first adding sections), and the electrical signals corresponding to the output signals from the pixel portions PD5 to PD8 are added by the adding sections AN5 to AN8 (second adding sections). In this case, the image output from the X-ray image acquisition device 110 is, for example, separated into two regions corresponding to the first region RG1 and the second region RG2.

In the dual mode, the control unit 130 controls M circuit units so that electrical signals are read from the adding sections AN1 to AN4 after electrical signals corresponding to the output signals from the pixel portions PD1 to PD4 located in the first region RG1 are added by the adding sections AN1 to AN4 and electrical signals are read from the adding sections AN5 to AN8 after electrical signals corresponding to the output signals from the pixel portions PD5 to PD8 located in the second region RG2 are added by the adding sections AN5 to AN8. As a result, the TDI operation can be performed in each of the first region RG1 and the second region RG2.

Figure 42:
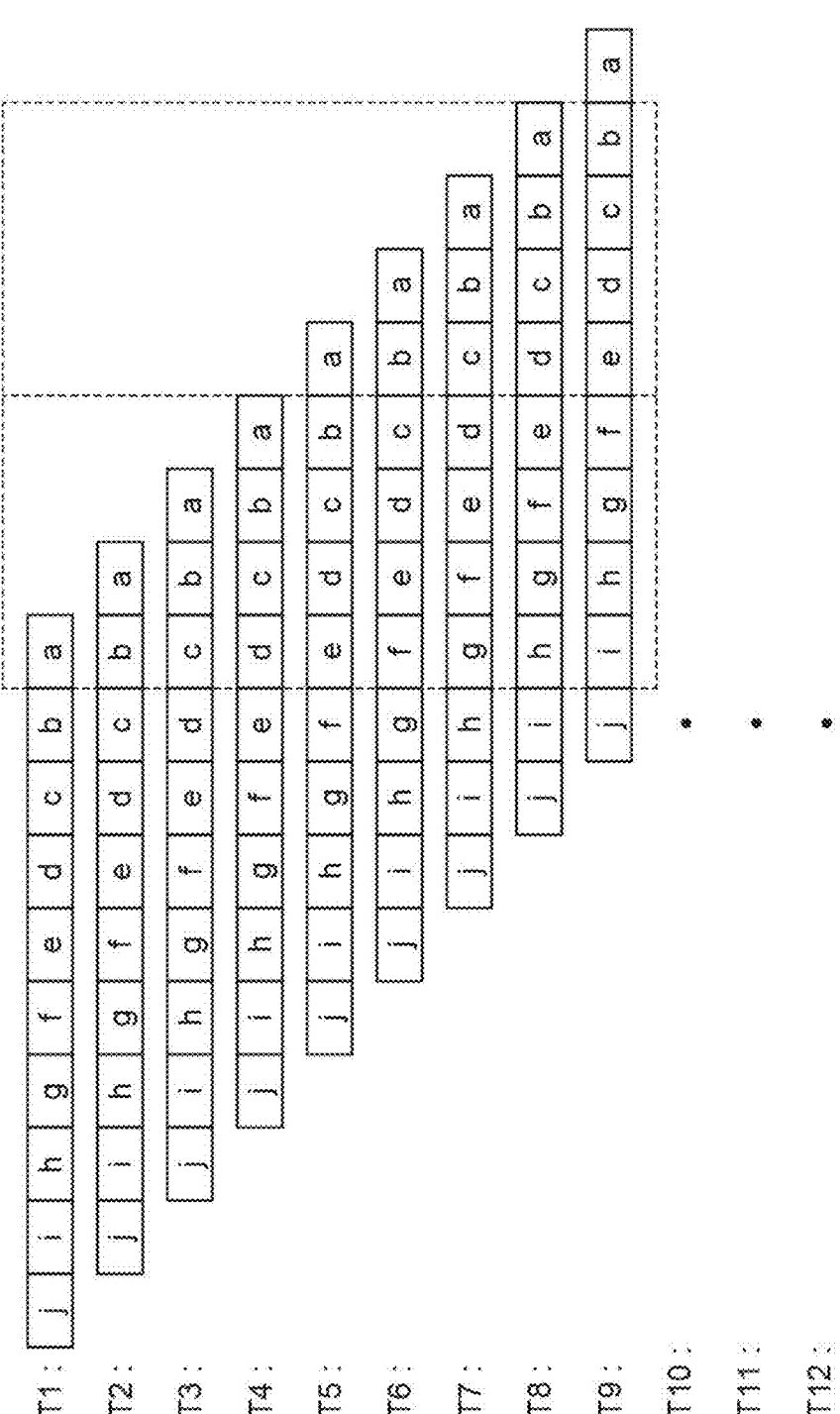
FIG. 42 is a diagram for explaining a TDI operation in the dual mode.

FIGS. 42 and 43 are diagrams for explaining the TDI operation in the dual mode. As shown in FIG. 43, in a period between times T6 and T7, the electrical signals corresponding to the output signals from the pixel portions PD1, PD2, PD3, PD4, and PD5 are added by the adding sections AN1, AN4, AN3, AN2, and AN5, respectively. In a period between times T7 and T8, the electrical signals corresponding to the output signals from the pixel portions PD1, PD2, PD3, PD4, PD5, and PD6 are added by the adding sections AN2, AN1, AN4, AN3, AN6, and AN5, respectively. In a period between times T8 and T9, the electrical signals corresponding to the output signals from the pixel portions PD1, PD2, PD3, PD4, PD5, PD6, and PD7 are added by the adding sections AN3, AN2, AN1, AN4, AN7, AN6, and AN5, respectively. At time T10, voltage signals (4e, 4a) obtained by adding the signals for four frames are read after being converted into digital values by the adding sections AN1 and AN5. Thus, in this example, the signals for four frames are added and acquired for each of the first region RG1 and the second region RG2.

According to the seventh modification example as well, as in the second embodiment described above, the TDI operation can be realized even when the number of pixel portions 11 increases, and the configuration can be simplified and the circuit size can be reduced. In addition, since a dual mode can be realized, it is possible to acquire a plurality of X-ray images in a single process. The dual mode (dual energy) also has the following advantages. In non-destructive inspection using normal X-rays, materials and foreign matter are detected based on density differences in X-ray transmission images. However, the actual object has a complex shape with irregularities on its surface, or various substances are densely located thereinside. Therefore, since the X-ray transmittance is not uniform, it may be difficult to discriminate foreign matter only with the density differences. In contrast, in the dual mode, two images with high and low energy can be simultaneously acquired by using one X-ray source 101. Since the degree of absorption according to the energy intensity differs depending on the substance, it is possible to discriminate the substance by arithmetically processing these two images. In addition, a vertical arrangement in which the pixel units 2 (pixel portions 11) are vertically arranged may be adopted instead of the horizontal arrangement in the example described above. In this case, for example, the upper pixel unit 2 detects scintillation light based on high-energy X-rays, and the lower pixel unit 2 detects scintillation light based on low-energy X-rays. The dual mode can also be realized with such a configuration.

In the example of FIG. 41, the first region RG1 and the second region RG2 are continuous. However, the first region RG1 and the second region RG2 may be aligned in the first direction X1, and there may be a gap between the first region RG1 and the second region RG2. In this case, a gap may be formed or a shielding member may be arranged between the first region RG1 and the second region RG2. Alternatively, the scintillator 104A may be arranged above the pixel portions PD1 to PD3 (pixel portions 11 located in the first region) and the scintillator 104B may be arranged above the pixel portions PD6 to PD8 (pixel portions 11 located in the second region), and a shielding member may be arranged or a gap may be formed above the pixel portions PD4 and PD5 (pixel portions 11 located in a region between the first region and the second region). A dead zone wider than the width of the pixel portion 11 may be provided between the pixel portions PD4 and PD5. In this case, signal interference can be suppressed.

Figure 44:
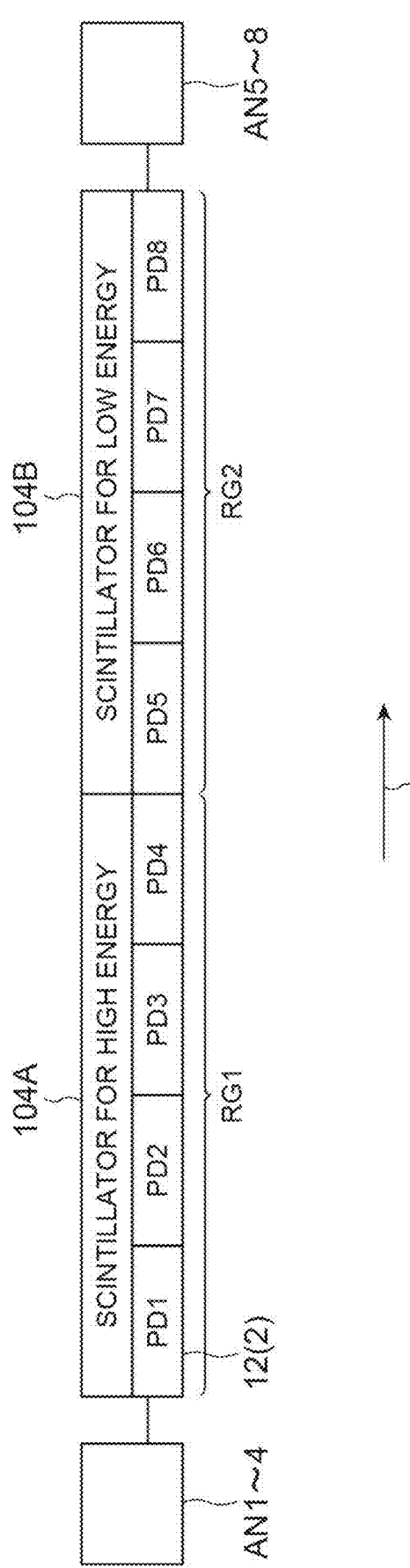
FIG. 44 is a diagram for explaining another arrangement example for the dual mode.

In the seventh modification example, the adding sections AN1 to AN4 (first adding sections) and the adding sections AN5 to AN8 (second adding sections) may be arranged as shown in FIG. 44. In this example, assuming that, in the first direction X1, a side (left side in FIG. 44) where the adding sections AN1 to AN4 are located with respect to the adding sections AN5 to AN8 is a first side and a side (right side in FIG. 44) where the adding sections AN5 to AN8 are located with respect to the adding sections AN1 to AN4 is a second side, the adding sections AN1 to AN4 are arranged on the first side with respect to the first region RG1, and the adding sections AN5 to AN8 are arranged on the second side with respect to the second region RG2. In this case, it is possible to reduce the lengths of wirings for connecting the pixel portions PD1 to PD4 located in the first region RG1 to the adding sections AN1 to AN4 and the lengths of wirings for connecting the pixel portions PD5 to PD8 located in the second region RG2 to the adding sections AN4 to AN8.

As an eighth modification example, the X-ray image acquisition device 110 may have a function of reversing the addition direction. Since there is a function of reversing the addition direction, it is possible to cope with, for example, a case where the object OJ is transported in a direction opposite to the transport direction in the second embodiment described above. Even when the addition direction is reversed, the connection states between the pixel portions PD1 to PD8 and the adding sections AN1 to AN8 are switched in synchronization with the transportation of the object OJ along the first direction X1 so that the electrical signals corresponding to the output signals output from the pixel portions PD1 to PD8 by detecting X-rays transmitted through the same region of the object OJ are added by the same adding sections AN1 to AN8.

Figure 45:
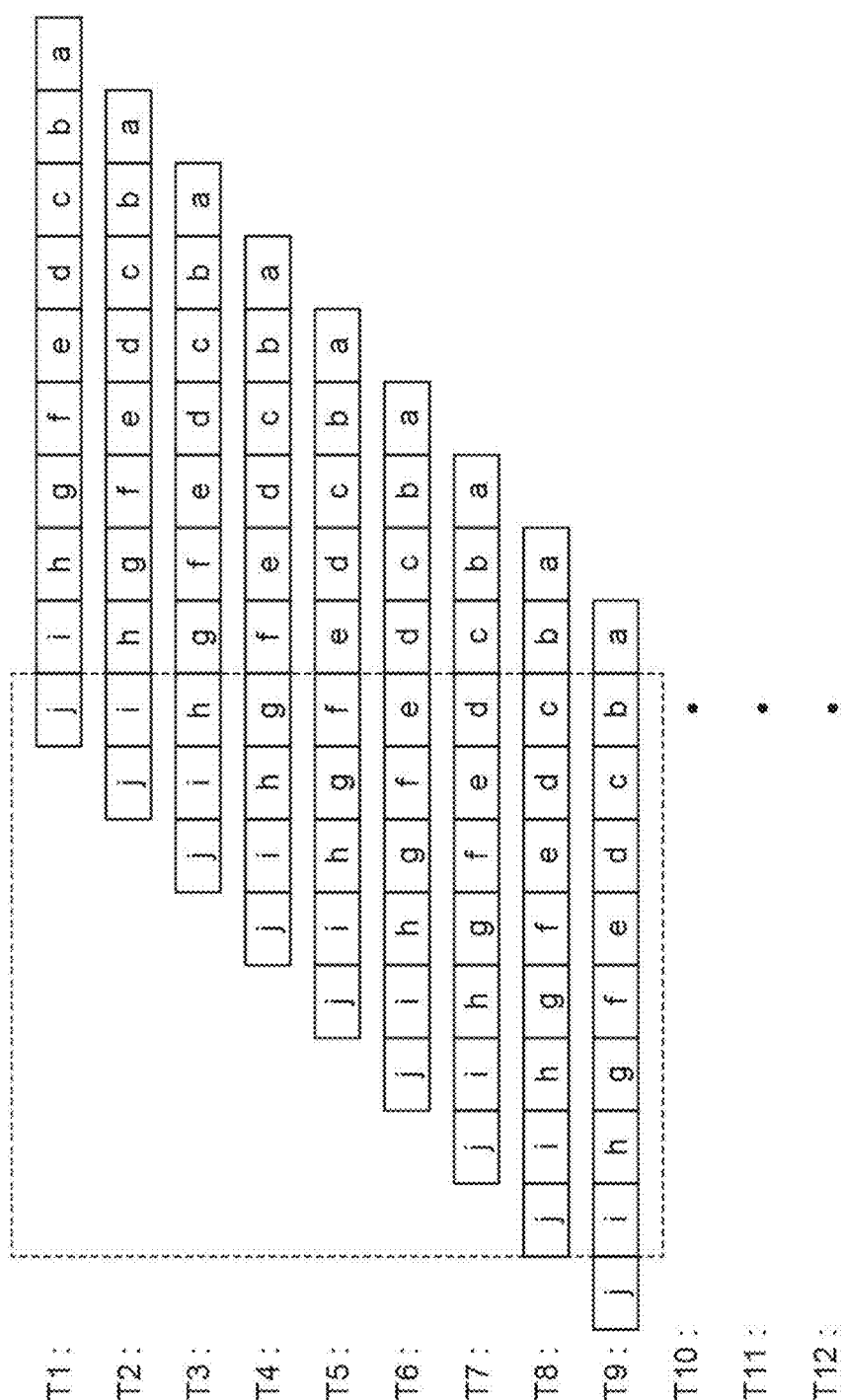
FIG. 45 is a diagram for explaining a TDI operation when an addition direction is reversed.

FIGS. 45 and 46 are diagrams for explaining the TDI operation when the addition direction is reversed. In the example of FIGS. 45 and 46, signals for eight frames (all frames) are added and acquired. In a period between times T2 and T3, the electrical signal corresponding to the output signal from the pixel portion PD8 is added by the adding section AN1. In a period between times T3 and T4, the electrical signals corresponding to the output signals from the pixel portions PD8 and PD7 are added by the adding sections AN2 and AN1, respectively. In a period between times T4 and T5, the electrical signals corresponding to the output signals from the pixel portions PD8, PD7, and PD6 are added by the adding sections AN3, AN2, and AN1, respectively. In a period between times T5 and T6, the electrical signals corresponding to the output signals from the pixel portions PD8, PD7, PD6, and PD5 are added by the adding sections AN4, AN3, AN2, and AN1, respectively. Addition processing is sequentially performed at subsequent times. At time T10, a voltage signal (8*j*) obtained by adding the signals for eight frames is read after being converted into a digital value by the adding section AN1.

FIG. 47 is a diagram for explaining another example of the TDI operation when the addition direction is reversed. In the example of FIG. 47, signals for four frames are added and acquired. In a period between times T5 and T6, the electrical signals corresponding to the output signals from the pixel portions PD8, PD7, PD6, and PD5 are added by the adding sections AN4, AN3, AN2, and AN1, respectively. In a period between times T6 and T7, the electrical signals corresponding to the output signals from the pixel portions PD8, PD7, PD6, and PD5 are added by the adding sections AN5, AN4, AN3, and AN2, respectively, and the pixel portion PD4 is in a reset state. In a period between times T7 and T8, the electrical signals corresponding to the output signals from the pixel portions PD8, PD7, PD6, and PD5 are added by the adding sections AN6, AN5, AN4, and AN3, respectively, and the pixel portions PD3 and PD4 are in a reset state. At time T6, a voltage signal (4*j*) obtained by adding the signals for four frames is read after being converted into a digital value by the adding section AN1. Thus, in this example, signals for four frames are added and acquired.

Figure 48:
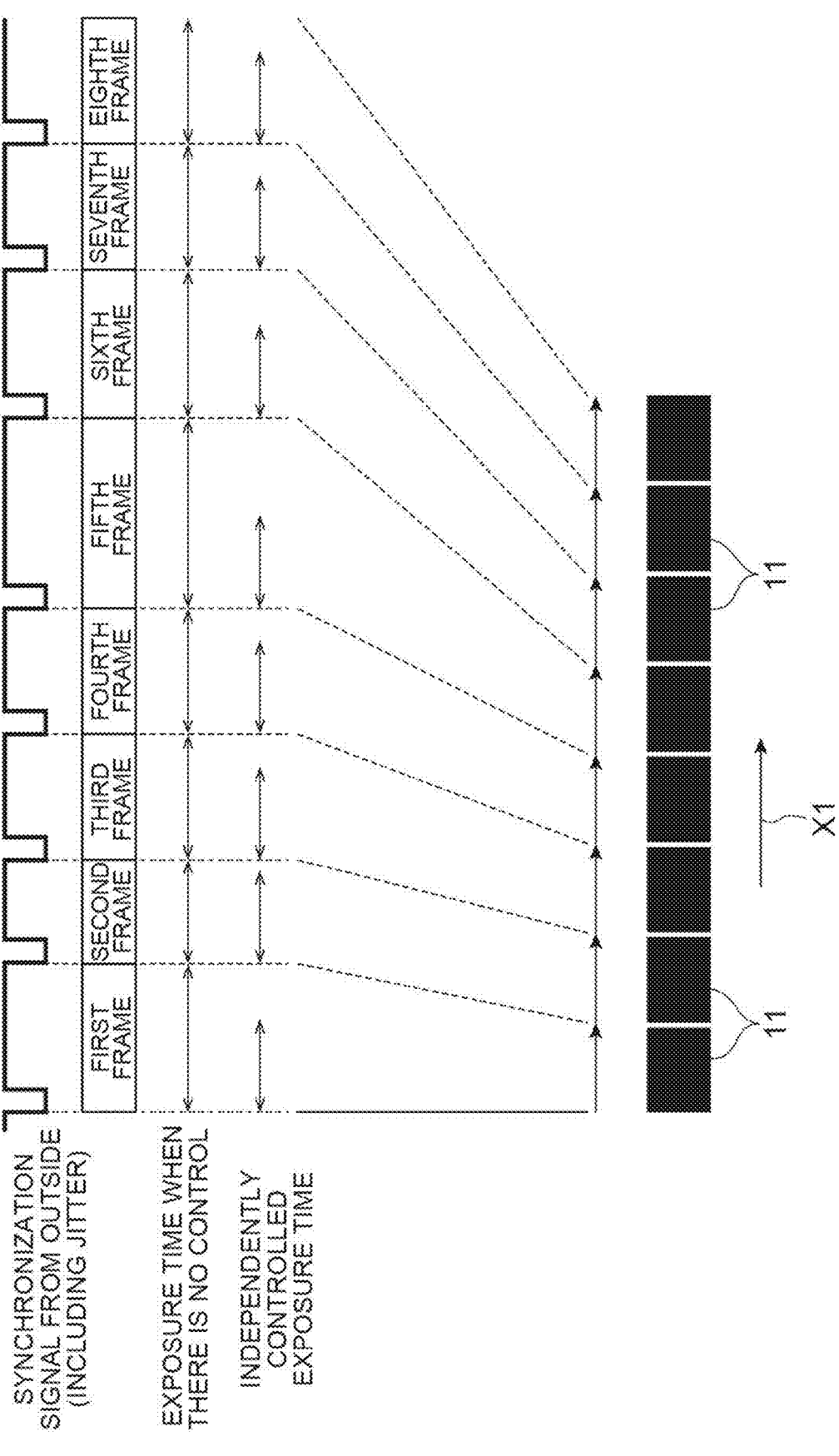
FIG. 48 is a diagram for explaining the independent control of exposure time.

As a ninth modification example, the control unit 130 may control the exposure time of each pixel portion 11 independently of the transportation of the object OJ. FIG. 48 is a diagram for explaining the independent control of exposure time. As shown in FIG. 48, a synchronization signal from the outside that is used for synchronization with the transportation of the object OJ may include jitter (fluctuations). If such a synchronization signal is associated with the exposure time of the pixel portion 11, the exposure time may vary, which is a risk. In contrast, by controlling the exposure time of each pixel portion 11 (each frame) independently of the transportation of the object OJ, the exposure times of the N pixel portions 11 can be made uniform. According to the ninth modification example as well, as in the second embodiment described above, the TDI operation can be realized even when the number of pixel portions 11 increases, and the configuration can be simplified and the circuit size can be reduced. The exposure time can be controlled by using a dedicated control signal or a setting in a sensor setting storage device.

Figure 49:
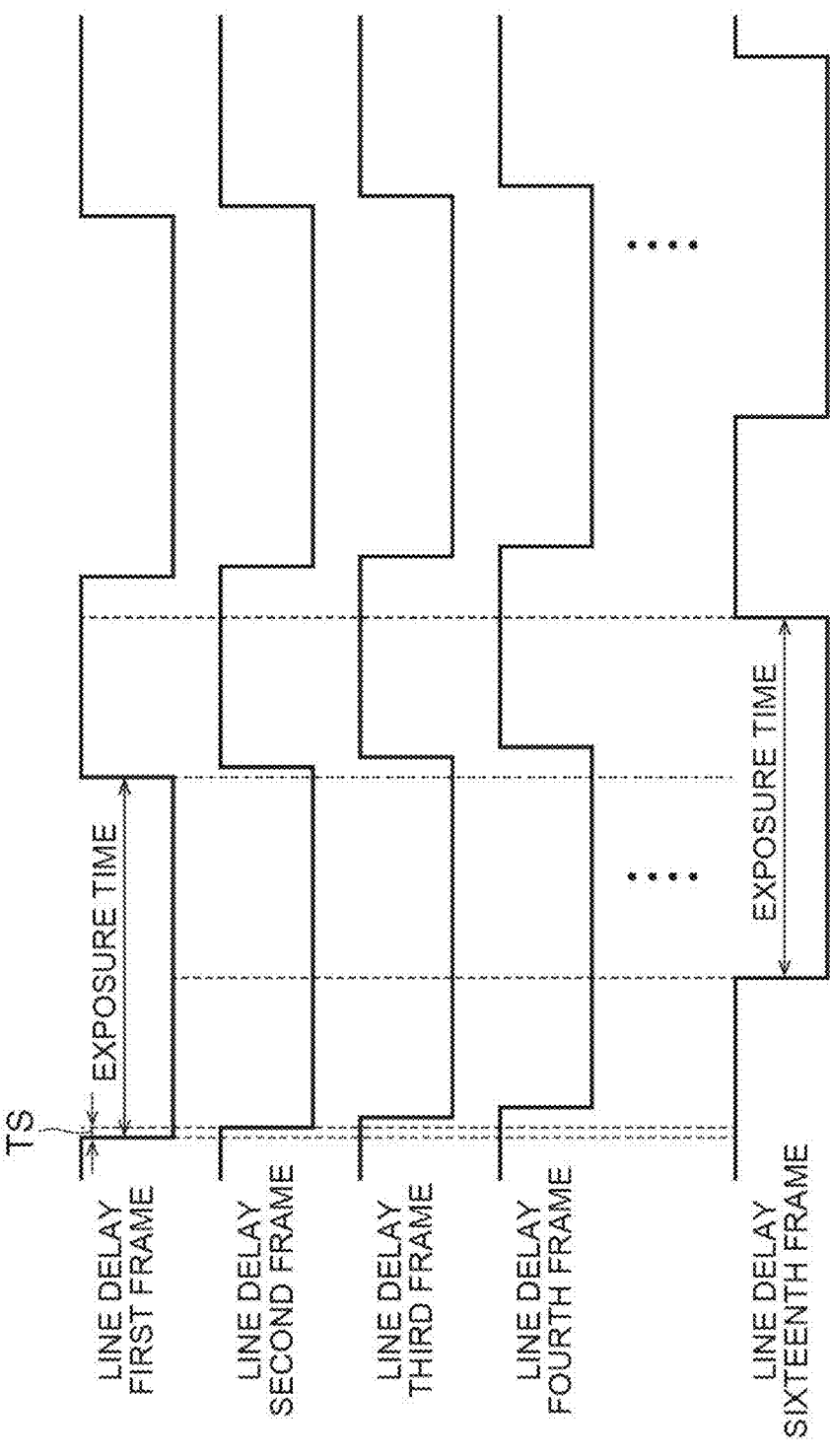
FIG. 49 is a diagram for explaining a line delay function.

As a tenth modification example, the X-ray image acquisition device 110 may have a line delay function. FIG. 49 is a diagram for explaining the line delay function. When the line delay function is ON, the exposure start timings of the N pixel portions 11 are shifted by predetermined time TS'U (U is an integer of 1 or more) according to the arrangement order of the N pixel portions 11 in the first direction X1. FIG. 49 shows a case where U is 1. The predetermined time TS is set to a time sufficiently shorter than the exposure time of the pixel portion 11 (for example, 100 msec). According to the tenth modification example as well, as in the second embodiment described above, the TDI operation can be realized even when the number of pixel portions 11 increases, and the configuration can be simplified and the circuit size can be reduced. In addition, since there is a line delay function, it is possible to change the synchronization position in the height direction.

Figure 50:
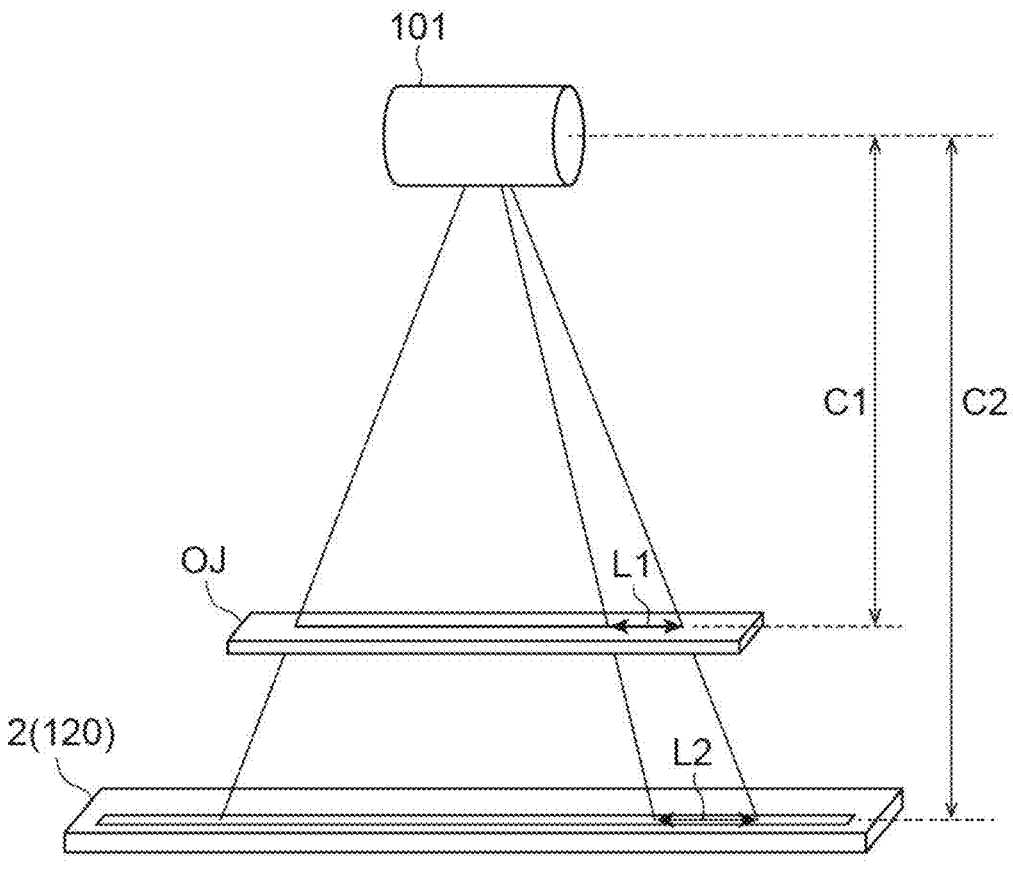
FIG. 50 is a diagram for explaining a line delay function.

This point will be described with reference to FIG. 50. When the X-ray source 101 is a point light source, the image of the object OJ is enlarged and projected according to the magnification ratio L2/L1=C2/C1. C1 is a distance (FOD) between the X-ray source 101 and the object OJ, and C2 is a distance (FDD) between the X-ray source 101 and the imaging device 120. L1 is a length along the transport direction (first direction X1) corresponding to the distance C1, and L2 is a length along the transport direction corresponding to the distance C2. The image acquisition speed to be set in the imaging device 120 is determined by the product of the transport speed and the magnification ratio. That is, strictly speaking, the imaging device 120 is completely in speed synchronization and addition synchronization at only one height position. Strictly speaking, the image acquisition speed to be set in the imaging device 120 differs depending on the height position (magnification ratio) for synchronization as well as the transport speed. This difference can be adjusted by using the line delay function. For example, when control is made based on a synchronization signal from the outside, the line rate cannot be changed. However, the synchronization position can be changed by changing the predetermined time TS. In addition, when the line delay function is ON, the exposure start timing is delayed in the later frames, and the image acquisition timing is later than usual. Therefore, it can be said that this is synchronized with a state in which the object OJ moves faster (the moving distance is longer). The state of high speed means a state of high magnification ratio. That is, the larger the line delay amount (predetermined time TS×U), the higher the synchronization height plane.

The present disclosure is not limited to the embodiments and their modification examples described above. For example, in the second embodiment or its fifth to tenth modification examples described above, the imaging device 120 may be configured in the same manner as in the third modification example described above. In this case, the adding sections AN1 to AN8 are formed by the charge amplifier 31. That is, in the second embodiment described above, the adding sections AN1 to AN8, which add the electrical signals (voltage signals) corresponding to the output signals (charge signals) output from the pixel portions PD1 to PD8, are the A/D converters 61. However, the adding sections AN1 to AN8 may be the charge amplifiers 31. In this case, the charge amplifiers 31 accumulate (add) the output signals (charge signals) themselves output from the pixel portions PD1 to PD8 in the capacitive portions 33. Thus, the "electrical signal corresponding to the output signal output from the pixel portion" to be added by the adding section may be the output signal itself. When the adding section is the charge amplifier 31, the signals are added in a charge state. Therefore, since read noise generated when reading charges is generated only once, the read noise can be reduced. In addition, the power consumption can be reduced because the configuration can be realized by the switching of connection to the integration capacitor and the minimum number of A/D converters. In addition, some scintillators 104 are vulnerable to high-temperature environments due to restrictions on the glass transition point. For this reason, an increase in the amount of heat generated when there are multiple rows can be an issue. However, the amount of heat generated can be reduced by forming the adding section with the charge amplifier 31. Therefore, it is possible to cope with such an issue. The adding sections AN1 to AN8 may be integration capacitors provided in the circuit unit 5. In this case, the charge amplifier 31 and the A/D converter 61 may not be provided in the circuit unit 5.

In the second embodiment described above, the extending portion 6b of each wiring 6 is electrically isolated from the main body portion 6a. However, the extending portion 6b of each wiring 6 may be electrically connected to the main body portion 6a at the connection point CP, for example. In this case, the wiring capacities of the N wirings 6 connected to one circuit unit 5 can be made uniform. The scintillator 104 may be omitted. In this case, for example, the pixel portion 11 is configured as a direct conversion type detector that directly converts incident X-rays into electrical signals without converting the X-rays into light.

The X-ray image acquisition device 110 may have a non-addition mode in which signals obtained by converting the electrical signals output from the pixel portions PD1 to PD8 into digital values are output, without performing the addition operation or average calculation. In this case, the data output from the X-ray image acquisition device 110 is a two-dimensional image of N×M pixels. Such an X-ray image acquisition device 110 can be used for aligning the axis with the light source, checking the delay of the line delay function, and the like.

REFERENCE SIGNS LIST

1, 120: imaging device, 2: pixel unit, 5: circuit unit, 6: wiring, 6a: main body portion, 6b: extending portion, 11, PD1 to PD8: pixel portion, 12: pixel array, 31, CA1 to CA4: charge amplifier (adding section), 40, 40A: switch array (switch section), 61, AD1 to AD4: A/D converter (adding section), 100: X-ray image acquisition system, 101: X-ray source, 102: transport unit, 104, 104A, 104B: scintillator, 106: shielding member, 106a: main body portion (portion other than slit), 106b: slit (opening), 110: X-ray image acquisition device, 120: imaging device, 130: control unit, AN1 to AN8: adding section (first adding section, second adding section), CP: connection point, DS: gap, OJ: object, RG1: first region, RG2: second region, X1: first direction, X2: second direction.

The invention claimed is:

1. An X-ray image acquisition device for acquiring an X-ray image of an object transported along a first direction, comprising:
   a pixel unit having M (M is an integer of 2 or more) pixel arrays each including N (N is an integer of 2 or more) pixel portions for detecting X-rays, the N pixel portions being arranged along the first direction and the M pixel arrays being arranged along a second direction perpendicular to the first direction;
   M circuit units provided corresponding to the M pixel arrays; and
   a control unit configured to control the M circuit units, wherein each of the M circuit units includes:
   T (T is an integer of N or more) adding sections configured to sequentially add electrical signals corresponding to output signals from the N pixel portions of the corresponding pixel array; and
   a switch section configured to switch connection states between the N pixel portions and the T adding sections, and
   for each of the M circuit units, the control unit switches the connection states between the N pixel portions and the T adding sections in synchronization with transportation of the object along the first direction so that the electrical signals corresponding to the output signals output from the pixel portions by detecting X-rays transmitted through the same region of the object are added by the same adding sections.

2. The X-ray image acquisition device according to claim 1, further comprising:
   at least one scintillator configured to convert X-rays transmitted through the object into scintillation light, wherein the N pixel portions receive the scintillation light converted by the at least one scintillator.

3. The X-ray image acquisition device according to claim 1,
   wherein each of the T adding sections is an A/D converter.

4. The X-ray image acquisition device according to claim 1,
   wherein each of the T adding sections is a charge amplifier.

5. The X-ray image acquisition device according to claim 1, wherein, between the pixel unit and the M circuit units, there is a gap of twice or more a width of the pixel portion.

6. The X-ray image acquisition device according to claim 1, further comprising:

a shielding member having an impermeability with X-rays, wherein an opening is formed in the shielding member, and the pixel unit faces the opening, and the M circuit units face a portion of the shielding member other than the opening.

7. The X-ray image acquisition device according to claim 1, further comprising:

N×M wirings electrically connected to the N pixel portions of each of the M pixel arrays and the M circuit units, wherein each of the N×M wirings extends so as to pass over the N pixel portions.

8. The X-ray image acquisition device according to claim 7, wherein each of the N×M wirings includes a main body portion extending from the circuit unit to the pixel portion and an extending portion extending from a connection point between the main body portion and the pixel portion to a side opposite to the circuit unit, and the extending portion is electrically isolated from the main body portion.

9. The X-ray image acquisition device according to claim 1, wherein the control unit controls the M circuit units so that the electrical signals are read from the adding sections after the electrical signals corresponding to the output signals from the L pixel portions aligned in the first direction are added by the adding sections, and a value of L is selectable from integers of 1 to N.

10. The X-ray image acquisition device according to claim 1, wherein the control unit controls the M circuit units so that the electrical signals are read from the adding sections after the electrical signals corresponding to the output signals from the P-th to Q-th (P<Q) pixel portions in the first direction are added by the adding sections, and values of P and Q are selectable from integers of 1 to N.

11. The X-ray image acquisition device according to claim 1, wherein the adding sections include first adding sections and second adding sections, and the control unit controls the M circuit units so that the electrical signals are read from the first adding sections after the electrical signals corresponding to the output signals from the pixel portions located in a first region in the first direction are added by the first adding sections and the electrical signals are read from the adding sections after the electrical signals corresponding to the output signals from the pixel portions located in a second region aligned with the first region in the first direction are added by the second adding sections.

12. The X-ray image acquisition device according to claim 11, wherein assuming that, in the first direction, a side where the first adding sections are located with respect to the second adding sections is a first side and a side where the second adding sections are located with respect to the first adding sections is a second side, the first adding sections are arranged on the first side with respect to the first region, and the second adding sections are arranged on the second side with respect to the second region.

13. The X-ray image acquisition device according to claim 1, wherein an exposure time of each of the N pixel portions is controlled independently of transportation of the object.

14. The X-ray image acquisition device according to claim 1, wherein ON/OFF of a line delay function is changeable, and when the line delay function is ON, exposure start timings of the N pixel portions are shifted by a predetermined time in accordance with an arrangement order of the N pixel portions in the first direction.

15. The X-ray image acquisition device according to claim 1, wherein N is an integer of 8 or more.

16. An X-ray image acquisition system, comprising:

the X-ray image acquisition device according to claim 1;

an X-ray source configured to output X-rays; and a transport unit configured to transport the object along the first direction.

* * * * *